United States Patent
Fuchie et al.

(10) Patent No.: US 11,006,113 B2
(45) Date of Patent: May 11, 2021

(54) IMAGE PROCESSING DEVICE, METHOD, AND PROGRAM DECIDING A PROCESSING PARAMETER

(71) Applicant: SONY CORPORATION, Tokyo (JP)

(72) Inventors: Takaaki Fuchie, Kanagawa (JP); Masaki Hirose, Tokyo (JP); Atsuo Yada, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/469,020

(22) PCT Filed: Oct. 17, 2017

(86) PCT No.: PCT/JP2017/037600
§ 371 (c)(1),
(2) Date: Jun. 12, 2019

(87) PCT Pub. No.: WO2018/116605
PCT Pub. Date: Jun. 28, 2018

(65) Prior Publication Data
US 2019/0320187 A1 Oct. 17, 2019

(30) Foreign Application Priority Data
Dec. 19, 2016 (JP) ............................. JP2016-245983

(51) Int. Cl.
*H04N 19/126* (2014.01)
*H04N 19/124* (2014.01)
(Continued)

(52) U.S. Cl.
CPC ............ *H04N 19/126* (2014.11); *H04N 1/60* (2013.01); *H04N 1/642* (2013.01);
(Continued)

(58) Field of Classification Search
CPC .......................... H04N 19/124; H04N 19/126
See application file for complete search history.

(56) References Cited

U.S. PATENT DOCUMENTS 4,791,483 A * 12/1988 Miller ................. H04N 11/046
375/240.01
5,847,766 A * 12/1998 Peak .................... H04N 19/159
375/240.24
(Continued)

FOREIGN PATENT DOCUMENTS

JP  2011-509536 A  3/2011
JP  2014-518030 A  7/2014
(Continued)

OTHER PUBLICATIONS

R.J. Safranek & J.D. Johnson, "A Perceptually Tuned Sub-band Image Coder with Image Dependent Quantization and Post-quantization Data Compression", 3 Int'l Conf. on Acoustics, Speech, & Signal Processing 1945-1948 (May 1989) (Year: 1989).*
(Continued)

*Primary Examiner* — David N Werner
(74) *Attorney, Agent, or Firm* — Oblon, McClelland, Maier & Neustadt, L.L.P.

(57) ABSTRACT

[Object] To prevent an inappropriate processing parameter from being used in a case in which an image that may be expressed by various expression methods is handled.
[Solution] Provided is an image processing device including: a control unit that decides a processing parameter for image processing performed on an image on the basis of at least one of a transfer function related to conversion between light and an image signal that is applied to the image or a color range that is applied to the image; and a processing unit that executes the image processing using the processing parameter that is decided by the control unit.

18 Claims, 29 Drawing Sheets

(51) Int. Cl.
   *H04N 19/14*    (2014.01)
   *H04N 19/186*   (2014.01)
   *H04N 19/60*    (2014.01)
   *H04N 1/60*     (2006.01)
   *H04N 1/64*     (2006.01)
   *H04N 19/167*   (2014.01)

(52) U.S. Cl.
   CPC ........... *H04N 19/124* (2014.11); *H04N 19/14* (2014.11); *H04N 19/167* (2014.11); *H04N 19/186* (2014.11); *H04N 19/60* (2014.11)

(56) References Cited

U.S. PATENT DOCUMENTS

| | | | | |
|---|---|---|---|---|
| 6,343,141 | B1* | 1/2002 | Okada | G06K 9/00268 348/587 |
| 6,452,970 | B1* | 9/2002 | Kaup | H04N 19/176 375/240.08 |
| 2003/0081674 | A1* | 5/2003 | Malvar | G06F 17/147 375/240.03 |
| 2008/0152245 | A1* | 6/2008 | El-Maleh | H04N 21/4621 382/254 |
| 2008/0170626 | A1* | 7/2008 | Sung | H04N 19/184 375/240.24 |
| 2008/0198932 | A1* | 8/2008 | Sei | H04N 19/139 375/240.16 |
| 2008/0225944 | A1* | 9/2008 | Pore | H04N 19/61 375/240.03 |
| 2009/0110063 | A1* | 4/2009 | Nakayama | H04N 19/176 375/240.03 |
| 2009/0175338 | A1 | 7/2009 | Segall | |
| 2010/0310187 | A1* | 12/2010 | Yang | H04N 19/647 382/248 |
| 2014/0044372 | A1 | 2/2014 | Mertens | |
| 2014/0146881 | A1* | 5/2014 | Kim | H04N 19/176 375/240.03 |
| 2014/0205009 | A1* | 7/2014 | Rose | H04N 19/503 375/240.12 |
| 2014/0247870 | A1 | 9/2014 | Mertens | |
| 2014/0334540 | A1* | 11/2014 | Suzuki | H04N 19/91 375/240.03 |
| 2015/0016509 | A1* | 1/2015 | Novotny | H04N 19/176 375/240.03 |
| 2015/0063461 | A1* | 3/2015 | Zheng | H04N 19/176 375/240.24 |
| 2015/0181168 | A1* | 6/2015 | Pahalawatta | H04N 19/80 348/14.12 |
| 2015/0243200 | A1 | 8/2015 | Pan | |
| 2015/0243243 | A1 | 8/2015 | Greenebaum et al. | |
| 2015/0245043 | A1 | 8/2015 | Greenebaum et al. | |
| 2015/0245044 | A1 | 8/2015 | Guo | |
| 2015/0245050 | A1 | 8/2015 | Tourapis et al. | |
| 2016/0005349 | A1 | 1/2016 | Atkins et al. | |
| 2016/0134870 | A1 | 5/2016 | Lu et al. | |
| 2016/0316207 | A1* | 10/2016 | Minoo | H04N 19/44 |
| 2016/0360213 | A1 | 12/2016 | Lee et al. | |
| 2016/0371822 | A1 | 12/2016 | Le Pendu et al. | |
| 2017/0026646 | A1* | 1/2017 | Minoo | H04N 19/124 |
| 2017/0085889 | A1* | 3/2017 | Baylon | H04N 19/124 |
| 2017/0339409 | A1* | 11/2017 | Socek | H04N 19/167 |
| 2018/0309995 | A1 | 10/2018 | He et al. | |
| 2019/0335184 | A1 | 10/2019 | Lee et al. | |
| 2019/0349581 | A1* | 11/2019 | Fuchie | H04N 19/115 |

FOREIGN PATENT DOCUMENTS

| | | | |
|---|---|---|---|
| JP | 2015144404 A | 8/2015 | |
| WO | WO-2009087952 A1 | 7/2009 | |
| WO | WO-2012147018 A2 | 11/2012 | |
| WO | WO 2015/128295 A1 | 9/2015 | |
| WO | WO 2015/130797 A1 | 9/2015 | |
| WO | WO-2015130797 A1 * | 9/2015 | ............... G09G 5/02 |
| WO | WO 2016/17236 A1 | 10/2016 | |
| WO | WO-2016168652 A1 | 10/2016 | |
| WO | WO-2016199409 A1 | 12/2016 | |
| WO | WO-2016200969 A1 | 12/2016 | |

OTHER PUBLICATIONS

International Search Report dated Jan. 23, 2018 in PCT/JP2017/037600, 2 pages.

Extended European Search Report dated Apr. 7, 2020 in corresponding European Patent Application No. 17885014.5, 9 pages.

Charles Poynton et al., "Deploying Wide Color Gamut and High Dynamic Range in HD and UHD", Technical Paper, SMPTE Motion Imaging Journal, vol. 124, No. 3, XP55680214, Apr. 2015, pp. 37-49.

Edouard Francois et al.,"High Dynamic Range and Wide Color Gamut Video Coding in HEVC: Status and Potential Future Enhancements", IEEE Transactions on Circuits and Systems for Video Technology, vol. 26, No. 1, XP011592169, Jan. 2016, pp. 63-75.

Association of Radio Industries and Businesses,"Essential Parameter Values for the Extended Image Dynamic Range Television (EIDRTV) System for Programme Production, ARIB standard", ARIB STD-B67, Version 1.0, Jul. 3, 2015,12 pages.

* cited by examiner

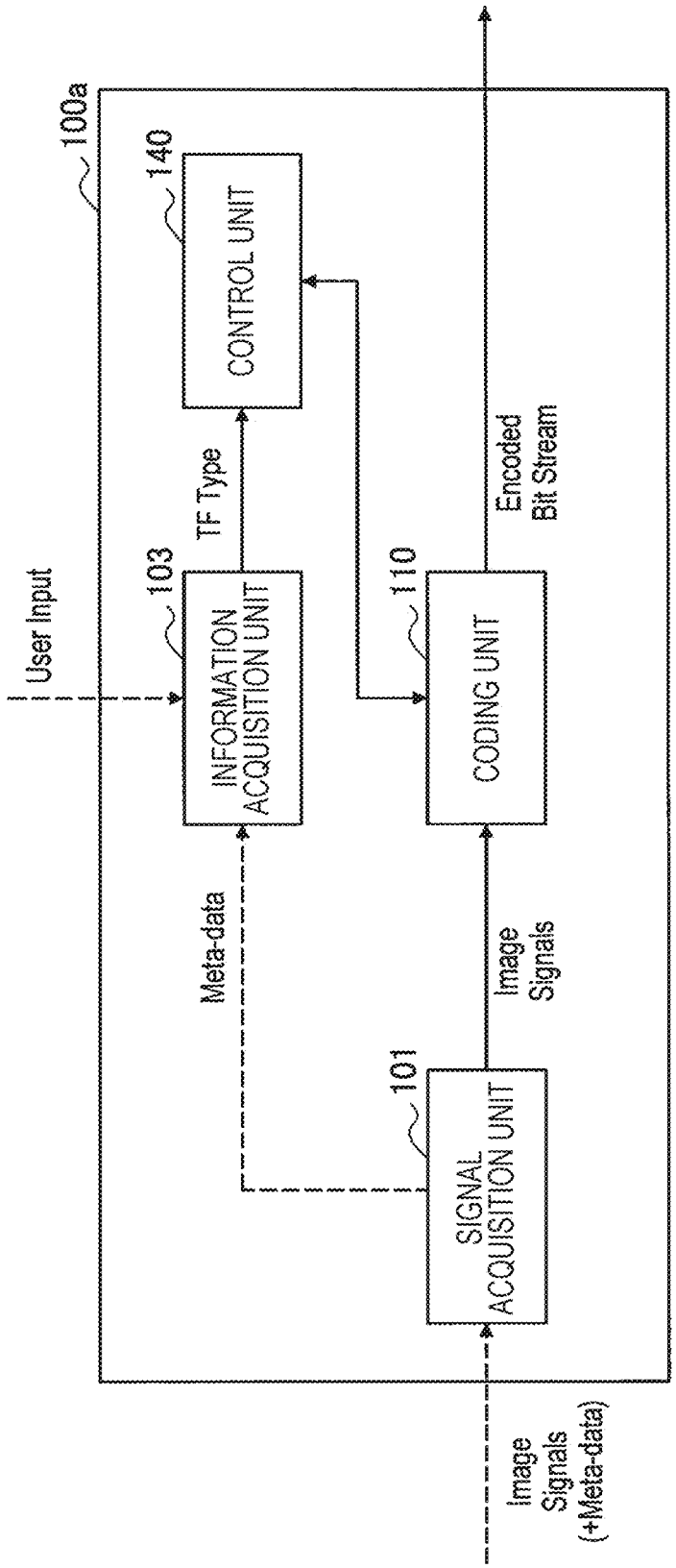

Flesh Color Domain <SDR; BT.709 / BT.2020>

☐ : SDR ; BT.709    ☐ : SDR; BT.2020

Flesh Color Domain <HDR (S-Log3) ; BT.2020>

☐ : SDR ; BT.709    ☐ : S-Log3; BT.2020

Flesh Color Domain <HDR (HLG) ; BT.2020>

☐ : SDR ; BT.709   ▢ : HLG; BT.2020

Flesh Color Domain <HDR (S-Log3) ; S-Gamut>

☐ : SDR ; BT.709   ▢ : SLog3; S-Gumt

IMAGE PROCESSING DEVICE, METHOD, AND PROGRAM DECIDING A PROCESSING PARAMETER

TECHNICAL FIELD

The present disclosure relates to an image processing device, an image processing method, and a program.

BACKGROUND ART

Extension of video image signal expressions has been pursued in order to enable more faithful reproduction of a state of an actual world or display of a video image with more extensive brightness and colors in recent years. A high dynamic range (HDR) is a concept for attempting to express an image or a video image in a wider luminance dynamic range than a standard dynamic range (SDR) that is a standard dynamic range in the related art. For example, it is known that light in the actual world with a luminance of greater than 100 nits can be reproduced on a display by converting light into an image signal (and converting the image signal to the light) with a transfer function (also referred to as a tone curve) such as hybrid log-gamma (HLG), ST2084, or S-Log3 (see Non-Patent Literature 3). In another example, BT.2020 standardized by ITU-R defines a color range that enables expressions of clearer colors as compared with BT.709 that has been used in many applications until now.

CITATION LIST

Non-Patent Literature
Non-Patent Literature 1: Association of Radio Industries and Businesses, "ESSENTIAL PARAMETER VALUES FOR THE EXTENDED IMAGE DYNAMIC RANGE TELEVISION (EIDRTV) SYSTEM FOR PROGRAMME PRODUCTION ARIB STANDARD", ARIB STD-B67 Version 1.0, Jul. 3, 2015,[online],[Retrieved Nov. 24, 2016]

DISCLOSURE OF INVENTION

Technical Problem

An existing device that codes or decodes a video image (or the individual images included in a video image) or uses such a video image cannot necessarily sufficiently be adapted to video signal expressions as they become more diverse. Processing parameters optimized on the assumption of a specific expression method are not necessarily suitable for processing of image signals expressed by other expression methods. A similar situation is conceivable for image processing of stationary images.

Therefore, it is desirable to provide a mechanism that prevents an inappropriate processing parameter from being used in a case in which an image that may be expressed by various expression methods is handled.

Solution to Problem

According to the present disclosure, there is provided an image processing device including: a control unit that decides a processing parameter for image processing performed on an image on the basis of at least one of a transfer function related to conversion between light and an image signal that is applied to the image or a color range that is applied to the image; and a processing unit that executes the image processing using the processing parameter that is decided by the control unit.

Moreover, according to the present disclosure, there is provided an image processing method including: deciding a processing parameter for image processing performed on an image on the basis of at least one of a transfer function related to conversion between light and an image signal that is applied to the image or a color range that is applied to the image; and executing the image processing using the decided processing parameter.

Moreover, according to the present disclosure, there is provided a program that causes a processor of an image processing device to function as: a control unit that decides a processing parameter for image processing performed on an image on the basis of at least one of a transfer function related to conversion between light and an image signal that is applied to the image or a color range that is applied to the image; and a processing unit that executes the image processing using the processing parameter that is decided by the control unit.

Advantageous Effects of Invention

According to the technology of the present disclosure, it is possible to prevent an inappropriate processing parameter from being used in a case in which an image that may be expressed by various expression methods is handled.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 8A is a block diagram illustrating a first example of schematic configurations of an image processing device according to a first embodiment.

MODES FOR CARRYING OUT THE INVENTION

Figure 1A:
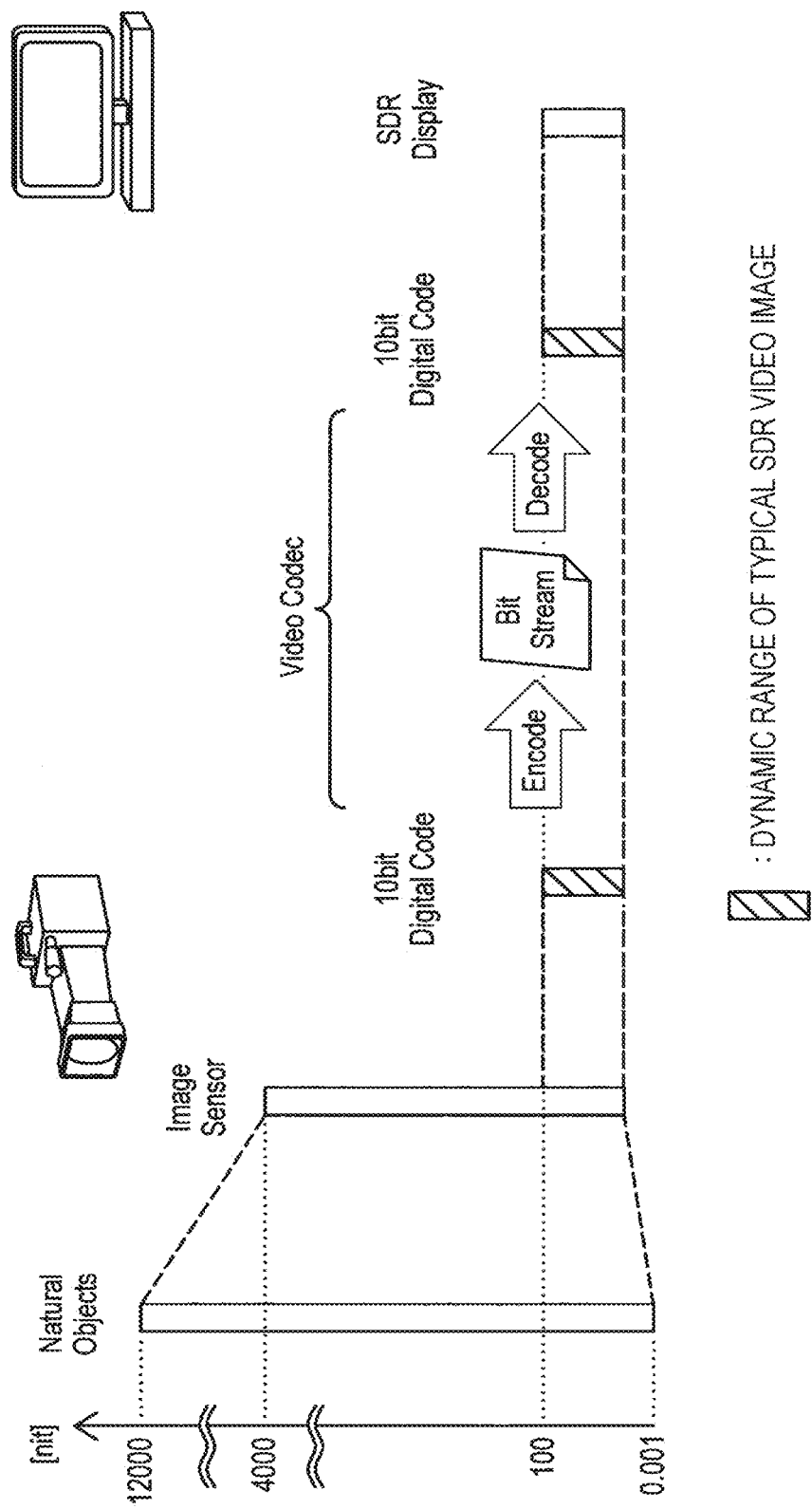
FIG. 1A is an explanatory diagram for explaining a luminance dynamic range of an SDR video image.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Also, description will be given in the following order.
1. Explanation of related technologies
1-1. SDR and HDR
1-2. Codec distortion
1-3. Transfer function
1-4. Color range
2. First Embodiment
2-1. Introduction
2-2. Outline of system
2-3. Schematic configuration of image processing device
2-4. Detailed configurations of coding unit and control unit
2-5. Flow of processing
2-6. Overview of first embodiment
3. Second Embodiment
3-1. Introduction
3-2. Outline of system
3-3. Schematic configuration of image processing device
3-4. Detailed configurations of coding unit and control unit
3-5. Flow of processing
3-6. Modification example
3-7. Overview of second embodiment
4. Hardware configuration example
5. Application examples
6. Summary 1. Explanation of Related Technologies

[1-1. SDR and HDR]

In recent years, extension of video image signal expressions has been pursued in order to enable more faithful reproduction of a state of an actual world or reproduction of a video image with more extensive brightness and colors. HDR is a concept for attempting to express an image or a video image in a wider luminance dynamic range than SDR that is a standard dynamic range in the related art.

FIG. 1A is an explanatory diagram for explaining a luminance dynamic range of an SDR video image. The vertical axis in FIG. 1A represents luminance[nits] The maximum luminance in the natural world may reach 20000 nits, and luminance of typical objects is about 12000 nits at maximum, for example. The upper limit of a dynamic range of an image sensor is lower than the maximum luminance in the natural world and may be 4000 nits, for example. An imaging device such as a digital camera or a digital camcorder converts an electrical signal generated by performing photoelectric conversion on incident light using an image sensor into a 10-bit digital image signal, for example, in a signal processing circuit in a latter stage of the image sensor. In a signal format of an SDR video image in the related art, grayscale at a high luminance part exceeding 100 nits is lost during such conversion. The digital image signal generated by the imaging device is coded by a predetermined video image coding scheme (also referred to as a video codec) in accordance with a purpose of an application such as transmission or recording, for example, and is converted into a coded bit stream. Then, when the SDR video image is displayed, a digital image signal acquired by decoding the coded bit stream is provided to a display device, and a video image is reproduced with display luminance with an upper limit of 100 nits.

Figure 1B:
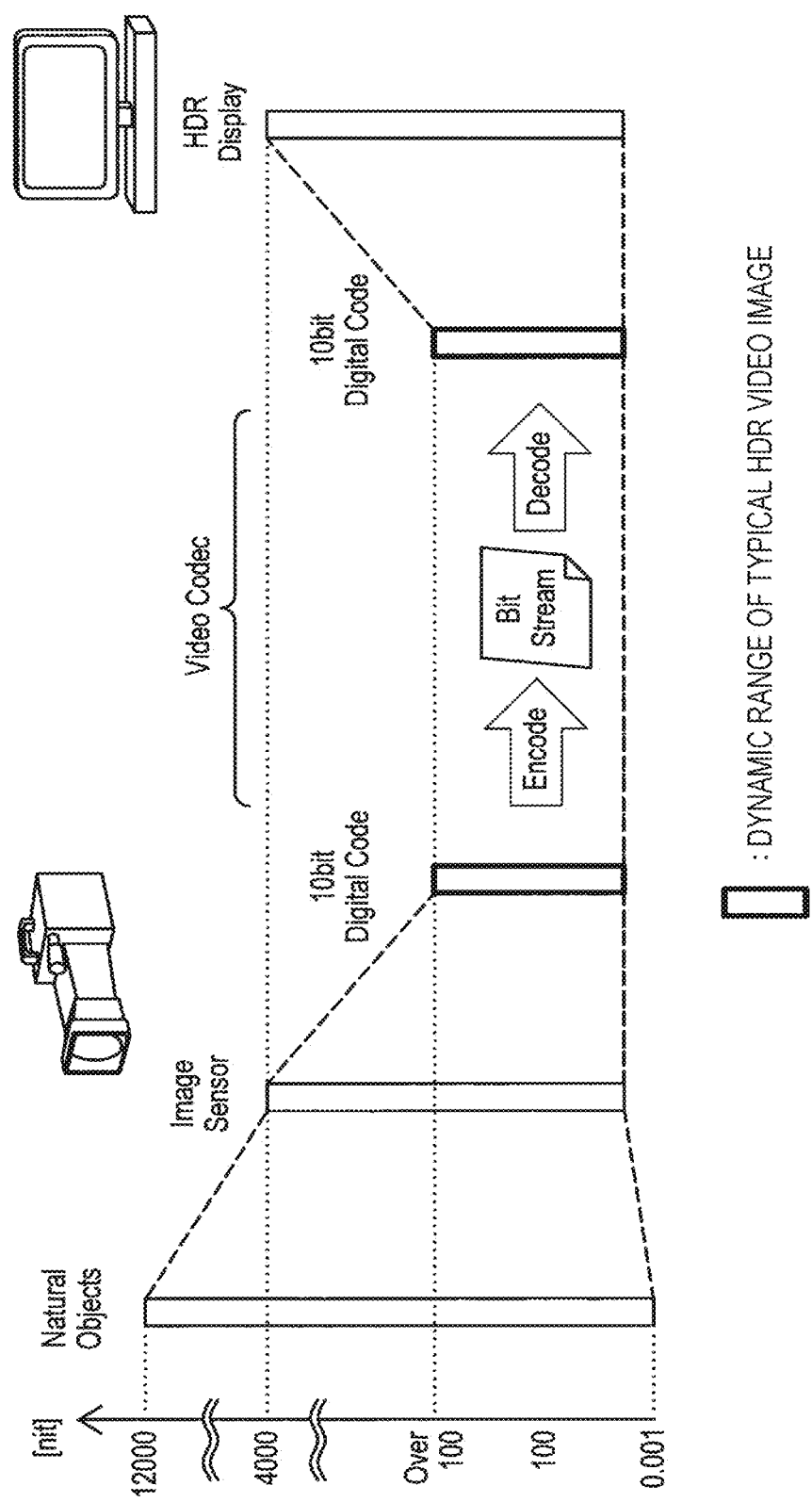
FIG. 1B is an explanatory diagram for explaining a luminance dynamic range of an HDR video image.

FIG. 1B is an explanatory diagram for describing a luminance dynamic range of an HDR video image. Similarly to the case of the SDR, an imaging device converts light that is incident on an image sensor into an analog electrical signal and further converts the analog electrical signal into a 10-bit digital image signal, for example. A signal format of the HDR video image enables maintenance of grayscale at a high luminance part exceeding 100 nits during such conversion and reproduction of a video image with a luminance with an upper limit of several hundreds or thousands of nits. The digital image signal generated by the imaging device is also coded by a predetermined video image coding scheme in accordance with a purpose of an application and is converted into a coded bit stream. When the HDR video image is displayed, a digital image signal acquired by decoding the coded bit stream is provided to a display device, and a video image is reproduced in a luminance dynamic range including display luminance of greater than 100 nits.

Note that a case in which the upper limit of the luminance dynamic range is equal to or less than 100 nits is assumed to correspond to the SDR and a case in which the upper limit is greater than 100 nits is assumed to correspond to the HDR here as a reference for categorizing the SDR and the HDR. However, at a certain timing in the future, a dynamic range that will be widely distributed (that is, will become a standard) at the timing and a newer dynamic range (with a higher upper limit) may be categorized using a reference value that is greater than 100 nits rather than 100 nits. The technology according to the present disclosure can be widely applied to cases in which two dynamic ranges have mutually different upper limits in general and is not limited by what reference value is used to categorize the dynamic ranges. The SDR is also referred to as a low dynamic range (LDR) in contrast to the HDR.

[1-2. Codec Distortion]

In either of an SDR video image or an HDR video image, if an image signal is coded by a video image coding scheme including lossy compression, image quality may deteriorate in an image reproduced on the basis of a decoded image signal. Such deterioration of image quality will be referred to as codec distortion in this specification. A degree of the codec distortion may be evaluated using an index of a peak signal-to-noise ratio (PSNR). In general, in a case in which coding efficiency is assumed to be equivalent, image quality of an image coded/decoded by H.264/AVC is higher than image quality of an image coded/decoded by MPEG-2, and image quality of an image coded/decoded by H.265/HEVC is higher than that of H.264/AVC. However, evaluation of the codec distortion is typically performed by comparing an original image input to an encoder with a decoded image output from a decoder. How signal conversion that is performed during capturing or displaying of an HDR video image or reduction or extension of a dynamic range affects the codec distortion is not well known.

The present inventors conducted an experiment in which multiple sample video images were converted into image signals in a signal format for the HDR, and after coding and decoding using an encoder and a decoder in accordance with H.264/AVC, image quality of HDR video images reproduced from the image signals after the decoding was verified. As a result, it was recognized that there were cases in which degradation of the image quality that was not sensed in SDR video images using the same samples was visually recognized in the HDR video images in the video codec. The degradation of the image quality significantly occurred in parts of the images mainly in the form of block noise or mosquito noise.

The degree of degradation occurring when the same 10-bit image signal is coded by the same video image coding scheme is typically similar. The reason that distortion that was not sensed (or hardly sensed) in the SDR video image was still detected in the HDR video image is considered to be because codec distortion was enlarged together when the dynamic range of the image signals after the decoding was extended.

Figure 2A:
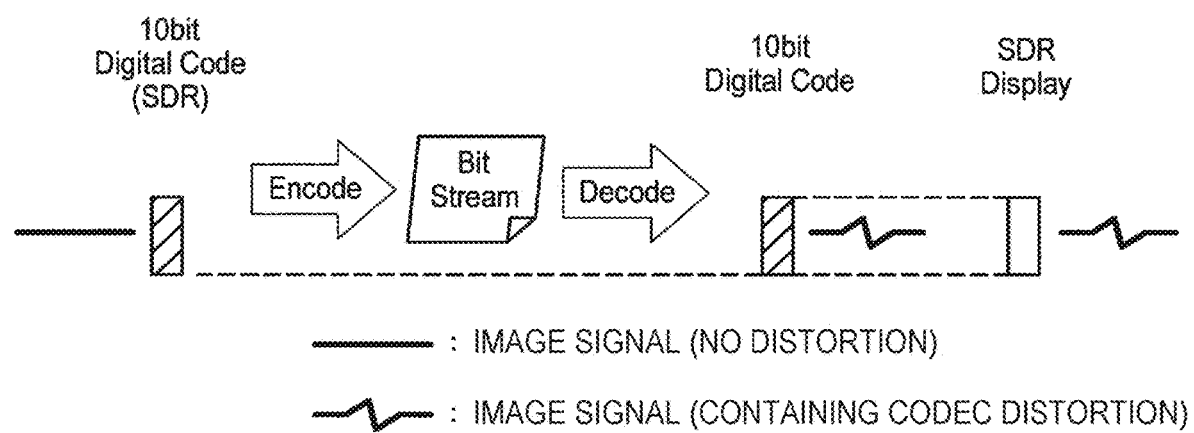
FIG. 2A is an explanatory diagram for explaining codec distortion of an image signal of an SDR video image.
Figure 2B:
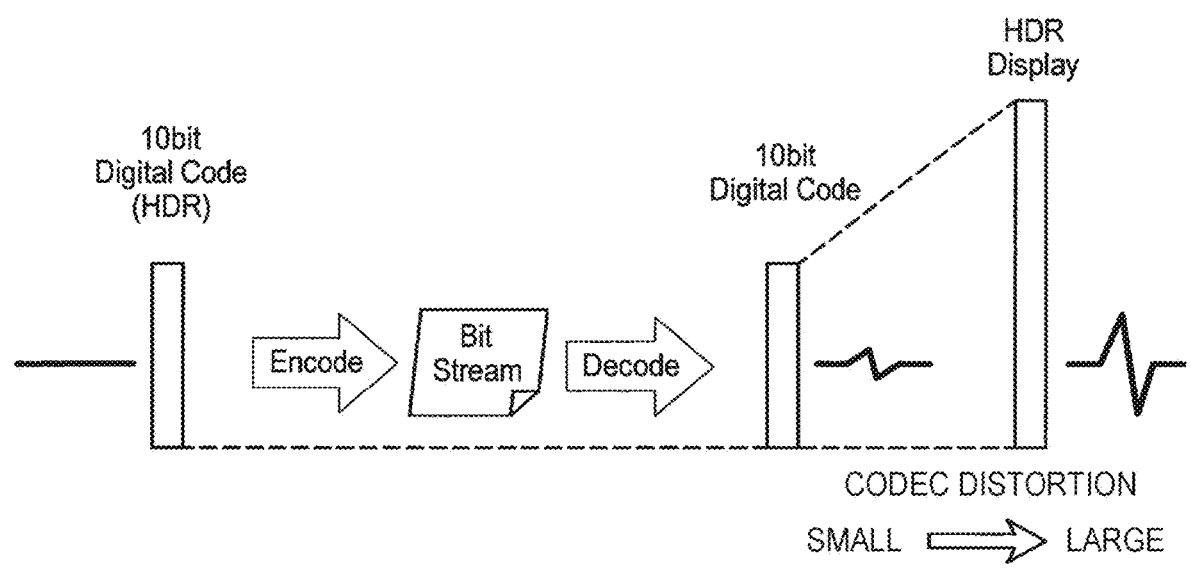
FIG. 2B is an explanatory diagram for explaining codec distortion of an image signal of an HDR video image.

FIG. 2A illustrates a state in which codec distortion occurs in an image signal of an SDR video image after coding and decoding. Since the codec distortion is not enlarged when the SDR video image is reproduced, the distortion is not subjectively sensed if the distortion is sufficiently small. Meanwhile, FIG. 2B illustrates a state in which codec distortion also occurs in an image signal of an HDR video image. When the HDR video image is reproduced, a probability of deterioration of image quality such as block noise or mosquito noise being subjectively sensed increases as a result of the enlargement of the codec distortion with the extension of the dynamic range.

Figure 2C:
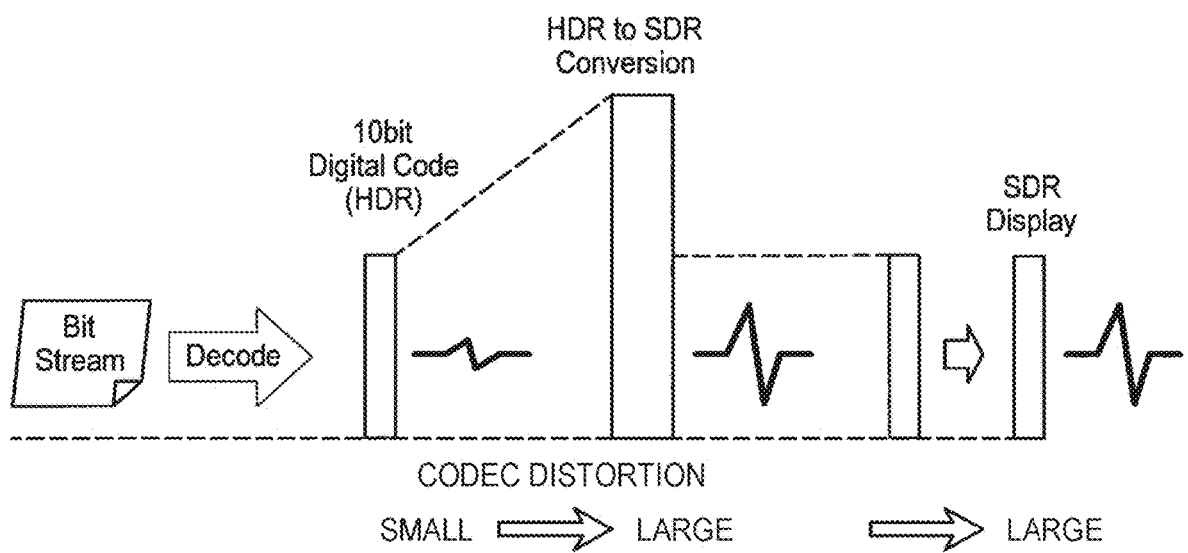
FIG. 2C is an explanatory diagram for explaining codec distortion that is enlarged through HDR-SDR conversion.

The codec distortion may also be enlarged when format conversion from the HDR to the SDR is executed on an image signal expressed in a signal format for the HDR. FIG. 2C illustrates a state in which codec distortion is enlarged after format conversion from the HDR to the SDR, that is, HDR-SDR conversion. The HDR-SDR conversion generally includes processing of restoring an image signal (obtained by decoding a coded bit stream, for example) to an original signal corresponding to an output of an image sensor with an inverse function of a transfer function corresponding to a signal format for the HDR and processing of reconverting the restored original signal into an image signal for the SDR with a transfer function corresponding to a signal format for the SDR. Codec distortion enlarged in the former processing is not reduced in the reconversion into the signal format for the SDR. Therefore, if the SDR video image is reproduced on the basis of the image signal after the HDR-SDR conversion, this may lead to a result in which the enlarged codec distortion is subjectively sensed.

If the codec distortion as described above is caused by performance of the video image coding scheme itself, the distortion should uniformly occur. However, in the aforementioned verification of the sample video images, it was confirmed that distortion significantly appeared in characteristic partial regions as listed below:

Specific color region (skin color region, for example)

Flat region (wall of building with no pattern, for example)

Distortion significantly appears in these partial regions because there is a difference in grayscale or colors in the actual world that the individual code values of color components represent depending on selection of a signal transfer function in a signal format for the HDR and a color range.

[1-3. Transfer Function]

Figure 3:
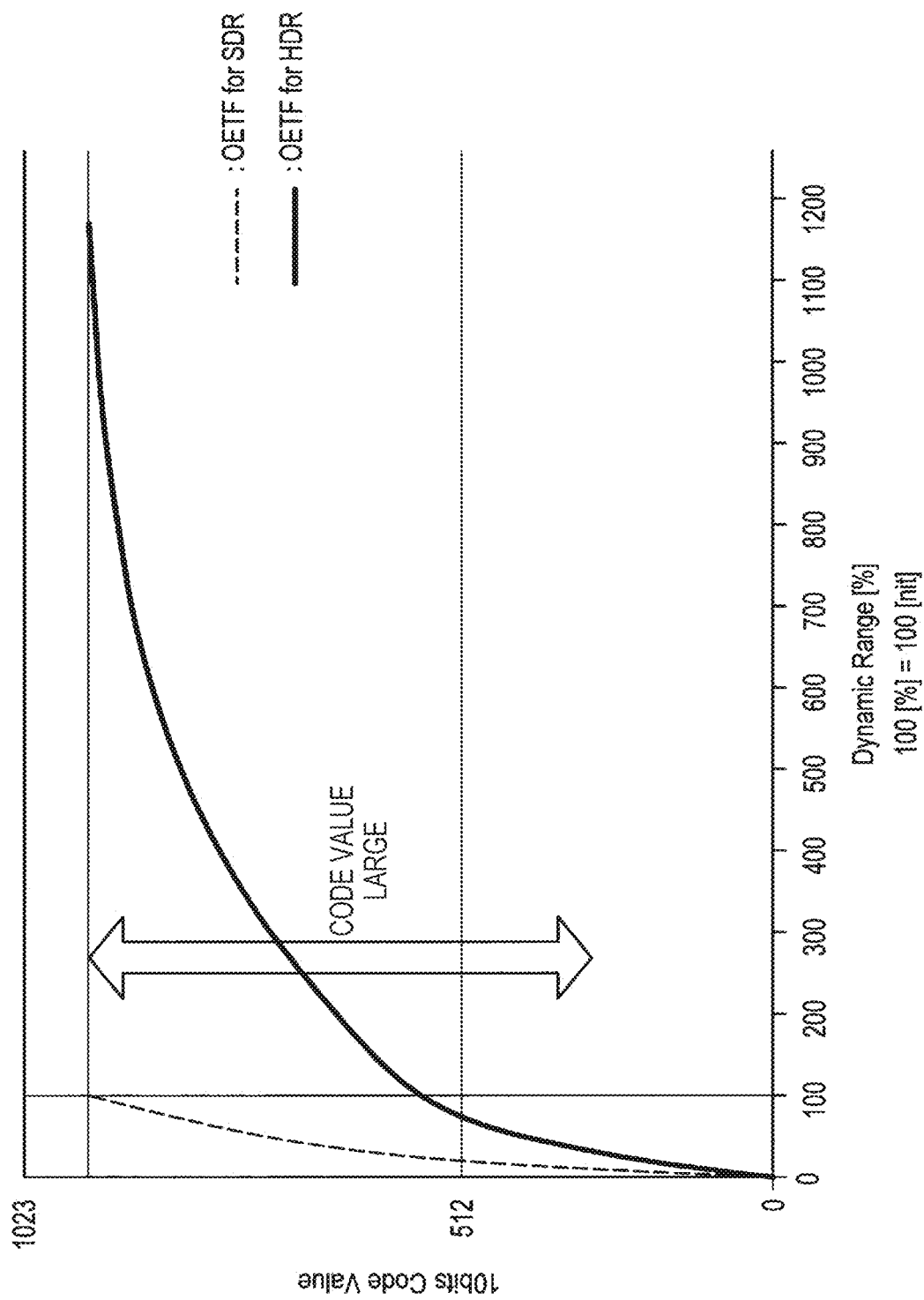
FIG. 3 is an explanatory diagram illustrating examples of OETF of a signal format for SDR and a signal format for HDR.

Typically, characteristics of signal conversion from light to image signals in an imaging device are modeled with an opto-electronic transfer function (OETF). FIG. 3 illustrates the respective examples of an OETF of a typical signal format for the SDR and an OETF of a typical signal format for the HDR. In FIG. 3, the horizontal axis represents a luminance dynamic range of light before conversion, and 100% corresponds to a luminance of 100 nits. The vertical axis represents a code value of an image signal after the conversion, and the code value may be a value from 0 to 1023 in the case of 10 bits. In comparison between the OETF of the signal format for the SDR (for example, BT.709) represented by a dashed line and the OETF for the HDR (for example, HLG; ST2084, or S-Log3) represented by a solid line in the drawing, a difference in inclination of the transfer functions significantly appears at a part in which the code value is relatively large, in particular. This means that image information is compressed at a higher compression ratio in the case of the HDR than in the case of the SDR, that is, a similar change in code value represents a greater change in grayscale in the case of the HDR than in the SDR, at such a part. In a case in which the respective transfer functions of a red (R) component, a green (G) component, and a blue (B) component are analyzed in an RGB color system, a difference in signal transmission properties between the HDR and the SDR similar to that in the graph illustrated in FIG. 3 is observed.

Figure 4:
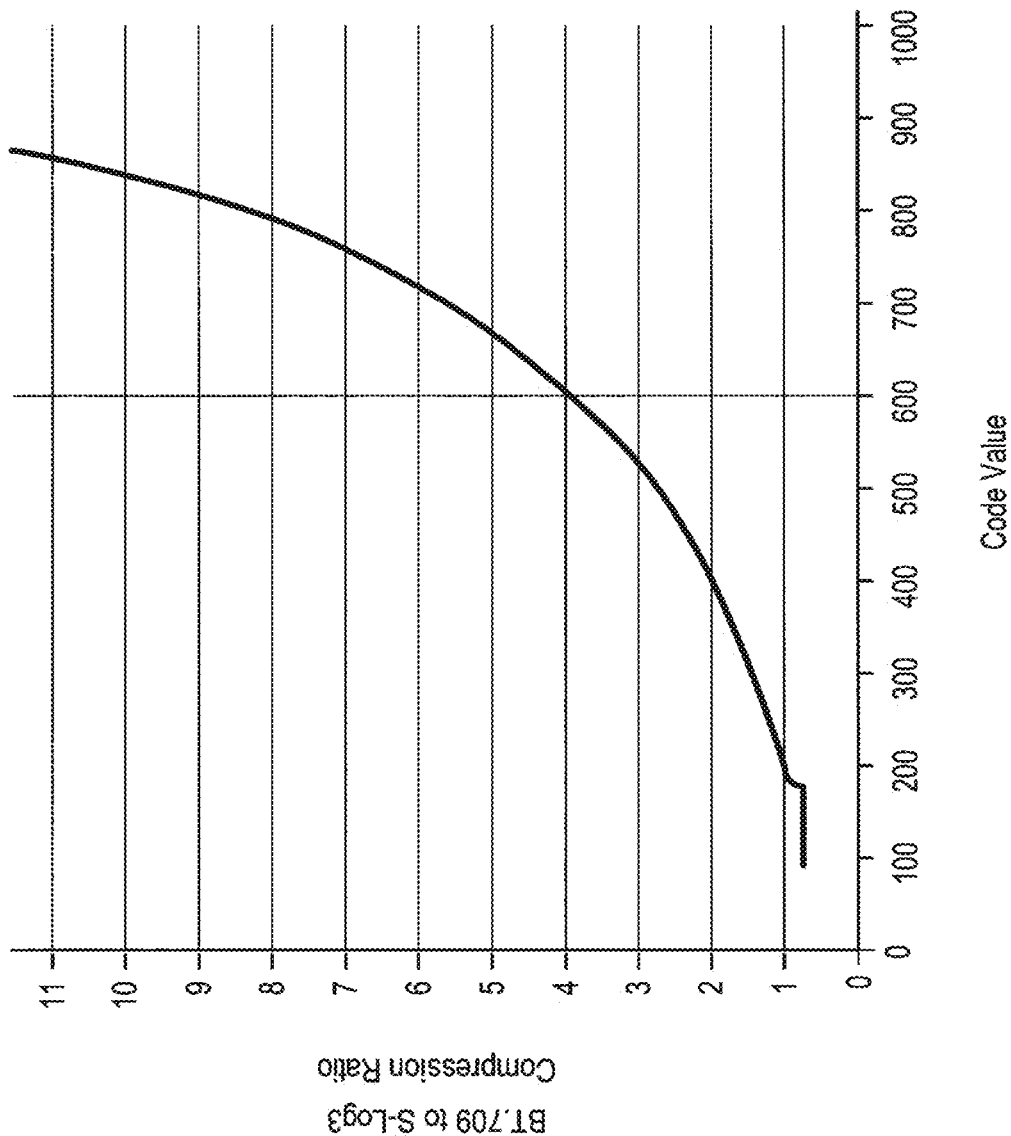
FIG. 4 illustrates a graph representing how much S-Log3 for HDR compresses image information with respect to BT.709 for SDR.

FIG. 4 illustrates a graph illustrating how much image information is compressed in a case of S-Log3 for the HDR with respect to BT.709 for the SDR. The horizontal axis in FIG. 4 represents a code value of a 10-bit image signal. The vertical axis represents a ratio of a compression ratio of S-Log3 with respect to a compression ratio of BT.709. The compression ratio of S-Log3 is about four times the compression ratio of BT.709 around a code value of "600" of S-Log3 corresponding to the luminance dynamic range of 100%, and the compression ratio of S-Log3 is relatively higher as the code value increases. It is also understood from this graph that the image information is more strongly compressed in the case of the HDR than in the case of the SDR at a part in which the code value is relatively large.

When an HDR video image is reproduced, a level of a voltage to be supplied to a display element may be decided by applying an electro-optical transfer function (EOTF) that is an inverse function of the OETF represented by the solid line in FIG. 3 to a code value of an image signal in many cases. Then, individual images included in the HDR video image are displayed in a luminance dynamic range extended by the application of the EOTF. A transfer function of the entire system including imaging to display is referred to as an OOTF, and the OOTF may be referred to as a system gamma. In the specification, "transfer function" means any one or a combination of two or more of the OETF, the EOTF, and the OOTF unless particularly stated otherwise. Such transfer functions may be referred to as tone curves.

[1-4. Color Range]

Figure 5:
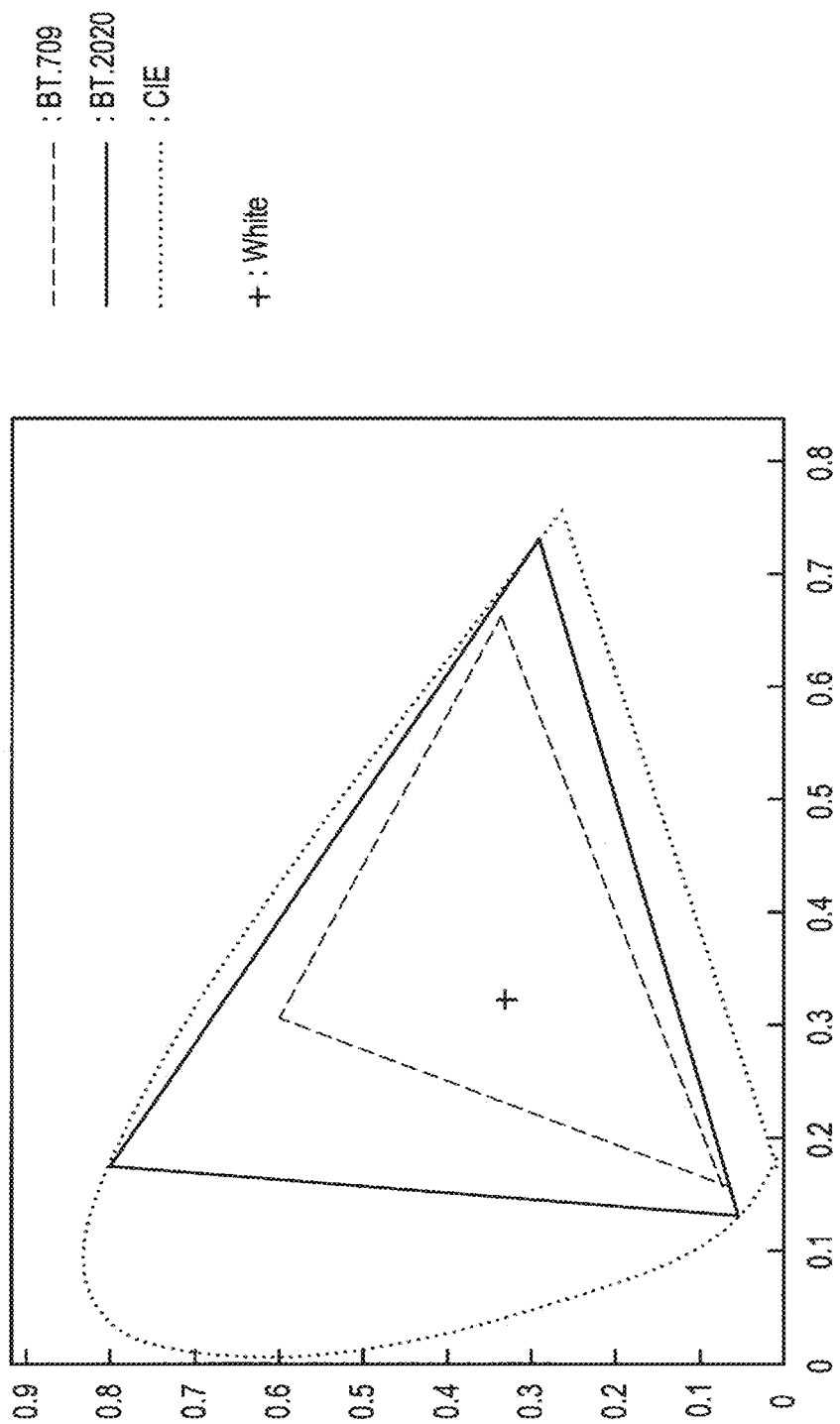
FIG. 5 is an explanatory diagram for explaining color ranges defined by BT.709 and BT.2020.

As a technology that enables more faithful reproduction of a state of the actual world and richer video image expression, a color range is also an important concept as well as the HDR. BT.2020 standardized by ITU-R defines a color range that enables clearer color expression than a color range of BT.709 that has been used in a large number of applications. FIG. 5 is an explanatory diagram for explaining color ranges defined by BT.709 and BT.2020. Referring to FIG. 5, a color range graph in which a three-dimensional color space is mapped in a two-dimensional plane using a predetermined constraint condition is illustrated. The cross mark in the graph represents a position at which the color white is mapped. The dashed line in the graph represents a range of colors that can be expressed in accordance with BT.709. The solid line in the graph represents a range of colors that can be expressed in accordance with BT.2020. The dotted line in the graph represents a range of colors that can be identified by a human sense of vision. As can be understood from FIG. 5, BT.2020 enables expression of more colors than BT.709. It is believed that BT.709 can express about 75% of the colors that exist in the actual world while BT.2020 can express about 99% or more of those colors. BT.2020 may be used as a color range for an SDR video image or may be used as a color range for an HDR video image.

2. First Embodiment

[2-1. Introduction]

The aforementioned codec distortion that significantly appears in partial regions in an image in a case in which a signal format for the HDR is used is caused by shortage of an assigned code value for expressing grayscale of an original signal in these partial regions. An encoder in accordance with a video image coding scheme such as MPEG-2, H.264/AVC, or H.265/HEVC quantizes the image signal in a frequency domain in order to achieve a required compression ratio. In general, a conversion coefficient obtained by orthogonally converting a prediction residual after an application of a prediction technology such as intra-prediction or inter-prediction is quantized. However, a scheme of deciding a quantization step that is used by encoders optimized for coding an SDR video image often becomes non-optimal in a case in which a signal format for the HDR is used.

The scheme of deciding the quantization step employed in some encoders may be expressed as Formula (1) below.

[Math. 1]

$$Q'_i = F(Act_{Bi}) \cdot Q_i \quad (1)$$

Here, $Q_i$ represents a temporary quantization step of an i-th block in an image, which is decided such that a required compression ratio in accordance with a purpose of an application is achieved irrespective of details of the image. $Q'_i$ represents a quantization step after adjustment in which the quantization step is adjusted on the basis of a coding difficulty for each block. $Act_{Bi}$ represents an activity that is statistically calculated for the i-th block. The activity is one index of the coding difficulty and is equal to a minimum value of dispersions calculated for each of a plurality of sub-blocks in a block, for example. Instead of the activity, a difference between a maximum code value and a minimum code value (this may also be referred to as a "dynamic range") or another parameter such as a quantization step itself before adjustment may be used as an index of the coding difficulty. A function $F(Act_{Bi})$ is a function that returns an adjustment coefficient of the quantization step using the activity (or another index of the coding difficulty) for each block as an argument. Two examples of the function $F(Act_{Bi})$ will be described below as $F_1$ and $F_2$.

[Math. 2]

$$F_1(Act_{Bi}) = G \cdot \frac{2Act_{Bi} + Act_{PIC}}{Act_{Bi} + 2Act_{PIC}} \quad (2)$$

$$F_2(Act_{Bi}) = \frac{G \cdot Act_{Bi} + Act_{PIC}}{Act_{Bi} + G \cdot Act_{PIC}} \quad (3)$$

$Act_{PIC}$ represents a representative value (for example, a mean, a median, a maximum, or the like) of the activity over the entire image. According to Formula (2), G corresponds to a ratio of the quantization step $Q'_i$ after adjustment with respect to the temporary quantization step $Q_i$ in a case in which the activity $Act_{Bi}$ is equal to the activity $Act_{PIC}$ over the entire image. If the activity $Act_{Bi}$ changes between zero and infinity, a return value of the function $F_1(Act_{Bi})$ changes between G/2 and 2G. The remaining items excluding G in the right side of Formula (2) serve to normalize the activity $Act_{Bi}$. According to Formula (3), G corresponds to an adjustment gain in a case in which the activity $Act_{Bi}$ is zero (that is, in a case in which the i-th block is completely flat). If the activity $Act_{Bi}$ changes between zero and infinity, the return value of the function $F_2(Act_{Bi})$ changes between 1/G and G. In this specification, G described above will be referred to as a basic adjustment gain. In the case of Formula (3), G may be referred to as a maximum adjustment gain, a maximum protection ratio, or the like.

According to Formula (2) or (3), the quantization step $Q'_i$ after adjustment is adjusted to a smaller value in a case in which the image of the i-th block $B_i$ is relatively flatter than the other blocks. The conversion coefficient of a certain block is more finely quantized as the quantization step used for the block is smaller. This means that a larger code amount is assigned to the block, that is, grayscale of the image of the block is maintained with smaller loss.

Figure 6:
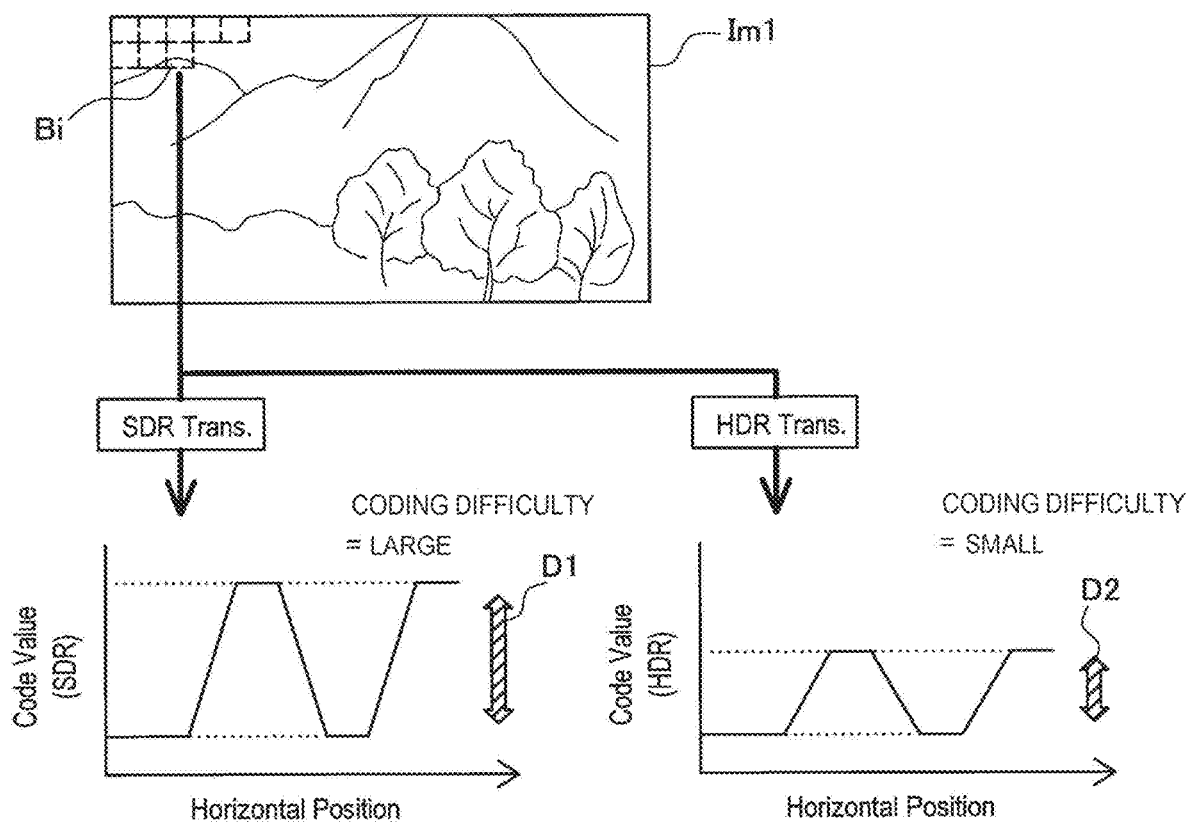
FIG. 6 is an explanatory diagram for explaining influences of a difference in types of transfer functions on a coding difficulty.

However, in the case of the HDR, grayscale information is more strongly compressed during signal conversion than in the case of the SDR. Therefore, if apparent complication in the actual world (or flatness in an opposite sense) is similar, the coding difficulty calculated from the code value of the image signal in the case of the HDR is smaller than that in the case of the SDR. An image Im1 is illustrated as an example in the upper section of FIG. 6. The block Bi is the i-th block set in the image Im1. As for the block Bi, the coding difficulty calculated from an image signal in the case in which the transfer function for the HDR is applied (the arrow D2 on the lower right side in the drawing) is smaller than the coding difficulty calculated from an image signal in the case in which the transfer function for the SDR is applied (the arrow D1 on the lower left side in the drawing). In order to provide similar protection of subjective image quality for two such image signals with different degrees of information compression, it is desirable that a gain included in the function F in Formula (1) (for example, the basic adjustment gain G in Formula (2) or (3)) be variably set to cancel variation in a statistical value that accompanies the compression of the information.

Even in a case in which a wider color range is used as the color region of BT.2020 described with reference to FIG. 5, color information is more strongly compressed as compared with a case in which a narrower color range is used as BT.709, for example. Therefore, in order to provide similar protection of subjective image quality for two image signals with different color ranges applied instead of different transfer functions, it is still desirable that flexible control be performed to compensate for a part corresponding to the compression of the information when the quantization step is decided.

Thus, an embodiment for flexibly deciding a quantization step on the basis of what type of transfer function or color range is applied to an image and providing improved protection in terms of subjective image quality will be described in this section.

[2-2. Outline of System]

Figure 7A:
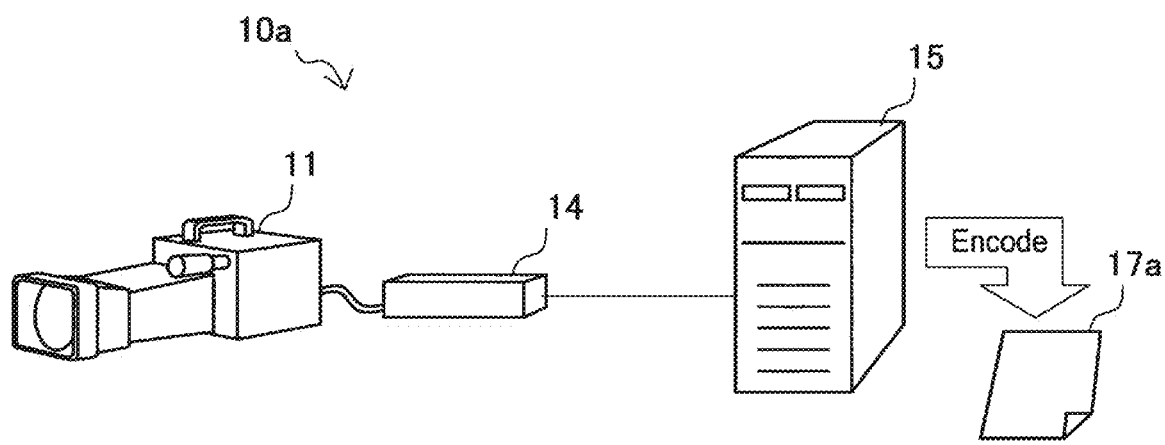
FIG. 7A is an explanatory diagram illustrating a first example of a configuration of an image processing system according to an embodiment.

FIG. 7A is an explanatory diagram illustrating a first example of a configuration of an image processing system according to the embodiment. An image processing system 10a illustrated in FIG. 7A includes an imaging device 11, a signal processing device 14, and a server device 15.

The imaging device 11 may be a digital video camera, a digital still camera, or an arbitrary type of device with a video image capturing function (for example, a monitoring camera, a web camera, an information terminal, or the like), for example.

The imaging device 11 images a state of an actual world using an image sensor and generates a primitive image signal. The signal processing device 14 may be a baseband processing unit (BPU), for example, and is connected to the imaging device 11. The signal processing device 14 executes AD conversion and digital signal processing on the primitive image signal generated by the imaging device 11 and generates an image signal in a predetermined signal format. The digital signal processing executed by the signal processing device 14 may include gamma correction and color conversion, for example. The signal processing device 14 may be integrally formed with the imaging device 11.

The signal processing device 14 may generate an image signal with a transfer function and a color range selected by a user from a plurality of candidates via any user interface. In one example, the candidates of the transfer function may include BT.709 for the SDR and HLG, ST2084, and S-Log3 for the HDR. Also, the candidates of the color range may include BT.709, BT.2020, and S-Gamut.

The signal processing device 14 multiplexes a sound signal and an auxiliary signal including metadata as needed with the image signal generated as a result of the signal conversion and outputs the multiplexed signals to the server device 15. The server device 15 is an image processing device that is connected to the signal processing device 14 with a signal line in accordance with a transmission protocol such as a serial digital interface (SDI) or HD-SDI, for example. The server device 15 acquires the image signal transmitted from the signal processing device 14, codes the image by a predetermined video image coding scheme, and generates a coded bit stream 17a. The coded bit stream 17a may be stored in a storage device inside or outside the server device 15 or may be transmitted to another device (for example, a display device) connected to the server device 15.

Figure 7B:
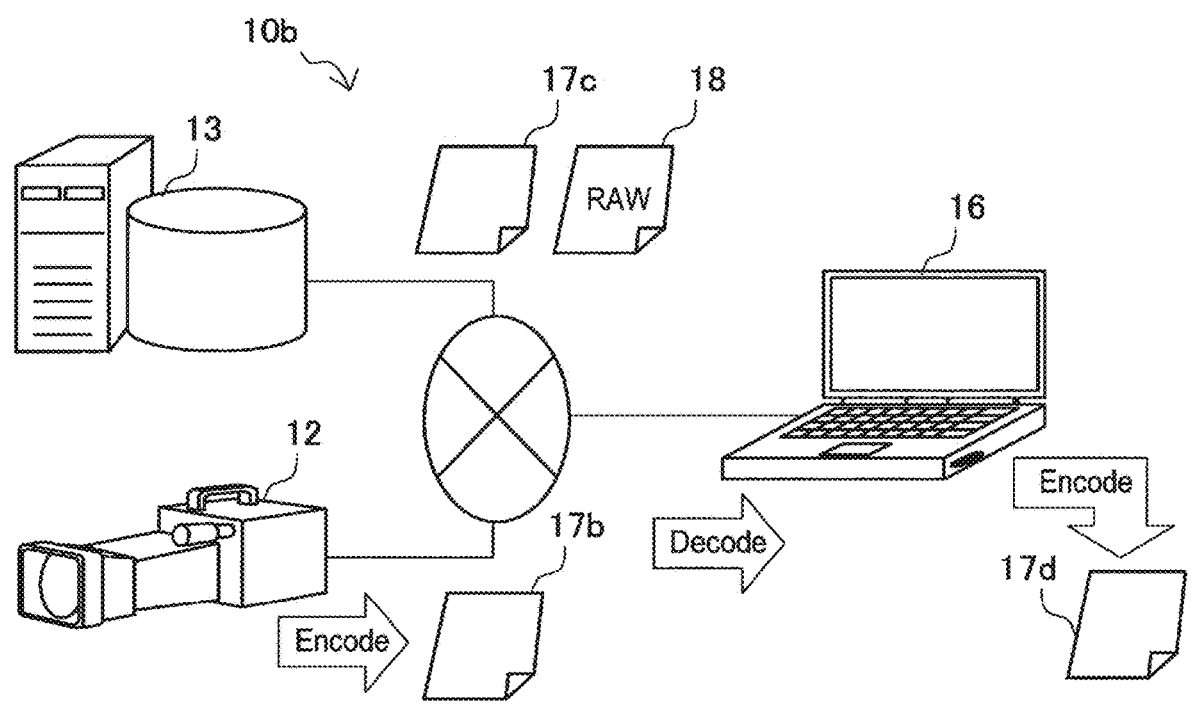
FIG. 7B is an explanatory diagram illustrating a second example of a configuration of an image processing system according to an embodiment.

FIG. 7B is an explanatory diagram illustrating a second example of the configuration of the image processing system according to the embodiment. An image processing system 10b illustrated in FIG. 7B includes an imaging device 12, a storage device 13, and a terminal device 16.

The imaging device 12 may be a digital video camera, a digital camcorder, a digital still camera, or an arbitrary type of device with a video image capturing function, for example. The imaging device 12 images a state of an actual world using an image sensor and generates a primitive image signal. In addition, the imaging device 12 executes AD conversion and a digital signal processing as described above in relation to the signal processing device 14 and generates an image signal in a predetermined signal format. The imaging device 12 may generate an image signal with a transfer function and a color range selected by a user from a plurality of candidates via any user interface similarly to the signal processing device 14.

The imaging device 12 codes the image by a predetermined video image coding scheme and generates a coded bit stream 17b on the basis of the image signal generated as a result of the signal conversion. The coded bit stream 17b may be stored as a video image file or may be provided to the storage device 13 or the terminal device 16 via a network, for example.

The storage device 13 is a data storage that stores various kinds of video image data. The storage device 13 may store a video image file 17c generated by coding the image by a predetermined video image coding scheme, for example. In a header reason in the video image file, a type of a transfer function related to conversion between light and an image signal that is applied to video image content included in the video image file, a type of a color range, and a parameter for identifying each video image coding scheme can be included, for example. The storage device 13 may store a RAW video image file 18 that records the image signal before the coding (or the signal conversion) as RAW data. The storage device 13 provides a file that the user desires to reproduce or edit to the terminal device 16 via a network in response to a request from the terminal device 16, for example.

The terminal device 16 is an image processing device that has a function of reproducing or editing a video image file generated by the imaging device 12 or stored in the storage device 13. The terminal device 16 may decode a coded bit stream included in the video image file 17b or 17c acquired from the imaging device 12 or the storage device 13 and generate a decoded image signal, for example. Also, the terminal device 16 may execute dynamic range conversion (for example, HDR-SDR conversion or SDR-HDR conversion) on the thus generated decoded image. Further, the terminal device 16 may code an image signal included in the RAW video image file 18 or a decoded image signal after the dynamic range conversion by a predetermined video image coding scheme and generate a coded bit stream 17d.

All of the server device 15 in the example of FIG. 7A and the imaging device 12 and the terminal device 16 in the example of FIG. 7B function as image processing devices (that is, encoders) that code an image. In the embodiment, a parameter related to quantization processing is controlled on the basis of at least one of the transfer function and the color range applied to an image (for example, on the basis of the type thereof or other attributes) when these image processing devices code an image, and degradation of image quality is thus reduced. In the following sections, specific and exemplary configurations of such image processing device will be described in detail.

[2-3. Schematic Configuration of Image Processing Device]

FIG. 8A is a block diagram illustrating a first example of a schematic configuration of an image processing device according to the embodiment. An image processing device 100a illustrated in FIG. 8A may be the server device 15 in the example in FIG. 7A or the imaging device 12 or the terminal device 16 (or an image processing module mounted on any of these devices) in the example in FIG. 7B, for example. The image processing device 100a includes a signal acquisition unit 101, an information acquisition unit 103, a coding unit 110, and a control unit 140.

The signal acquisition unit 101 acquires an input image signal generated on the basis of a transfer function related to conversion between light and an image signal. The signal acquisition unit 101 may acquire the input image signal from an external device via a transmission interface or may acquire the input image signal from an imaging module and a signal processing module (not illustrated) that are integrally configured with the image processing device 100a.

The information acquisition unit 103 acquires input information related to a transfer function and a color range applied to an image input to the coding unit 110. In one example, the information acquisition unit 103 may acquire the input information via a user interface that the image processing device 100a has. The user interface may be provided by a physical input device such as a touch panel, a button, or a switch, for example, provided in a case body of the image processing device 100a. Instead, the user interface may be provided as a graphical user interface (GUI) on a terminal device that is connected in a remote manner via a communication interface. In the embodiment, the input information includes at least a transfer function type indicating the type of the transfer function applied to the image to be coded and a color range type indicating the type of the color range applied to the image. The user interface may allow the user to select one of a plurality of candidates of the type of the transfer function that may include BT.709 for the SDR and HLG; ST2084, and S-Log3 for the HDR, for example. Also, the user interface may allow the user to select one of a plurality of candidates of the type of the color range that may include BT.709, BT.2020, and S-Gamut.

In another example, the information acquisition unit 103 may acquire the input information from an auxiliary signal to be multiplexed with the input image signal. For example, the auxiliary signal is received by the signal acquisition unit 101 in a period (for example, a blanking period) during which the image signal is not transmitted on a signal line. Then, the information acquisition unit 103 may acquire the input information that includes the transfer function type and the color range type from an auxiliary signal separated by the signal acquisition unit 101. Also, the information acquisition unit 103 may access an external data source and acquire necessary input information.

The coding unit 110 codes the image expressed by the image signal that is acquired by the signal acquisition unit 101 and generates a coded bit stream. The coding unit 110 may execute the coding processing in accordance with any video image coding scheme such as MPEG-2, H.264/AVC, or H.265/HEVC, for example. The coding processing executed by the coding unit 110 is processing that typically includes a variety of kinds of arithmetic operation processing such as prediction, orthogonal conversion, quantization, and entropy coding, and in particular, quantization is processing that includes lossy compression for achieving a required compression ratio for the quantization, in particular.

The control unit 140 controls quantization processing that is executed by the coding unit 110 on the basis of at least one of the transfer function type or the color range type indicated by the input information that is acquired by the information acquisition unit 103. For example, the control unit 140 may cause the coding unit 110 to adjust the quantization step in the quantization processing with an adjustment gain that differs depending on what type of transfer function is applied to the image. Also, the control unit 140 may cause the coding unit 110 to adjust the quantization step in the quantization processing with an adjustment gain that differs depending on what type of color range is applied to the image. Note that although an example in which a processing parameter such as a quantization step is decided on the basis of the types of the transfer function and the color range will be mainly described here, the processing parameter may be decided on the basis of other attributes. The same applies to a second embodiment to be described later.

Figure 8B:
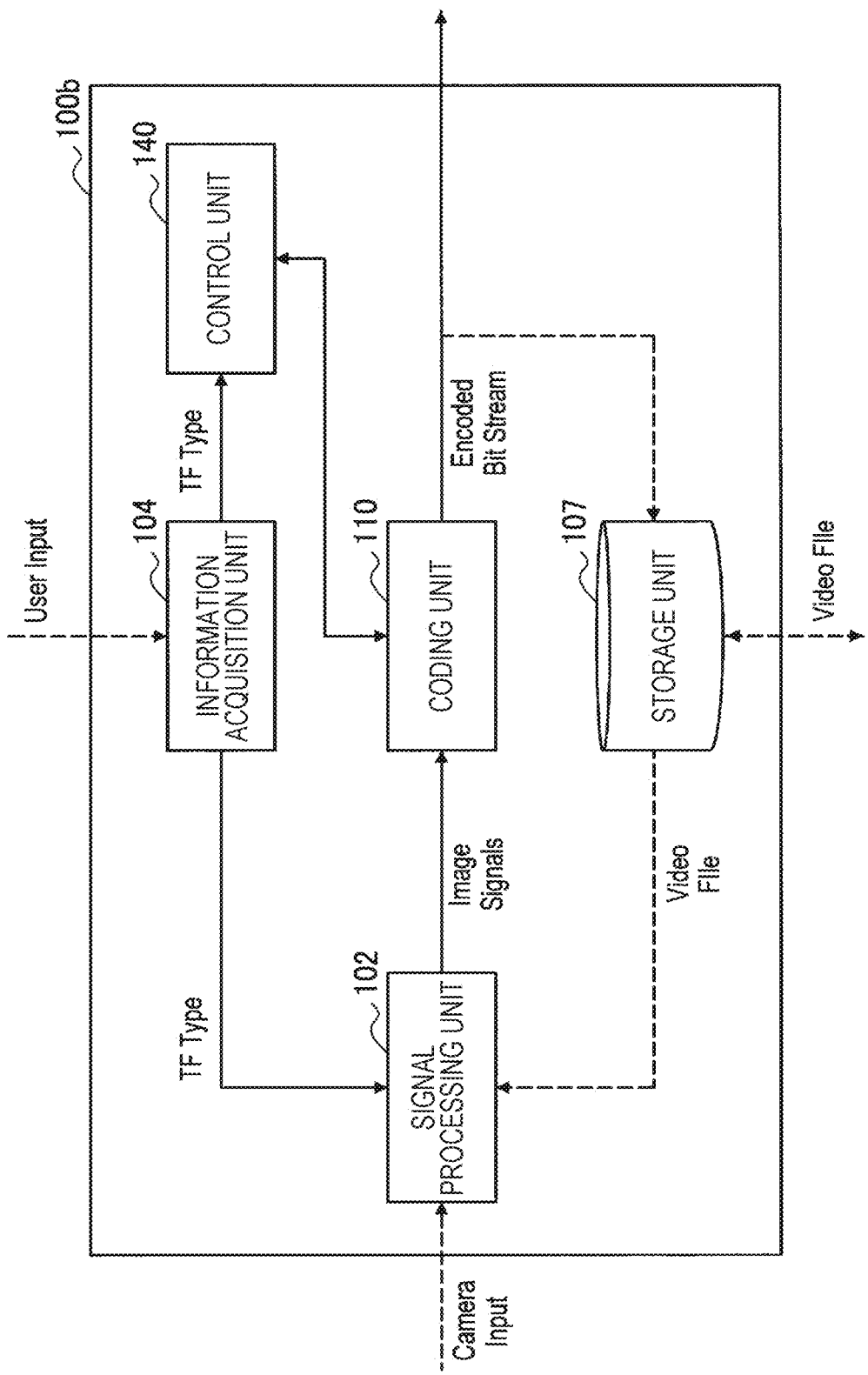
FIG. 8B is a block diagram illustrating a second example of schematic configurations of an image processing device according to a first embodiment.

FIG. 8B is a block diagram illustrating a second example of a schematic configuration of an image processing device according to the embodiment. An image processing device 100b illustrated in FIG. 8B may also be the server device 15 in the example in FIG. 7A or the imaging device 12 or the terminal device 16 (or an image processing module mounted on any of these devices) in the example in FIG. 7B, for example. The image processing device 100b includes a signal processing unit 102, an information acquisition unit 104, a storage unit 107, a coding unit 110, and a control unit 140.

The signal processing unit 102 acquires a primitive image signal input from the imaging device via any transmission interface or a signal line in the device or acquires an image signal from a video image file stored in the storage unit 107. Then, the signal processing unit 102 executes digital signal processing that may include gamma correction and color conversion, for example, on the primitive image signal and generates an image signal as a target of coding in a predetermined signal format. The transfer function and the color range applied to the image by the signal processing unit 102 are decided on the basis of the input information acquired by the information acquisition unit 104. Then, the signal processing unit 102 outputs the generated image signal to the coding unit 110.

The information acquisition unit 104 acquires the input information related to the transfer function and the color range applied to the image that is coded by the coding unit 110. For example, the information acquisition unit 104 may acquire the input information via a user interface (provided by a physical input device or provided as a GUI) that the image processing device 100b has. As described above, the input information includes at least the transfer function type and the color range type. The user interface may allow the user to select one of a plurality of candidates of the type of transfer function that may include BT.709 for the SDR and HLGc ST2084, and S-Log3 for the HDR, for example. Also, the user interface may allow the user to select one of a plurality of candidates of the type of the color range that may include BT.709, BT2020, and S-Gamut.

The storage unit 107 is a storage device for storing various kinds of video image data. The storage unit 107 may store a video image file that records the digital image signal before the signal conversion, for example. The user may cause the storage unit 107 to store the video image file acquired from an external storage medium via an input and output interface (not illustrated) that the image processing device 100b has. Also, the storage unit 107 may store the video image file including the coded bit stream that is generated as a result of the coding processing executed by the coding unit 110. The video image file may be output to an external device in response to a request.

Similarly to the first example described with reference to FIG. 8A, the coding unit 110 codes an image expressed by an image signal input from the signal processing unit 102 and generates a coded bit stream. The control unit 140 controls quantization processing that is executed by the coding unit 110 on the basis of at least one of the transfer function type or the color range type indicated by the input information that is acquired by the information acquisition unit 104. The coded bit stream generated by the coding unit 110 may be transmitted to a device outside the image processing device 100b or may be stored as a video image file by the storage unit 107.

[2-4. Detailed Configurations of Coding Unit and Control Unit]

Figure 9:
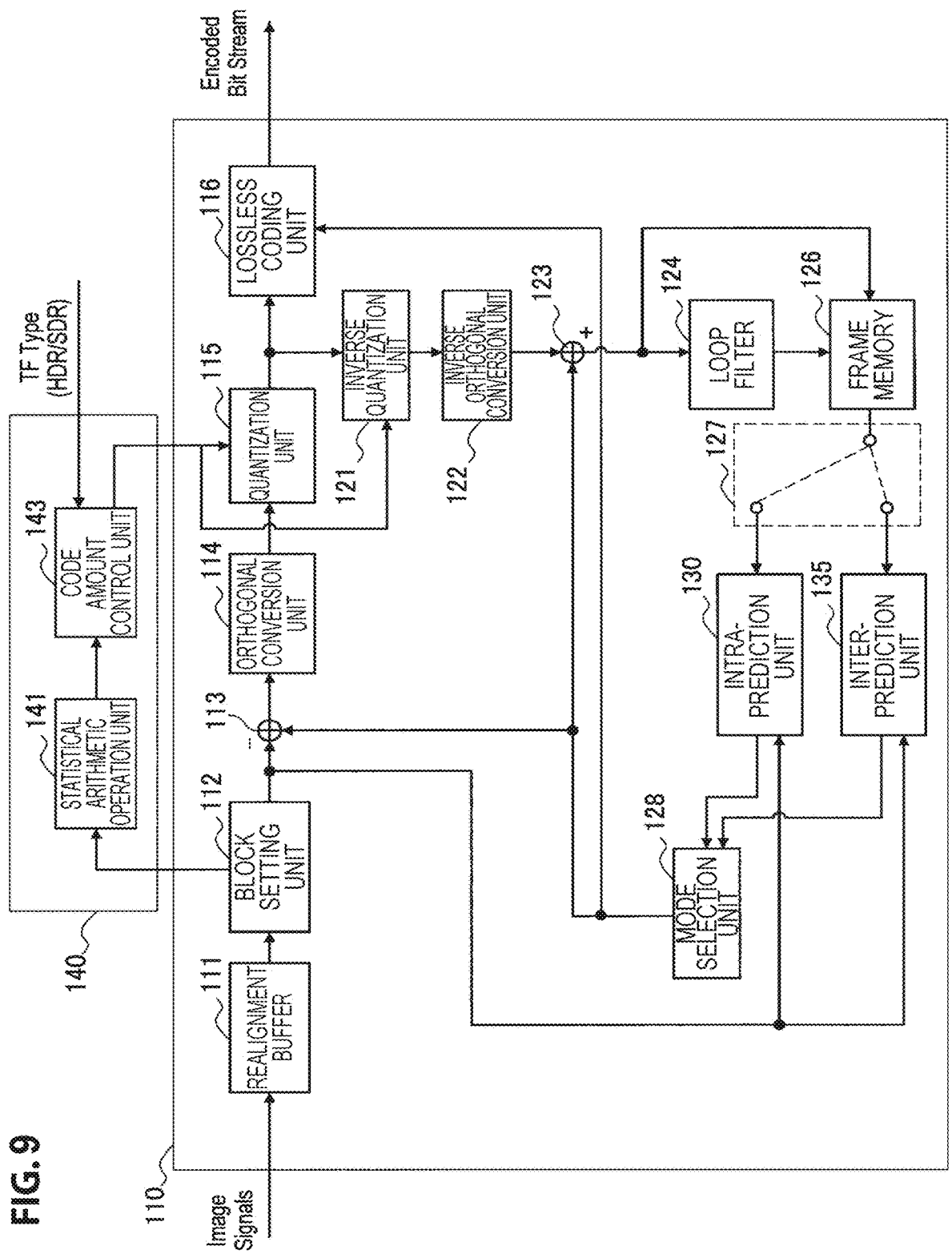
FIG. 9 is a block diagram illustrating an example of detailed configurations of a control unit and a coding unit according to the first embodiment.

In this section, more specific configurations of the coding unit 110 and the control unit 140 illustrated in FIGS. 8A and 8B will be described in detail. FIG. 9 is a block diagram illustrating an example of detailed configurations of the coding unit and the control unit according to the first embodiment.

(1) Coding Unit

Referring to FIG. 9, the coding unit 110 includes a realignment buffer 111, a block setting unit 112, a subtraction unit 113, an orthogonal conversion unit 114, an quantization unit 115, a lossless coding unit 116, an inverse quantization unit 121, an inverse orthogonal conversion unit 122, an addition unit 123, a loop filter 124, a frame memory 126, a switch 127, a mode selection unit 128, an intra-prediction unit 130, and an inter-prediction unit 135.

The realignment buffer 111 realigns image data of a series of images expressed by image signals that are acquired by the signal acquisition unit 101 or the signal processing unit 102 in accordance with a group-of-picture (GOP) structure. The realignment buffer 111 outputs image data after the realignment to the block setting unit 112, the intra-prediction unit 130, and the inter-prediction unit 135.

The block setting unit 112 divides each images corresponding to pictures into a plurality of blocks. In MPEG-2 and H.264/AVC, a picture is divided in a grid pattern into a plurality of macro-blocks with a fixed size, and coding processing is executed in processing units of the respective macro-blocks. The quantization processing may be executed in processing units of smaller sub-blocks set in each macro-block. In H.265/HEVC, a picture is divided in a quadtree pattern into a plurality of encoding units (coding units) with a variable size, and the coding processing is executed in processing units of the respective CUs. Quantization Processing may be executed using smaller conversion units (transform units) set for each CU as the processing units.

The subtraction unit 113 calculates prediction residual data that is a difference between image data and a predicted image data input from the block setting unit 112 and outputs the prediction residual data to the orthogonal conversion unit 114.

The orthogonal conversion unit 114 converts the prediction residual data input from the subtraction unit 113 from image data in a spatial region into conversion coefficient data in a frequency region. Orthogonal conversion executed by the orthogonal conversion unit 114 may be, for example, discrete cosine conversion, discrete sine conversion, or the like. Then, the orthogonal conversion unit 114 outputs conversion coefficient data to the quantization unit 115

The quantization unit 115 quantizes conversion coefficient data input from the orthogonal conversion unit 114. For example, the quantization step may be set to be small in a case in which free capacity of a buffer or a transmission path relative to the size of the coded bit stream to be output is large, and the quantization step may be set to be large in a case in which the free capacity is small in contrast. More specifically, the quantization unit 115 temporarily decides the quantization step for each block such that a required compression ratio is achieved and further adjusts the quantization step in accordance with a coding difficulty for each block. Then, the quantization unit 115 quantizes the conversion coefficient data in the quantization step after adjustment. The conversion coefficient data after the quantization (hereinafter referred to as quantized data) is output to the lossless coding unit 116 and the inverse quantization unit 121.

Adjustment of the quantization step by the quantization unit 115 may be performed in accordance with Formula (1) described above. The function $F(Act_{Bi})$ in Formula (1) includes a processing parameter that represents an adjustment gain of the quantization step. The quantization step is adjusted to a smaller value as the adjustment gain increases, and as a result, the code amount assigned to the block increases. One example of the parameter representing the adjustment gain is the basic adjustment gain G included in Formulae (2) and (3). In this case, the quantization unit 115 executes the quantization processing on each block in the quantization step after the adjustment in which the quantization step is adjusted on the basis of the basic adjustment gain G and the coding difficulty $Act_{Bi}$ of each block. The quantization unit 115 may use a different quantization step for each color component. Also, the adjustment of the quantization step may be performed using a processing parameter that is different for each color component.

The lossless coding unit 116 codes the quantized data input from the quantization unit 115, thereby generating a coded bit stream. Also, the lossless coding unit 116 codes various parameters that are referred by the decoder and inserts the coded parameters into the coded bit stream. The parameters coded by the lossless coding unit 116 may include information related to the transfer function, information related to the color range, and information related to the quantization parameter. The lossless coding unit 116 outputs the generated coded bit stream to an output destination in accordance with a purpose of the application.

The inverse quantization unit 121, the inverse orthogonal conversion unit 122, and the addition unit 123 are included in a local decoder. The local decoder serves to reconstruct an original image from the coded data.

The inverse quantization unit 121 inversely quantizes the quantized data in the quantization step that is the same as that used by the quantization unit 115 and restores the conversion coefficient data. Then, the inverse quantization unit 121 outputs the restored conversion coefficient data to the inverse orthogonal conversion unit 122.

The inverse orthogonal conversion unit 122 executes inverse orthogonal conversion processing on the conversion coefficient data input from the inverse quantization unit 121, thereby restoring prediction residual data. Then, the inverse orthogonal conversion unit 122 outputs the restored reproduction residual data to the addition unit 123.

The addition unit 123 adds the restored prediction residual data input from the inverse orthogonal conversion unit 122 and the prediction image data generated by the intra-prediction unit 130 or the inter-prediction unit 135, thereby generating decoded image data. Then, the addition unit 123 outputs the generated decoded image data to a loop filter 124 and a frame memory 126.

The loop filter 124 is an in-loop filter for the purpose of improving image quality of a decoded image. The loop filter 124 may include a deblock filter for reducing block distortion that appears in the decoded image, for example. Also, the loop filter 124 may include an adaptive offset filter for adding an edge offset or a band offset to the decoded image. The loop filter 124 outputs decoded image data after the filtering to the frame memory 126.

The frame memory 126 stores decoded image data before the filtering input from the addition unit 123 and decoded image data after the application of the in-loop filter input from the loop filter 124.

The switch 127 reads the decoded image data before the filtering that is used for intra-prediction from the frame memory 126 and supplies the read decoded image data as reference image data to the intra-prediction unit 130. Also, the switch 127 reads the decoded image data after the filtering that is used for inter-prediction from the frame memory 126 and supplies the read decoded image data as reference image data to the inter-prediction unit 135.

The mode selection unit 128 selects a prediction method for each block on the basis of comparison of cost input from the intra-prediction unit 130 and the inter-prediction unit 135. The mode selection unit 128 outputs prediction image data generated by the intra-prediction unit 130 to the subtraction unit 113 and outputs information related to intra-prediction to the lossless coding unit 116 for a block for which intra-prediction is selected. Also, the mode selection unit 128 outputs prediction image data generated by the inter-prediction unit 135 to the subtraction unit 113 and outputs information related to inter-prediction to the lossless coding unit 116 for a block for which inter-prediction is selected.

The intra-prediction unit 130 executes intra-prediction processing on the basis of original image data and decoded image data. For example, the intra-prediction unit 130 evaluates cost that is estimated to occur for each of a plurality of candidate modes included in a search range. Next, the intra-prediction unit 130 selects a prediction mode in which the cost becomes minimum as an optimal prediction mode. Also, the intra-prediction unit 130 generates prediction image data in accordance with the selected optimal prediction mode. Then, the intra-prediction unit 130 outputs information related to intra-prediction including prediction mode information indicating the optimal prediction mode, corresponding cost, and the predicted image data to the mode selection unit 128.

The inter-prediction unit 135 executes inter-prediction processing (motion compensation) on the basis of original image data and decoded image data. For example, the inter-prediction unit 135 evaluates cost that is estimated to occur for each of a plurality of candidate modes included in a search range. Next, the inter-prediction unit 135 selects a prediction mode in which cost becomes minimum as an optimal prediction mode. Also, the inter-prediction unit 135 generates prediction image data in accordance with the selected optimal prediction mode. Then, the inter-prediction unit 135 outputs information related to inter-prediction, corresponding cost, and the prediction image data to the mode selection unit 128.

(2) Control Unit

Referring to FIG. 9, the control unit 140 includes a statistical arithmetic operation unit 141 and a quantization control unit 143.

The statistical arithmetic operation unit 141 calculates a coding difficulty over the entire image and a coding difficulty of each block set in the image. For example, the statistical arithmetic operation unit 141 may calculate the activity $Act_{Bi}$ and $Act_{PIC}$ described above as the coding difficulties. Then, the statistical arithmetic operation unit 141 outputs these calculated statistical values to the quantization control unit 143.

The quantization control unit 143 determines the transfer function and the color range applied to the image to be coded on the basis of the input information input from the information acquisition unit 103 or 104. Then, the quantization control unit 143 decides a basic adjustment gain to be used for the adjustment of the quantization step on the basis of the transfer function, the color range, or the combination thereof. More specifically, the quantization control unit 143 may decide the basic adjustment gain to cancel influences of a change in a code value of an image signal due to a difference in one of or both the transfer function and the color range on the quantization processing. The influences described here typically appear as a variation in a degree of codec distortion that occurs as a result of quantization and may be sensed as deterioration of subjective image quality. The degree of codec distortion can be evaluated using the aforementioned index of PSNR. For example, it is possible to decide a value of the basic adjustment gain to cancel the aforementioned influences for each transfer function, for each color range, or for each combination thereof by evaluating a change in the PSNR or verifying subjective image quality by causing the adjustment gain to change in the previous tuning, and the thus decided value of the basic adjustment gain may be stored in the storage unit 107. Then, the quantization control unit 143 reads one value decided in advance corresponding to the transfer function, the color range, or the combination thereof from the storage unit 107, for example, and decides the value as the value of the basic adjustment gain to be used for the adjustment of the quantization step.

Figure 10:
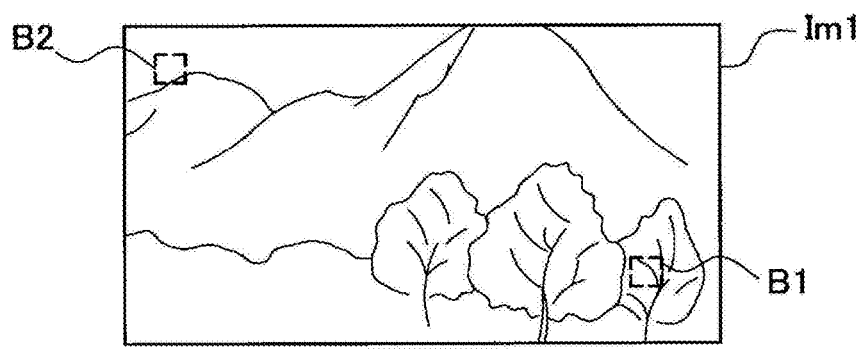
FIG. 10 is an explanatory diagram illustrating examples of a block with a high coding difficulty and a block with a low coding difficulty.
Figure 11:
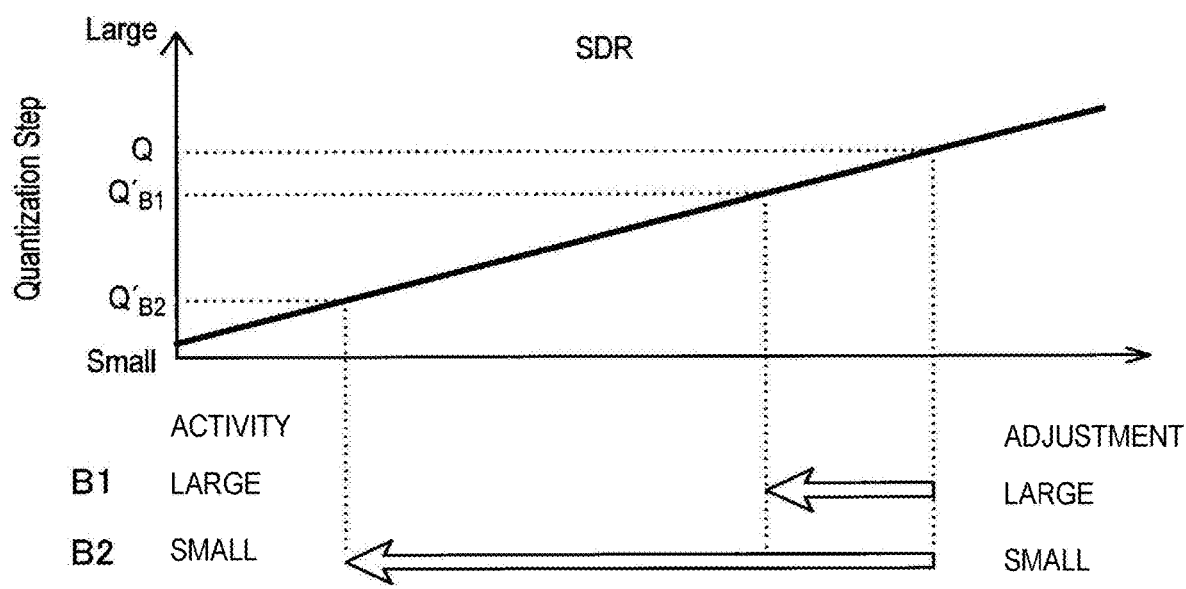
FIG. 11 is an explanatory diagram for explaining an example of adjustment of a quantization step in the case of an SDR.

Hereinafter, the meaning of dynamic decision of the basic adjustment gain will be described with reference to FIGS. 10 to 13. FIG. 10 illustrates an image Im1 that is similar to that exemplified in FIG. 6. A block B1 is located in a region with relatively complicated image details in the image Im1, and a block B2 is located in a region with relatively flat image details in the image Im1. FIG. 11 illustrates an example of adjustment of a quantization step in the case of the SDR (for example, the transfer function is BT.709). Here, it is assumed that both quantization steps that are temporarily decided for the blocks B1 and B2 are equal to Q. The quantization step of the block B1 with the higher coding difficulty (greater activity) is adjusted to $Q'_{B1}$. Meanwhile, the quantization block of the block B2 with the lower coding difficulty (smaller activity) is adjusted to $Q'_{B2}$ that is smaller than $Q'_{B1}$. The width of the adjustment depends on the basic adjustment gain $G_{SDR}$ satisfactorily designed for the case of the SDR.

Figure 12:
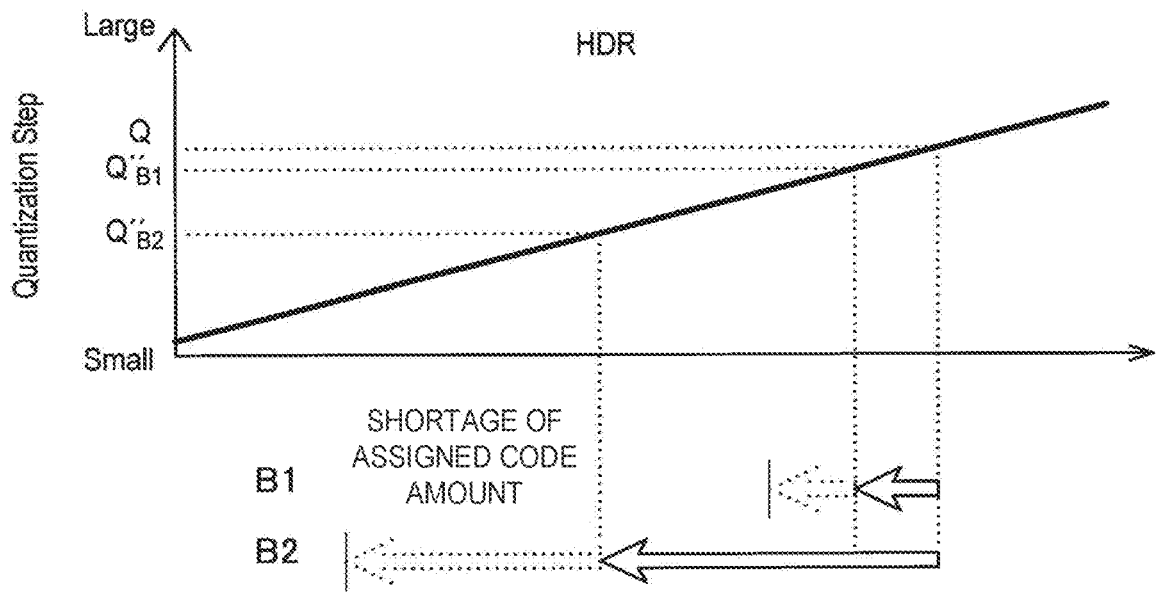
FIG. 12 is an explanatory diagram for explaining an example of adjustment of a quantization step in the case of an HDR according to an existing method.

FIG. 12 illustrates an example of adjustment of a quantization step in a case of the HDR related to an existing method (for example, the transfer function is HLG). According to the existing method, a fixed basic adjustment gain is used regardless of the transfer function and the color range applied to the image. Meanwhile, the coding difficulty calculated for an image capturing the same object has a smaller value as image information is more strongly compressed during signal conversion, and in accordance with the decrease, the adjustment width in Adjustment Formula (1) of the quantization step also decreases. As a result, the quantization step of the block B1 may be adjusted to $Q''_{B1}$ that is greater than $Q'_{B1}$, and the quantization step of the block B2 may be adjusted to $Q''_{B2}$ that is greater than $Q'_{B2}$. As for the flat block B2 with the low coding difficulty, in particular, $Q''_{B2}$ in the case of the HDR in FIG. 12 is significantly larger than $Q'_{B2}$ in the case of the SDR in FIG. 11. This is the reason that the assigned code amount becomes short in the flat region in the case of the HDR and deterioration of the image significantly appears.

Figure 13:
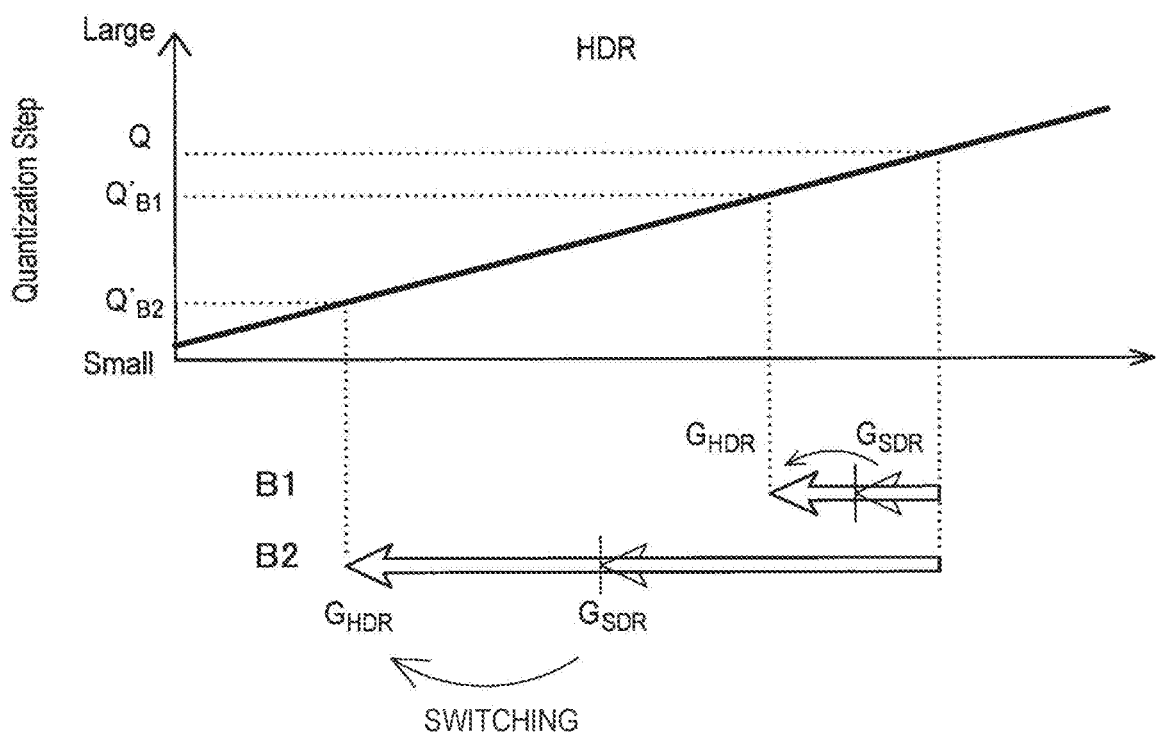
FIG. 13 is an explanatory diagram for explaining an example of adjustment of a quantization step according to a first embodiment.

FIG. 13 illustrates an example of adjustment of a quantization step according to the embodiment. In the embodiment, the quantization control unit 143 switches the basic adjustment gain to be used for the adjustment of the quantization step on the basis of at least one of the transfer function or the color range that is applied to the image. In the example of FIG. 13, a basic adjustment gain $G_{SDR}$ for the SDR and a basic adjustment gain $G_{HDR}$ for the HDR that are respectively designed in accordance with the degree of compression of the image information in the case of the HDR are used. As a result, the quantization step of the block B1 may be adjusted to $Q'_{B1}$, and the quantization step of the block B2 may be adjusted to $Q'_{B2}$. Variation in the statistical value of the coding difficulty that accompanies the compression of the image information is compensated for, and deterioration of image quality due to shortage of the assigned code amount is reduced by such switching of the processing parameter.

The quantization control unit 143 may calculate an adjustment coefficient using the thus decided basic adjustment gain and the coding difficulty (of the entire image or each block) calculated by the statistical arithmetic operation unit 141 and provide the calculated adjustment coefficient to the quantization unit 115. Instead, the basic adjustment gain decided by the quantization control unit 143 and the coding difficulty calculated by the statistical arithmetic operation unit 141 may be provided to the quantization unit 115, and the adjustment coefficient may be calculated by the quantization unit 115 in accordance with Formula (2) or (3). The storage unit 107 may store the value of the basic adjustment gain associated with one or both of the transfer function and the color range. The value of the basic adjustment gain may be defined for each transfer function, may be defined for each color range, or may be defined for each combination of the transfer function and the color range.

Such control of the quantization step is typically performed for each macro-block or sub-block in MPEG-2 or H.264/AVC or for each rectangular block such as a CU or a TU in H.265/HEVC. However, the idea of the embodiment can also be applied to a case in which the quantization control processing is executed for each partial region with a shape other than a rectangular shape.

[2-5. Flow of Processing]
(1) Coding Control Processing

Figure 14:
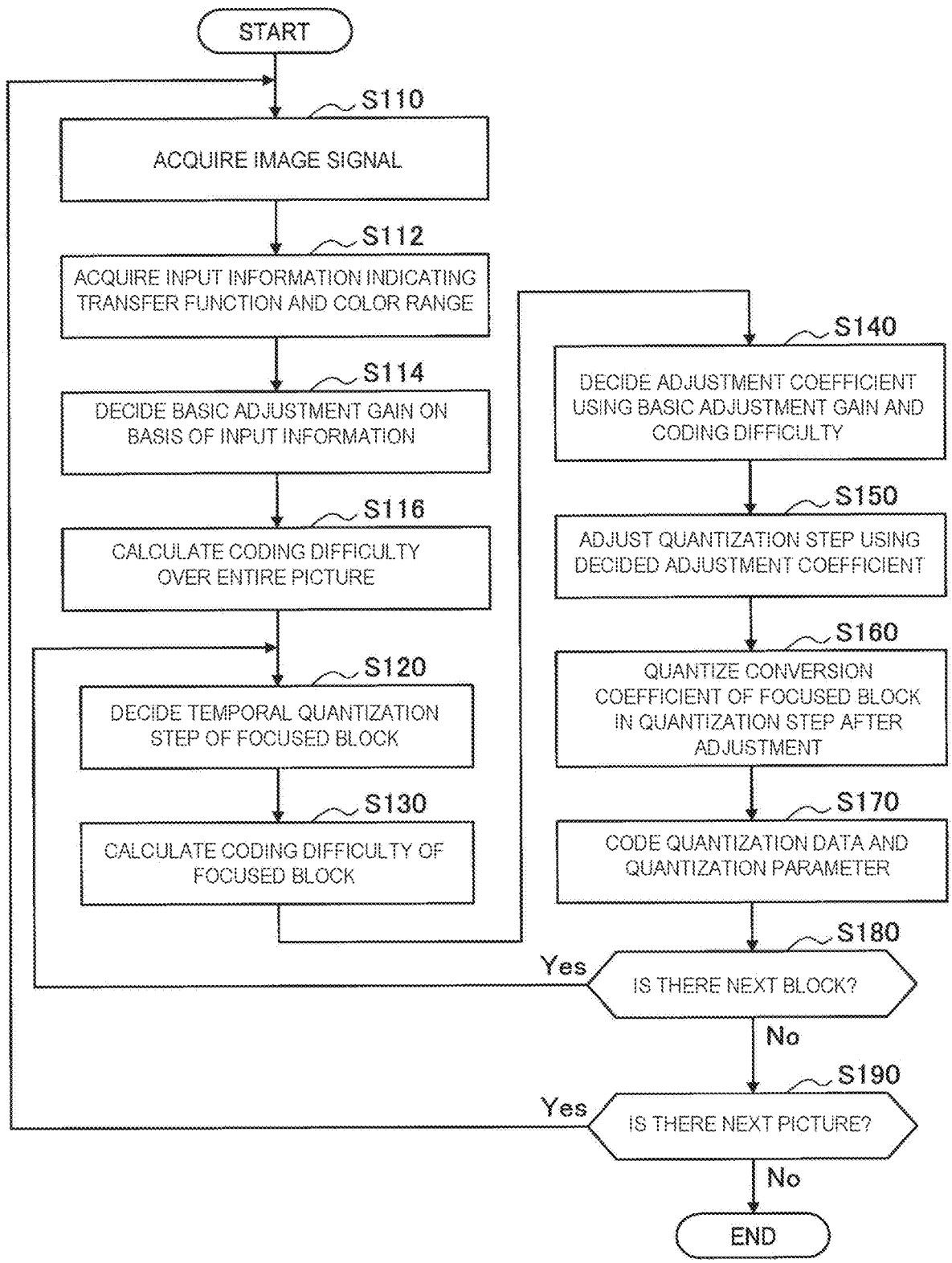
FIG. 14 is a flowchart illustrating an example of a flow of coding control processing according to the first embodiment.

FIG. 14 is a flowchart illustrating an example of a flow of coding control processing according to the embodiment. The coding control processing described here may be repeated for the individual images that are included in a video image. A processing step for acquiring or setting a parameter that does not change over a plurality of images may be skipped in the second and the following repetition. Note that description of processing steps that are not related directly to the control of the quantization processing will be omitted here for simple explanation.

Referring to FIG. 14, the signal acquisition unit 101 or the signal processing unit 102 first acquires an image signal generated on the basis of a transfer function related to conversion between light and an image signal (Step S110). The image signal acquired here is output to the coding unit 110.

Next, the information acquisition unit 103 or 104 acquires input information indicating the transfer function and the color range that are applied to the image input to the coding unit 110 via a user interface or from an auxiliary signal multiplexed with an input image signal (Step S112). The input information acquired here is output to the control unit 140.

Next, the quantization control unit 143 decides a basic adjustment gain on the basis of at least one of the transfer function or the color range indicated by the aforementioned input information (Step S114). Also, the statistical arithmetic operation unit 141 calculates a coding difficulty of the entire picture and outputs the calculated coding difficulty to the quantization control unit 143 (Step S116).

The following processing is repeated for each of the plurality of blocks set in the image as the target of the processing. The block as a target of the processing in each repetition will be referred to as a focused block here.

First, the quantization unit 115 of the coding unit 110 decides a temporary quantization step of a focused block such that a required compression ratio is achieved regardless of what kinds of transfer function and color range have been applied (Step S120).

Also, the statistical arithmetic operation unit 141 calculates a coding difficulty of the focused block and outputs the calculated coding difficulty to the quantization control unit 143 (Step S130). The quantization control unit 143 decides an adjustment coefficient for the focused block using the basic adjustment gain decided in Step S114 and the coding difficulty calculated by the statistical arithmetic operation unit 141 (Step S140).

The quantization unit 115 adjusts the quantization step decided in Step S120 using the adjustment coefficient provided from the quantization control unit 143 (Step S150). Then, the quantization unit 115 quantizes the conversion coefficient data of the focused block input from the orthogonal conversion unit 114 in the quantization step after the adjustment (Step S160). Note that although the example in which the quantization step that is temporarily decided such that the required compression ratio is achieved is adjusted using the adjustment coefficient is described here, the quantization step may be decided in consideration of both the required compression ratio and the adjustment coefficient at the same time.

Next, the lossless coding unit 116 codes quantized data and a quantization parameter input from the quantization unit 115 and generates a coded bit stream (Step S170).

Steps S120 to S170 are repeated until processing for all the blocks in a picture ends (Step S180). Then, if the processing for the entire picture ends, the coding control processing illustrated in FIG. 14 ends (Step S190).

[2-6. Overview of First Embodiment]

The first embodiment of the technology according to the present disclosure has been described above with reference to FIGS. 6 to 14. In the aforementioned embodiment, the processing parameter related to the quantization processing when an image is coded is decided on the basis of at least one of the transfer function related to the conversion between light and an image signal or the color range. With such a configuration, it is possible to prevent an inappropriate quantization step from being used due to a difference in transfer functions or a difference in color ranges. In this manner, it is possible to secure a sufficient assigned code amount to express the grayscale of the original signal when the image is coded and to prevent deterioration of image quality.

Also, according to the aforementioned embodiment, the basic adjustment gain used when the quantization step is adjusted in accordance with the coding difficulty for each partial region of the image is decided on the basis of at least one of the transfer function or the color range. With such a configuration, it is possible to use a relatively large basic adjustment gain in a case in which the coding difficulty becomes low in terms of the statistical value depending on the selection of the transfer function or the color range and to use a relatively small basic adjustment gain in a case in which the coding difficulty becomes large in terms of the statistical value in contrast. In this manner, consistent adjustment of the quantization step is realized without being affected by a method of expressing the image signal.

Also, according to the aforementioned embodiment, the transfer function and the color range may be determined on the basis of the input information related to the transfer function and the color range. In a case in which the input information is acquired via the user interface, control can be executed as desired by the user even if it is not possible to determine the types thereof from the input signal. In a case in which the input information is acquired from the auxiliary signal multiplexed with the input image signal, it is possible to automatically determine appropriate types without requiring a user's input.

3. Second Embodiment

[3-1. Introduction]

As described above in the previous section, image information is compressed at a higher compression ratio in the case of the HDR than in the case of the SDR. Compression ratios of image information differ even in a case in which color ranges are different. If the compression ratios of the image information differ from each other, the same code value of an image signal exhibits different brightness or colors in the actual world. In the previous section, flexible decision of the quantization step, which is uniformly decided in the related art, in consideration of a difference in meanings of such code values has been proposed. However, a processing parameter to be decided in consideration of the difference in meanings of the code values also exist in addition to the parameter related to the adjustment of the quantization step. A parameter related to pixel classification processing that is executed in various situations in image processing also corresponds to such a processing parameter.

Here, processing of classifying whether or not a certain pixel belongs to a skin color region will be discussed with reference to FIGS. 15A to 15D as an example of the pixel classification processing. In these drawings, the horizontal axis represents a code value of a Cb component that is one of two chrominance components, and the vertical axis represents a code value of a Cr component that is the other component of the two chrominance components.

Figure 15A:
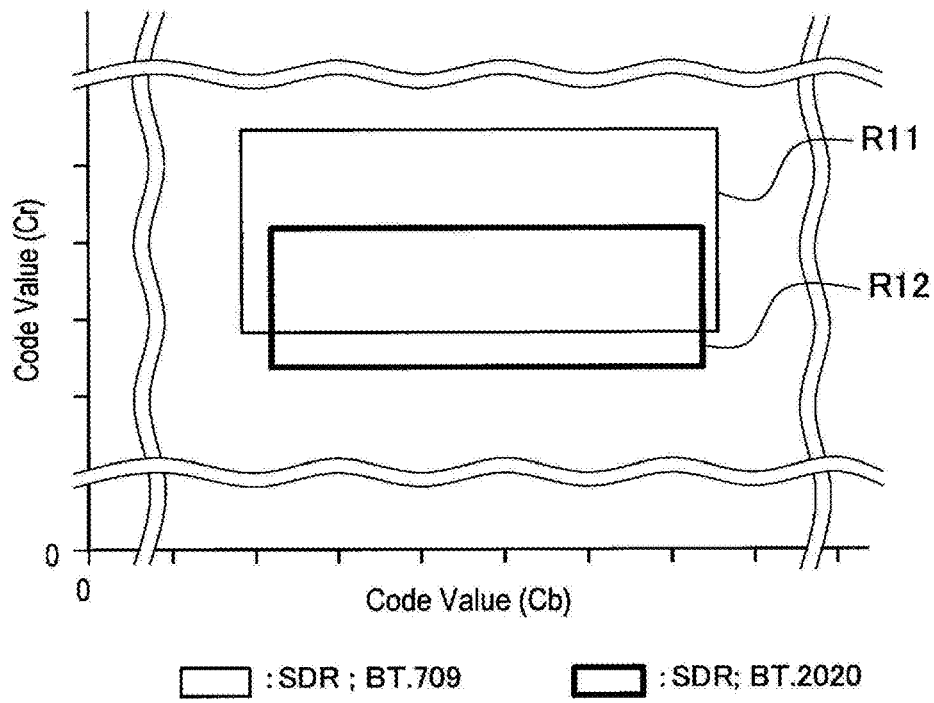
FIG. 15A is an explanatory diagram for explaining an example of influences of a color range on pixel classification processing in the SDR.

The rectangular region RH in FIG. 15A is a region that includes a group of skin colors after mapping as a result of mapping a group of colors in the actual world, which are subjectively recognized as skin colors by humans, on a Cb-Cr plane with a transfer function for the SDR and with a color range of BT.709. The left side and the right side of the rectangular region R11 correspond to threshold values to be compared with a code value of the Cb component when whether or not a pixel belongs to the skin color region is classified, and the lower side and the upper side correspond to threshold values to be compared with a code value of the Cr component when whether or not a pixel belongs to the skin color region is classified. If the group of the same skin colors in the actual world is mapped on the Cb-Cr plane with the transfer function for the SDR and with the color range of BT.2020, the group of the skin colors after the mapping is located inside the rectangular region R12. If these two rectangular regions R11 and R12 are compared with each other, it can be understood that different threshold values are to be used in pixel classification processing of classifying whether or not pixels exhibit skin colors in a case in which color ranges of different types are applied to the image in the case of the SDR.

Figure 15B:
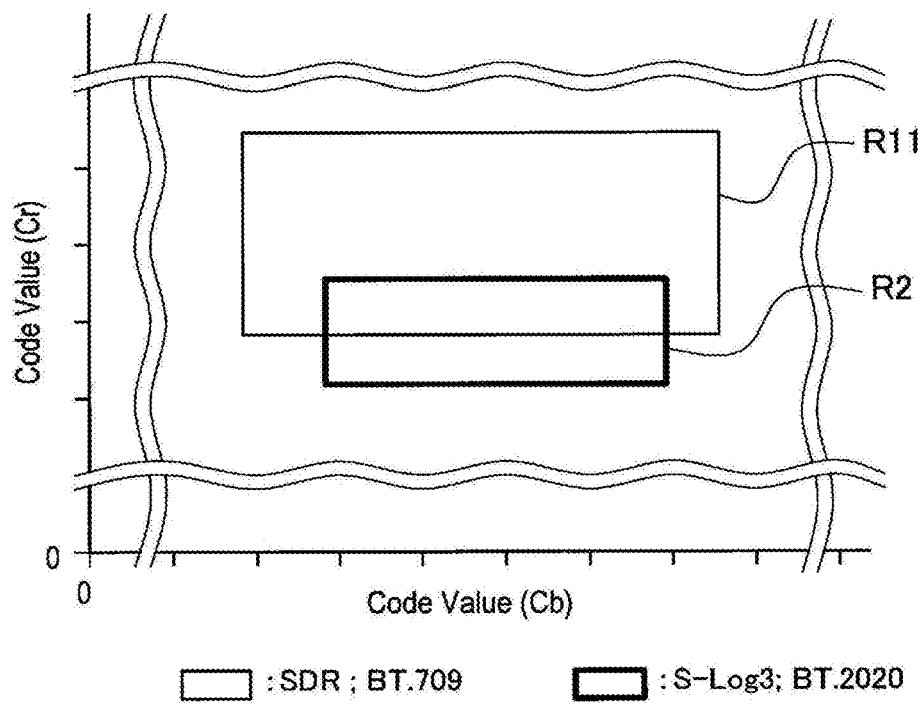
FIG. 15B is a first explanatory diagram for explaining an example of influences of a transfer function on pixel classification processing in the HDR.
Figure 15C:
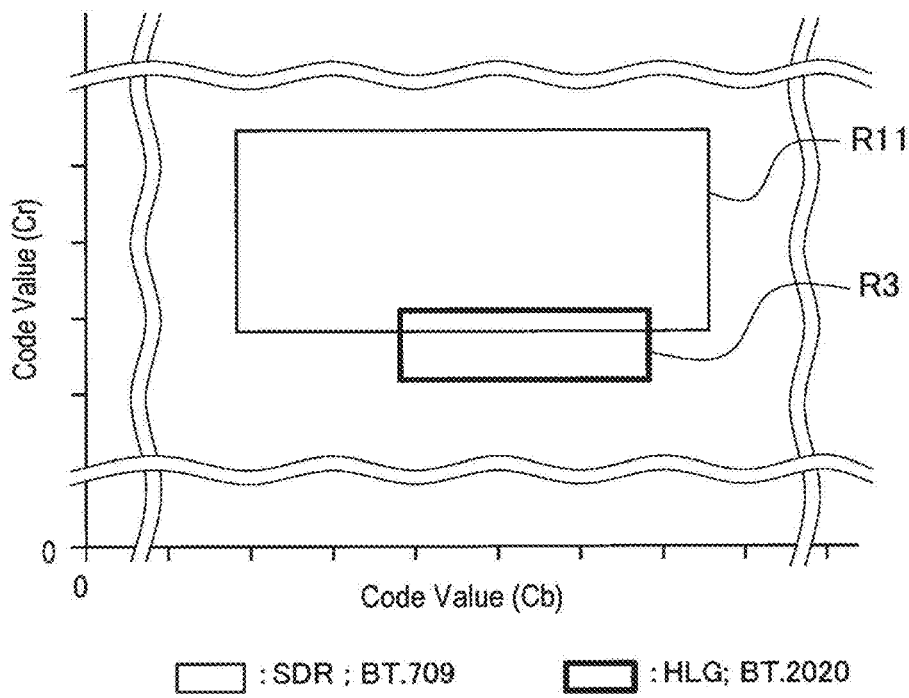
FIG. 15C is a second explanatory diagram for explaining an example of influences of a transfer function on the pixel classification processing in the HDR.

The rectangular region R2 in FIG. 15B is a region that includes a group of skin colors after mapping as a result of mapping a group of the same skin colors in the actual world on the Cb-Cr plane with S-Log3 that is a transfer function for the HDR and with a color range of BT.2020. The rectangular region R3 in FIG. 15C is a region that includes a group of skin colors after mapping as a result of mapping a group of the same skin colors in the actual world on the Cb-Cr plane with HLG that is a transfer function for the HDR and with a color range of BT.2020. The rectangular region R3 occupies a region that is different from the rectangular region R2 on the Cb-Cr plane. This means that in a case in which transfer functions of different types are applied to an image even if the same color range is applied, different threshold values are to be used in the pixel classification processing of classifying whether or not the pixels exhibit skin colors.

Figure 15D:
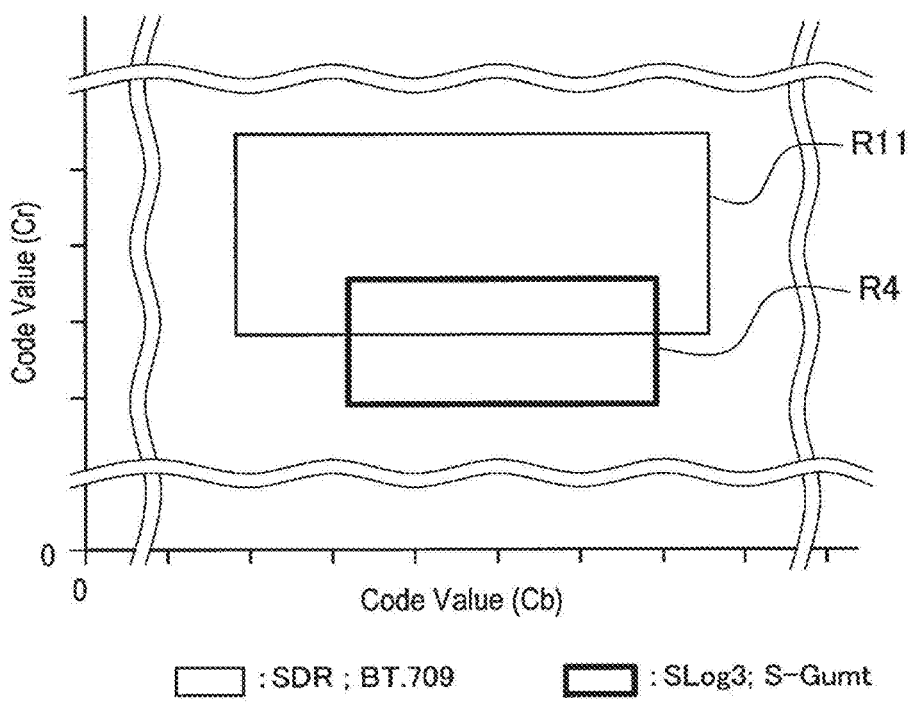
FIG. 15D is an explanatory diagram for explaining an example of influences of a color range on the pixel classification processing in the HDR.

The rectangular region R4 in FIG. 15D is a region that includes a group of skin colors after mapping as a result of mapping a group of the same skin colors in the actual world on the Cb-Cr plane with S-Log3 that is a transfer function for the HDR and with a color range of S-Gamut. The rectangular region R4 occupies a region that is different from the rectangular region R2 on the Cb-Cr plane. This means that in a case in which color ranges of different types are applied to an image even if the same transfer function is applied, different threshold values are to be used in the pixel classification processing of classifying whether or not the pixels exhibit skin colors.

The consideration similarly applies not only to the skin colors but also to other colors. In general, a threshold value that is appropriate for a certain combination of a transfer function and a color range is not necessarily appropriate for another combination of a transfer function and a color range in a case in which it is attempted to perform pixel classification processing of classifying pixels by comparing a code value of a color component with some threshold value. Thus, a method of flexibly switching a threshold value on the basis of one of or both a transfer function and a color range instead of using a uniform threshold value for pixel classification will be proposed in the second embodiment in this section.

[3-2. Outline of System]

An image system according to the embodiment may be configured similarly to the image processing system 10a or 10b according to the first embodiment. In one example, any device in the system has a function of an encoder that encodes an image, and region detection processing may be executed to enhance protection of image quality in a specific region (for example, a skin color region) in the encoder.

In another example, the image processing system according to the embodiment includes a device of an arbitrary type that acquires an image signal, and pixel classification processing may be executed by the device for various purposes such as face recognition, gesture recognition, biometric identification, or augmented reality. In the embodiment, a processing parameter for pixel classification is controlled on the basis of at least one of a transfer function or a color range in such pixel classification processing. In this manner, it is possible to obtain a more accurate pixel classification result as compared with an example in which a uniform processing parameter is used.

[3-3. Schematic Configuration of Image Processing Device]

Figure 16:
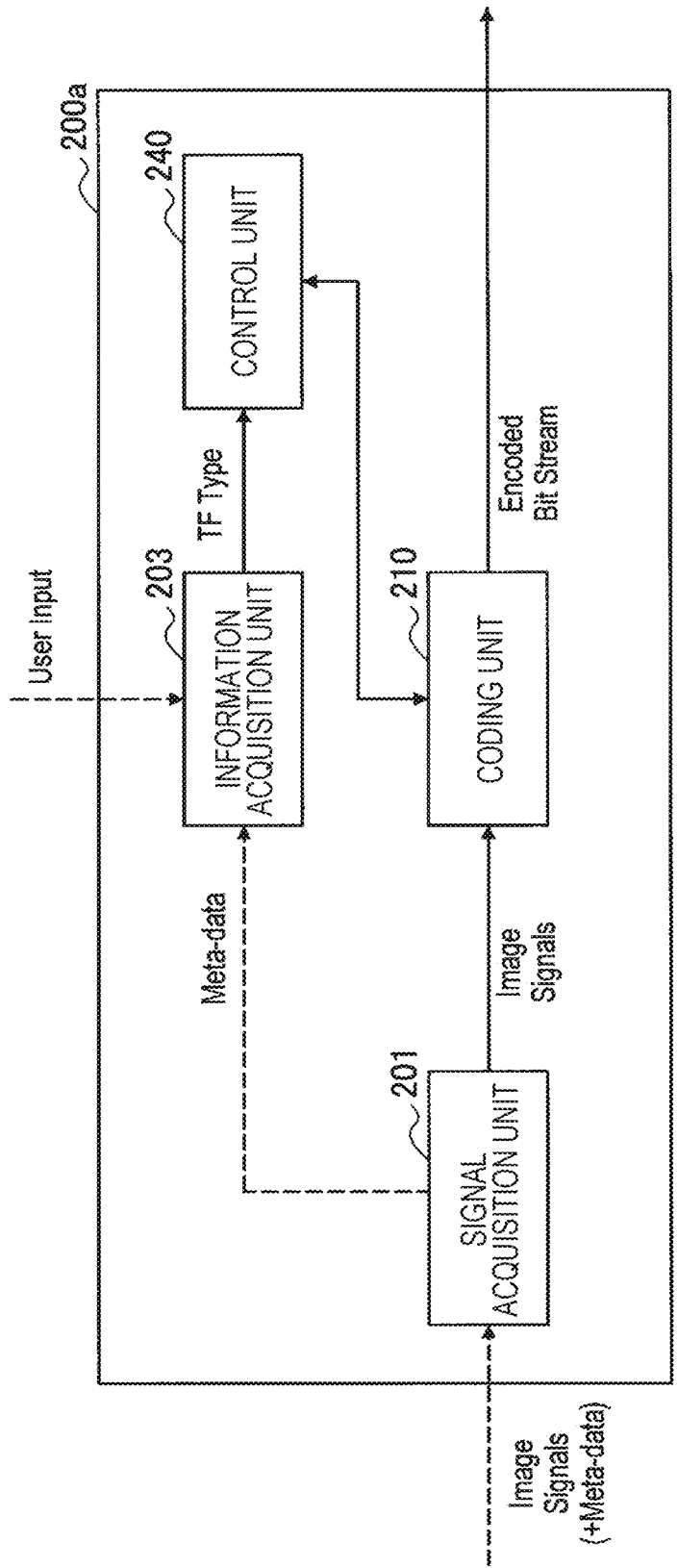
FIG. 16 is a block diagram illustrating an example of a schematic configuration of an image processing device according to a second embodiment.

FIG. 16 is a block diagram illustrating an example of a schematic configuration of the image processing device according to the second embodiment. An image processing device 200a illustrated in FIG. 16 includes a signal acquisition unit 201, an information acquisition unit 203, a coding unit 210, and a control unit 240.

The signal acquisition unit 201 acquires an input image signal generated on the basis of a transfer function related to conversion between light and an image signal. The signal acquisition unit 201 may acquire the input image signal from an external device via a transmission interface or may acquire the input image signal from an imaging module and a signal processing module (not illustrated) that are integrally configured with the image processing device 200a.

The information acquisition unit 203 acquires input information related to a transfer function and a color range applied to an image input to the coding unit 210.

In one example, the information acquisition unit 203 may acquire the input information via a user interface that the image processing device 200a has. The user interface may be provided by a physical input device such as a touch panel, a button, or a switch, for example, provided in a case body of the image processing device 200a. Instead, the user interface may be provided as a GUI on a terminal device that is connected in a remote manner via a communication interface. In the embodiment, the input information includes at least a transfer function type indicating the type of the transfer function applied to the image to be coded and a color range type indicating the type of the color range applied to the image. The user interface may allow the user to select one of a plurality of candidates of the type of the transfer function that may include BT.709 for the SDR and HLG, ST2084, and S-Log3 for the HDR, for example. Also, the user interface may allow the user to select one of a plurality of candidates of the type of the color range that may include BT.709, BT.2020, and S-Gamut.

In another example, the information acquisition unit 203 may acquire the input information from an auxiliary signal to be multiplexed with the input image signal. For example, the auxiliary signal is received by the signal acquisition unit 201 in a period during which the image signal is not transmitted on a signal line. Then, the information acquisition unit 203 may acquire the input information that includes the transfer function type and the color range type from an auxiliary signal separated by the signal acquisition unit 201.

The coding unit 210 codes the image expressed by the image signal that is acquired by the signal acquisition unit 201 and generates a coded bit stream. The coding unit 210 may execute the coding processing in accordance with any video image coding scheme such as MPEG-2, H.264/AVC, or H.265/HEVC, for example. The coding processing executed by the coding unit 210 includes quantization processing that includes lossy compression for achieving a required compression ratio.

The control unit 240 executes the pixel classification processing on the basis of at least one of a transfer function type or a color range type indicated by input information that is acquired by the information acquisition unit 203 and controls quantization processing performed by the coding unit 210 depending on a result of the pixel classification. For example, the control unit 240 detects a specific region in the image using different threshold values depending on what kind of combination of a transfer function and a color range is applied to the image. Then, the control unit 240 enhances protection of image quality in the specific region by scaling the quantization step applied to the detected specific region.

[3-4. Detailed Configurations of Coding Unit and Control Unit]

Figure 17:
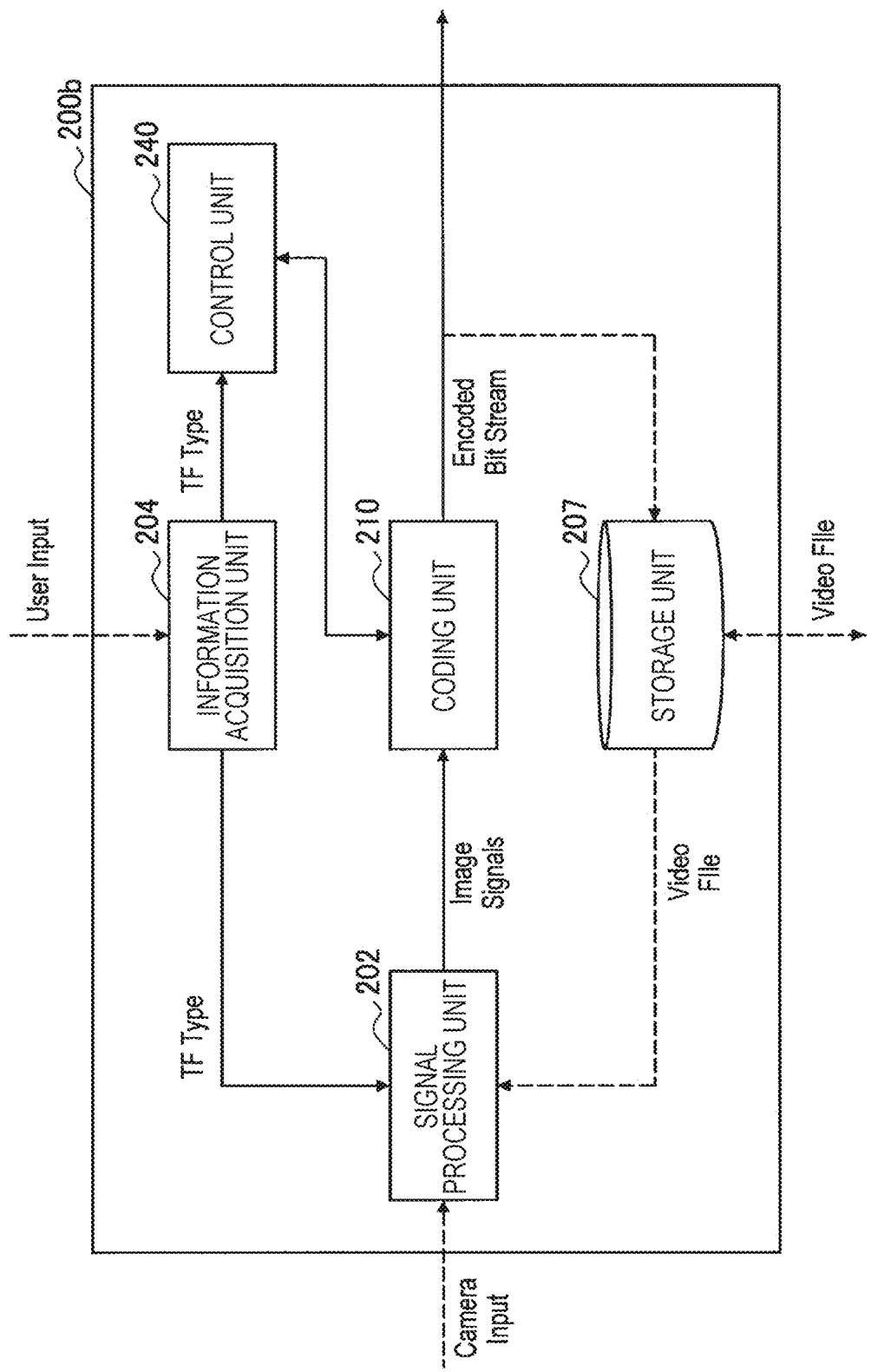
FIG. 17 is a block diagram illustrating an example of detailed configurations of a control unit and a coding unit according to the second embodiment.

In this section, more specific configurations of the coding unit 210 and the control unit 240 illustrated in FIG. 16 will be described in detail. FIG. 17 is a block diagram illustrating an example of detailed configurations of the coding unit and the control unit according to the second embodiment.

(1) Coding Unit

Referring to FIG. 17, the coding unit 210 includes a realignment buffer 111, a block setting unit 112, a subtraction unit 113, an orthogonal conversion unit 114, an quantization unit 215, a lossless coding unit 116, an inverse quantization unit 221, an inverse orthogonal conversion unit 122, an addition unit 123, a loop filter 124, a frame memory 126, a switch 127, a mode selection unit 128, an intra-prediction unit 130, and an inter-prediction unit 135.

The quantization unit 215 quantizes conversion coefficient data input from the orthogonal conversion unit 114. More specifically, the quantization unit 215 temporarily decides a quantization step for each block such that a required compression ratio is achieved and further adjusts the quantization step in accordance with a result of the pixel classification. Then, the quantization unit 215 quantizes the conversion coefficient data in the quantization step after the adjustment and outputs the quantized data to the lossless coding unit 116 and the inverse quantization unit 221.

The adjustment of the quantization step performed by the quantization unit 215 may be performed by applying an adjustment gain provided by the control unit 240 to the temporal quantization step (for example, multiplying the adjustment coefficient by the temporal quantization step). The quantization step is adjusted to a smaller value as the adjustment gain becomes larger, and as a result, the code amount assigned to the target block increases. For example, protection of image quality in a region in which a face, hands, or the like of a human appears may be enhanced by increasing the code amount assigned to the block that belongs to the skin color region. The quantization unit 215 may use different quantization steps for each color component.

The inverse quantization unit 221 inversely quantizes the quantized data in the quantization step that is the same as that used by the quantization unit 215 and restores the conversion coefficient data. Then, the inverse quantization unit 221 outputs the restored conversion coefficient data to an inverse orthogonal conversion unit 122.

(2) Control Unit

Referring to FIG. 17, the control unit 240 includes a threshold value control unit 241, a pixel classification unit 243, and a quantization control unit 245.

The threshold value control unit 241 determines a transfer function and a color range applied to an image to be coded on the basis of input information input from the information acquisition unit 203. Then, the threshold value control unit 241 decides a threshold value compared with a code value of a color component that is to be used in the pixel classification processing on the basis of the transfer function, the color range, or the combination thereof. For example, the pixel classification processing may be region detection processing for classifying whether or not each pixel represents a specific color and detecting a specific color region. Also, the pixel classification processing may be region detection processing for classifying whether or not each pixel represents specific brightness and detecting a specific brightness region. The disclosure is not limited to such examples, and arbitrary pixel classification processing of classifying pixels into some categories may be employed. The threshold value control unit 241 may decide a threshold value associated with the type indicated by the input information as a threshold value to be used with reference to a memory (not illustrated) that stores a threshold value associated with the transfer function, the color range, or the combination thereof, for example. Typically, different threshold values may be used for each transfer function, each color range, or each combination thereof so as to cancel of influences of a change in a code value of an image signal due to a difference in at least one of transfer functions or color ranges on the pixel classification processing.

The pixel classification unit 243 executes pixel classification processing on pixels expressed by an input image signal using the threshold value that is decided by the threshold value control unit 241. In a case in which the pixel classification processing is skin color region detection processing, for example, the threshold value decided by the threshold value control unit 241 includes a skin color determination threshold value. The skin color determination threshold value corresponds to a boundary of the rectangular region R11, R12, R2, R3, or R4 exemplified in FIGS. 15A to 15D, the left side and the right side correspond to the two threshold values to be compared with the Cb component, and the lower side and the upper side correspond to the two threshold values to be compared with the Cr component, respectively. In a case in which the transfer function for the SDR and the color range of BT.709 are applied, for example, the pixel classification unit 243 may determine that each pixel represents a skin color in a case in which the pixel is determined to be located in the rectangular region R11 on the Cb-Cr plane as a result of the threshold value determination. In a case in which the transfer function for the SDR and the color range of BT.2020 are applied, the pixel classification unit 243 may determine that each pixel represents a skin color in a case in which the pixel is determined to be located in the rectangular region R12 on the Cb-Cr plane as a result of the threshold value determination. In a case in which another transfer function and another color range are applied, similar determination may still be performed using the corresponding region detection threshold value. The pixel classification unit 243 outputs a result of such pixel classification to the quantization control unit 245. Note that although the example of pixel classification through simple threshold determination is mainly described here, the method of the pixel classification is not limited to such an example. For example, a region determination function using code values of one or more color components as arguments may be used in order to determine whether or not each pixel is located in a region with a shape other than a rectangular shape. Then, a parameter such as a coefficient, a constant, or the like included in the region determination function may be switched depending on one of the transfer function and the color range or a combination of both the transfer function and the color range. Alternatively, a plurality of region determination functions to which different identification information is applied may be defined in advance, and the region determination functions that are identified by identification information selected depending on one of the transfer function and the color range or the combination of both the transfer function and the color range may be used.

The quantization control unit 245 controls quantization processing that is executed by the quantization unit 215 on the basis of a result of the pixel classification input from the pixel classification unit 243. For example, the quantization control unit 245 may cause the quantization unit 215 to use the quantization step that has been adjusted to a smaller value than a temporal quantization step for each pixel or a block as a target of control in a case in which the pixel or the block is classified as belonging to a specific region for which it is desired to enhance protection of image quality. Also, the quantization control unit 245 may cause the quantization unit 215 to use a quantization step that has been adjusted to a larger value than the temporal quantization step for a pixel or a block that belongs to a region for which deterioration of image quality is allowed to some extent. Consistent protection of image quality that is not affected by a method of expressing an image signal is realized by the quantization unit 215 executing the quantization processing in the quantization step adjusted on the basis of the result of the pixel classification that is performed using the processing parameter that is flexibly set as described above.

[3-5. Flow of Processing]

Figure 18:
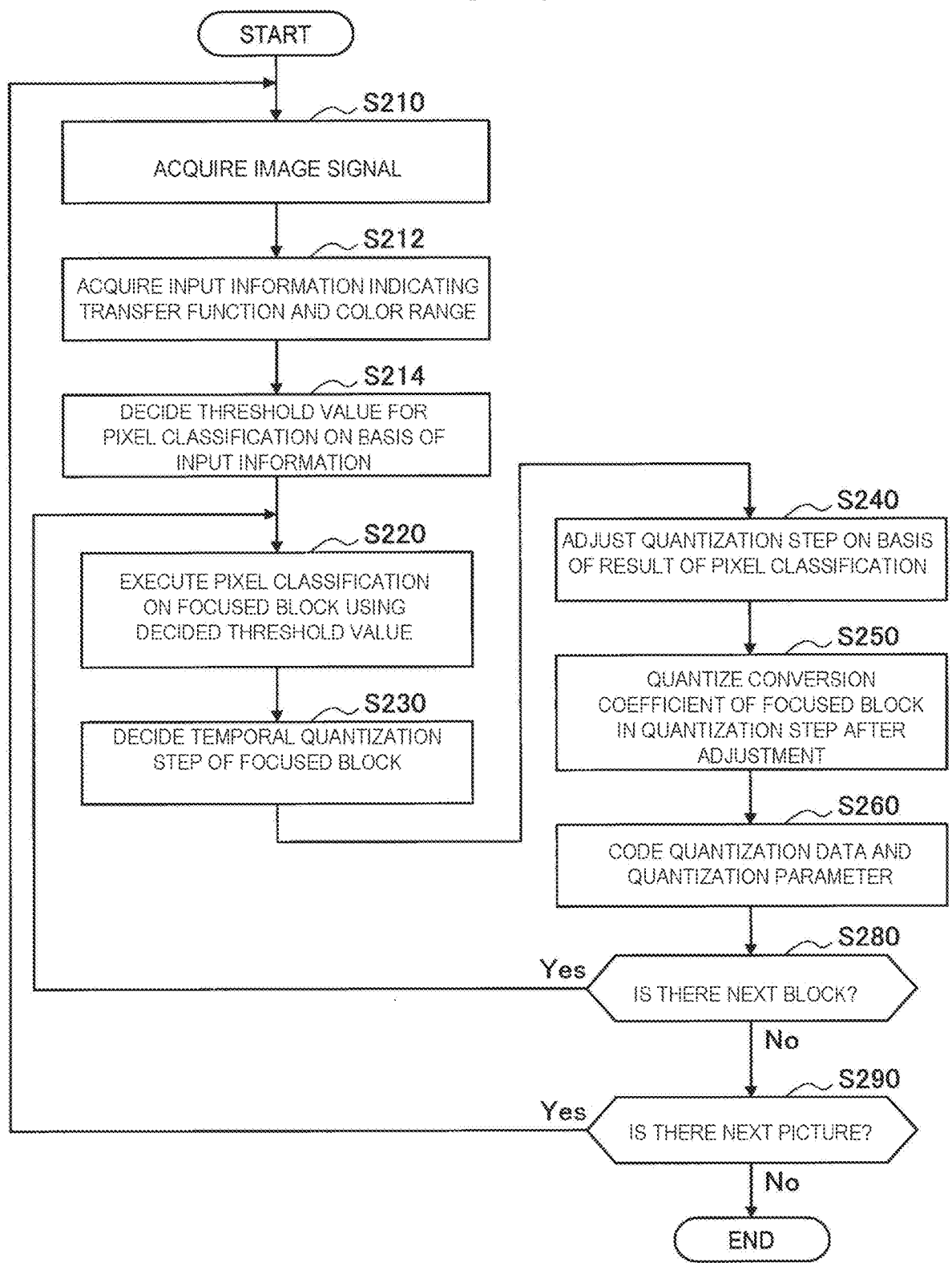
FIG. 18 is a flowchart illustrating an example of a flow of coding control processing according to the second embodiment.

FIG. 18 is a flowchart illustrating an example of a flow of coding control processing according to the embodiment. The coding control processing described here may be repeated for the individual images that are included in a video image. A processing step for acquiring or setting a parameter that does not change over a plurality of images may be skipped in the second and the following repetition. Note that description of processing steps that are not related to pixel classification will be omitted here for simple explanation.

Referring to FIG. 18, the signal acquisition unit 201 first acquires an image signal generated on the basis of a transfer function related to conversion between light and an image signal (Step S210). The image signal acquired here is output to the coding unit 210.

Next, the information acquisition unit 203 acquires input information indicating the transfer function and the color range that are applied to the image input to the coding unit 210 via a user interface or from an auxiliary signal multiplexed with an input image signal (Step S212). The input information acquired here is output to the control unit 240.

Next, the threshold value control unit 241 decides a threshold value for pixel classification on the basis of at least one of the transfer function or the color range indicated by the aforementioned input information (Step S214).

The following processing is repeated for each of the plurality of blocks set in the image as the target of the processing. The block as a target of the processing in each repetition will be referred to as a focused block here.

First, the pixel classification unit 243 executes the pixel classification for the focused block using the threshold value decided by the threshold value control unit 241 (Step S220). For example, the pixel classification unit 243 classifies whether or not each pixel in the block is located in a specific region surrounded by threshold values on the Cb-Cr plane in a case of a specific region detection. The pixel classification unit 243 calculates a proportion of the number of pixels located in the specific region with respect to the total number of pixels in the block. Then, the pixel classification unit 243 may determine that the focused block belongs to the specific region in a case in which the calculated proportion exceeds a predetermined threshold value.

The quantization unit 215 decides a temporal quantization step of the focused block such that a required compression ratio is achieved regardless of what kinds of transfer function and color range have been applied (Step S230). Next, the quantization unit 215 adjusts the quantization step decided in Step S230 using the adjustment coefficient decided by the quantization control unit 245 on the basis of the result of the pixel classification (Step S240). Then, the quantization unit 215 quantizes conversion coefficient data of the focused block input from the orthogonal conversion unit 214 in the quantization step after the adjustment (Step S250).

Next, the lossless coding unit 216 codes quantized data and a quantization parameter input from the quantization unit 215 and generates a coded bit stream (Step S260).

Steps S220 to S260 are repeated until processing for all the blocks in a picture ends (Step S280). Then, if the processing for the entire picture ends, the coding control processing illustrated in FIG. 18 ends (Step S290).

[3-6. Modification Example]

The example in which the result of pixel classification is used for controlling the assigned code amount by the encoder has been mainly described above. However, the idea of the embodiment can also be applied to a case in which the result of the pixel classification is used for another purpose. In this section, such a modification example will be described.

(1) Configuration of Image Processing Device

Figure 19:
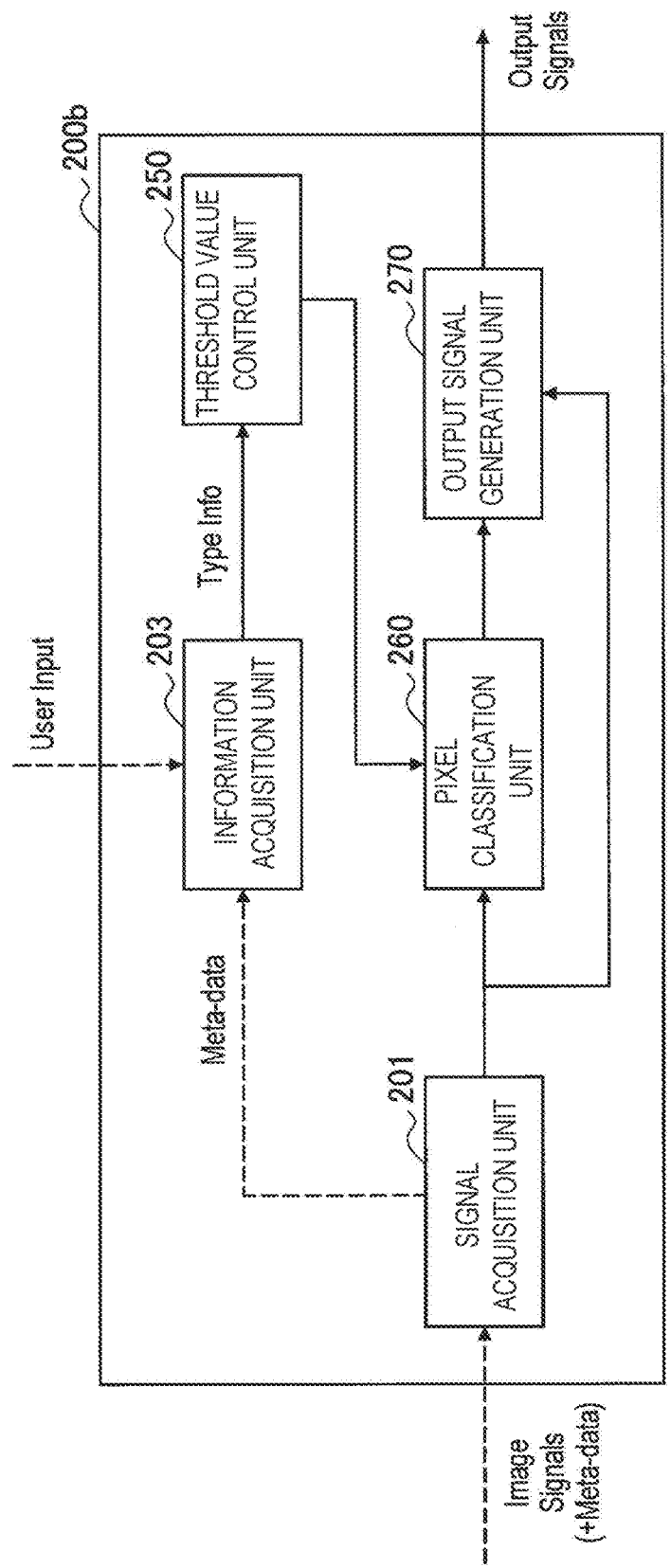
FIG. 19 is a block diagram illustrating an example of a configuration of an image processing device according to a modification example of a second embodiment.

FIG. 19 is a block diagram illustrating a modification example of a configuration of an image processing device according to the second embodiment. An image processing device 200b illustrated in FIG. 19 includes a signal acquisition unit 201, an information acquisition unit 203, a threshold value control unit 250, a pixel classification unit 260, and an output signal generation unit 270.

The threshold value control unit 250 determines a transfer function and a color range applied to an image on the basis of input information input from the information acquisition unit 203. Then, the threshold value control unit 250 decides a threshold value compared with a code value of a color component that is to be used in the pixel classification processing on the basis of the transfer function, the color range, or the combination thereof. The threshold value control unit 250 may decide a threshold value associated with the type indicated by the input information as a threshold value to be used with reference to a memory (not illustrated) that stores a threshold value associated with the transfer function, the color range, or the combination thereof, for example. The threshold value control unit 250 outputs the decided threshold value to the pixel classification unit 260.

The pixel classification unit 260 executes pixel classification processing on pixels expressed by an input image signal using the threshold value that is decided by the threshold value control unit 250. In a case in which the pixel classification processing is skin color region detection processing, for example, the threshold value decided by the threshold value control unit 250 includes a skin color determination threshold value. In a case in which the transfer function for the SDR and the color range of BT.709 are applied, for example, the pixel classification unit 260 may determine that each pixel represents a skin color in a case in which the pixel is determined to be located in the rectangular region R11 on the Cb-Cr plane as a result of the threshold value determination. In a case in which the transfer function for the SDR and the color range of BT.2020 are applied, the pixel classification unit 260 may determine that each pixel represents a skin color in a case in which the pixel is determined to be located in the rectangular region R12 on the Cb-Cr plane as a result of the threshold value determination. In a case in which another transfer function and another color range are applied, similar determination may still be performed using a corresponding skin color determination threshold value. The pixel classification unit 260 outputs a result of such pixel classification to the output signal generation unit 270.

The output signal generation unit 270 generates an output signal on the basis of the result of the pixel classification input from the pixel classification unit 260. For example, the output signal generation unit 270 may generate an output signal for displaying a sign (for example, a frame surrounding a region) indicating a position of a specific region detected as the result of the pixel classification in an image. Also, the output signal generation unit 270 may execute face recognition using the result of the skin color region detection and generate an output signal indicating a result of the face recognition. The output signal generation unit 270 may generate an output signal for displaying a result of gesture recognition, a result of biometric identification, a display object to be superimposed on an output image in an augmented reality, and the like.

(2) Flow of Processing

Figure 20:
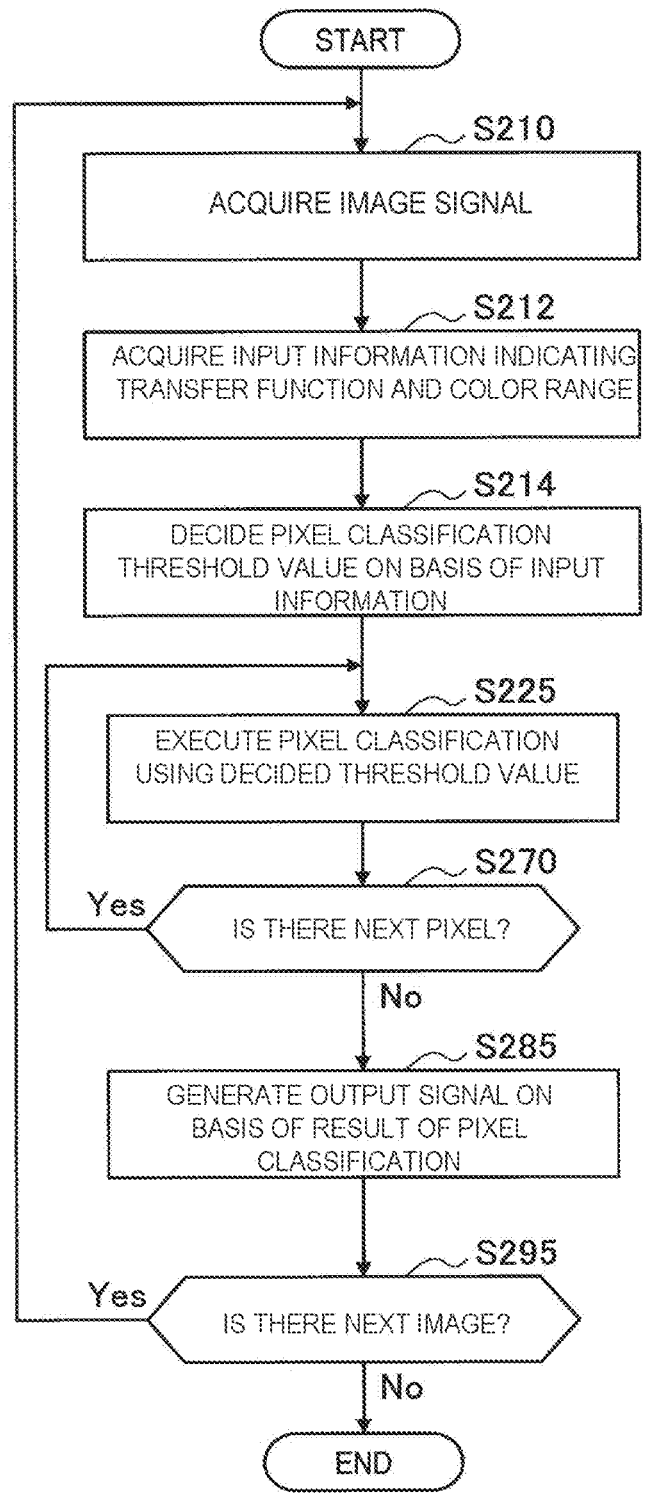
FIG. 20 is a flowchart illustrating an example of a flow of image processing according to the modification example described with reference to FIG. 19.

FIG. 20 is a flowchart illustrating an example of a flow of image processing according to the modification example described with reference to FIG. 19.

Referring to FIG. 20, the signal acquisition unit 201 first acquires an image signal generated on the basis of a transfer function related to conversion between light and an image signal (Step S210). The image signal acquired here is output to the pixel classification unit 260.

Next, the information acquisition unit 203 acquires input information indicating the transfer function and the color range that are applied to the image processed by the pixel classification unit 260 via a user interface or from an auxiliary signal multiplexed with an input image signal (Step S212). The input information acquired here is output to the threshold value control unit 250.

Next, the threshold value control unit 250 decides a threshold value for pixel classification on the basis of at least one of the transfer function or the color range indicated by the aforementioned input information (Step S214).

Next, the pixel classification unit 260 executes pixel classification on each pixel in an image using a threshold value decided by the threshold value control unit 250 (Step S225). The pixel classification is repeated until there become no pixels to be processed in the image (Step S270).

Next, the output signal generation unit 270 generates an output signal on the basis of the result of the pixel classification executed in Step S225 (Step S285).

The aforementioned processing is repeated for each of a series of images (Step S290). In a case in which no image is left, the coding control processing illustrated in FIG. 20 ends.

[3-7. Overview of Second Embodiment]

The second embodiment of the technology according to the present disclosure has been described above with reference to FIGS. 15A to 20. In the aforementioned embodiment, a processing parameter related to pixel classification processing that may be performed for various purposes is decided on the basis of at least one of the transfer function related to the conversion between light and an image signal or the color range. With such a configuration, it is possible to prevent the pixels from being classified with inappropriate criteria due to a difference in transfer functions or a difference in color ranges and to secure proper execution of the processing based on the result of the pixel classification.

Also, in the aforementioned embodiment, the threshold value to be compared with the code value of the color component in the pixel classification processing is decided on the basis of at least one of the transfer function or the color range. With such a configuration, it is possible to provide consistent threshold value determination that is not affected by a method of expressing an image signal even in a case in which the same brightness or color in the actual world is expressed with different code values depending on selection of the transfer function or the color range.

For example, the pixel classification processing may be region detection processing for detecting a specific region in an image, and the threshold value may be a region detection threshold value. In this case, a situation in which a region that is originally not to be detected depending on the selection of the transfer function or the color range is erroneously detected as a specific region may be prevented. According to an example, quantization processing when an image is coded is executed in a quantization step adjusted on the basis of a result of the aforementioned region detection processing. In this case, it is possible to accurately detect a specific region for which it is desired to enhance protection of image quality and to cause the code value assigned to the specific region to increase.

Also, according to the aforementioned embodiment, the transfer function and the color range may be determined on the basis of the input information related to the transfer function and the color range. In a case in which the input information is acquired via the user interface, control can be executed as desired by the user even if it is not possible to determine the transfer function or color range from the input signal. In a case in which the input information is acquired from the auxiliary signal multiplexed with the input image signal, it is possible to automatically determine appropriate types without requiring a user's input.

4. Hardware Configuration Example

The embodiments described in the above sections may be realized using software, hardware, and a combination of software and hardware. In a case in which the image processing device 100a, 100b, 200a, or 200b uses software, a program that is included in the software is stored in a storage medium (non-transitory medium) that is provided inside or outside the device, for example, in advance. Then, each program is read by a random access memory (RAM) when executed and is then executed by a processor such as a central processing unit (CPU), for example.

Figure 21:
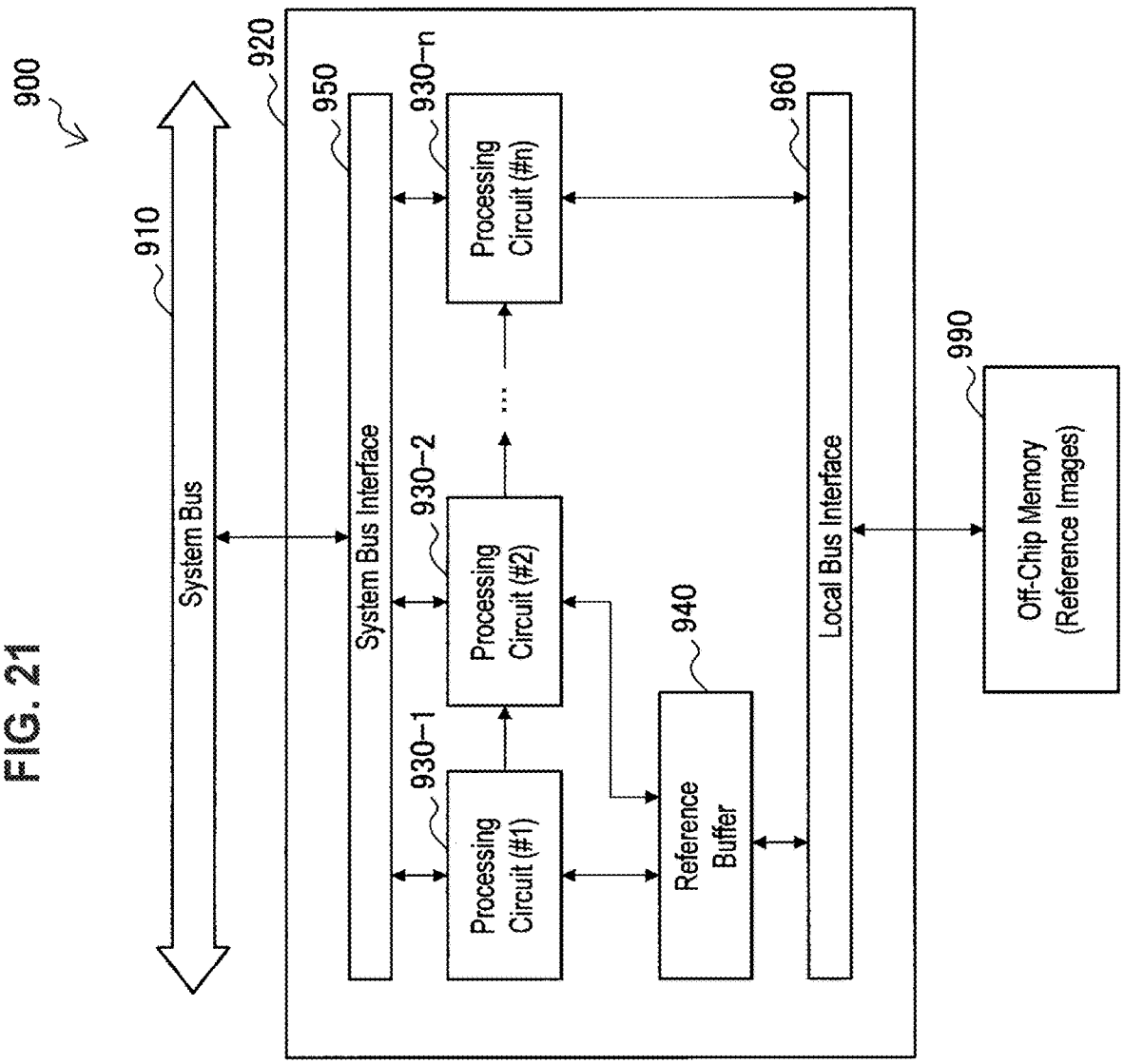
FIG. 21 is a block diagram illustrating an example of a hardware configuration of the device.

FIG. 21 is a block diagram illustrating an example of a hardware configuration of a device to which one or more of the aforementioned embodiments can be applied. Referring to FIG. 21, an image processing device 900 includes a system bus 910, an image processing chip 920, and an off-chip memory 990. The image processing chip 920 includes n (n is one or more) processing circuits 930-1, 930-2, ..., 930-n, a reference buffer 940, a system bus interface 950, and a local bus interface 960.

The system bus 910 provides a communication path between the image processing chip 920 and an external module (for example, a central control function, an application function, a communication interface, a user interface, or the like). The processing circuits 930-1, 930-2, ..., 930-n are connected to the system bus 910 via the system bus interface 950 and is connected to the off-chip memory 990 via the local bus interface 960. The processing circuits 930-1, 930-2, ..., 930-n can also access the reference buffer 940 that may correspond to an on-chip memory (for example, an SRAM). The off-chip memory 990 may be a frame memory that stores image data that is processed by the image processing chip 920, for example. In one example, the processing circuit 930-1 may be used to convert an image signal. The processing circuit 930-2 may be used to code the image signal. The other processing circuits may be used for pixel classification. Note that these processing circuits may be formed on discrete chips rather than on the same image processing chip 920.

5. Application Example

The technology according to the present disclosure can be applied to various products. For example, the technology according to the present disclosure may be applied to an operating room system.

Figure 22:
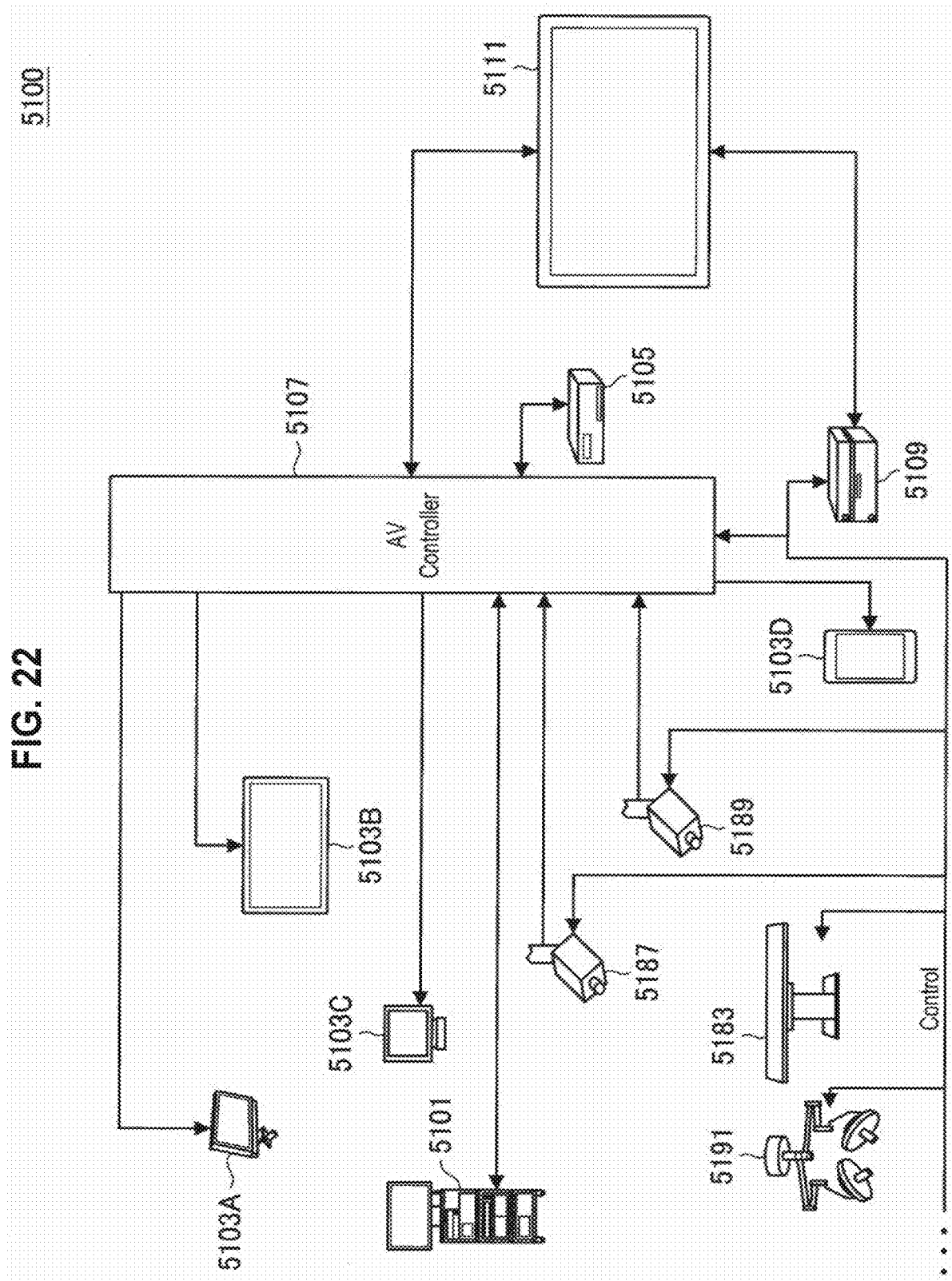
FIG. 22 is a view schematically depicting a general configuration of an operating room system.

FIG. 22 is a view schematically depicting a general configuration of an operating room system 5100 to which the technology according to an embodiment of the present disclosure can be applied. Referring to FIG. 22, the operating room system 5100 is configured such that a group of apparatus installed in an operating room are connected for cooperation with each other through an audiovisual (AV) controller 5107 and an operating room controlling apparatus 5109.

In the operating room, various apparatus may be installed. In FIG. 22, as an example, various apparatus group 5101 for endoscopic surgery, a ceiling camera 5187, a surgery field camera 5189, a plurality of display apparatus 5103A to 5103D, a recorder 5105, a patient bed 5183 and an illumination 5191 are depicted. The ceiling camera 5187 is provided on the ceiling of an operating room and images the hands of a surgeon. The surgery field camera 5189 is provided on the ceiling of the operating room and images a state of the entire operating room.

Among the apparatus mentioned, the apparatus group 5101 belongs to an endoscopic surgery system 5113 hereinafter described and include an endoscope, a display apparatus which displays an image picked up by the endoscope and so forth. Various apparatus belonging to the endoscopic surgery system 5113 are referred to also as medical equipment. Meanwhile, the display apparatus 5103A to 5103D, the recorder 5105, the patient bed 5183 and the illumination 5191 are apparatus which are equipped, for example, in the operating room separately from the endoscopic surgery system 5113. The apparatus which do not belong to the endoscopic surgery system 5113 are referred to also as non-medical equipment. The audiovisual controller 5107 and/or the operating room controlling apparatus 5109 cooperatively control operation of the medical equipment and the non-medical equipment with each other.

The audiovisual controller 5107 integrally controls processes of the medical equipment and the non-medical equipment relating to image display. Specifically, each of the apparatus group 5101, the ceiling camera 5187 and the surgery field camera 5189 from among the apparatus provided in the operating room system 5100 may be an apparatus having a function of sending information to be displayed during surgery (such information is hereinafter referred to as display information, and the apparatus mentioned is hereinafter referred to as apparatus of a sending source). Meanwhile, each of the display apparatus 5103A to 5103D may be an apparatus to which display information is outputted (the apparatus is hereinafter referred to also as apparatus of an output destination). Further, the recorder 5105 may be an apparatus which serves as both of an apparatus of a sending source and an apparatus of an output destination. The audiovisual controller 5107 has a function of controlling operation of an apparatus of a sending source and an apparatus of an output destination to acquire display information from the apparatus of a sending source and transmit the display information to the apparatus of an output destination so as to be displayed or recorded. It is to be noted that the display information includes various images picked up during surgery, various kinds of information relating to the surgery (for example, physical information of a patient, inspection results in the past or information regarding a surgical procedure) and so forth.

Specifically, to the audiovisual controller 5107, information relating to an image of a surgical region in a body cavity of a patient imaged by the endoscope may be transmitted as the display information from the apparatus group 5101. Further, from the ceiling camera 5187, information relating to an image of the hands of the surgeon picked up by the ceiling camera 5187 may be transmitted as display information. Further, from the surgery field camera 5189, information relating to an image picked up by the surgery field camera 5189 and illustrating a state of the entire operating room may be transmitted as display information. It is to be noted that, if a different apparatus having an image pickup function exists in the operating room system 5100, then the audiovisual controller 5107 may acquire information relating to an image picked up by the different apparatus as display information also from the different apparatus.

Alternatively, for example, in the recorder 5105, information relating to such images as mentioned above picked up in the past is recorded by the audiovisual controller 5107. The audiovisual controller 5107 can acquire, as display information, information relating to the images picked up in the past from the recorder 5105. It is to be noted that also various pieces of information relating to surgery may be recorded in advance in the recorder 5105.

The audiovisual controller 5107 controls at least one of the display apparatus 5103A to 5103D, which are apparatus of an output destination, to display acquired display information (namely, images picked up during surgery or various pieces of information relating to the surgery). In the example depicted, the display apparatus 5103A is a display apparatus installed so as to be suspended from the ceiling of the operating room; the display apparatus 5103B is a display apparatus installed on a wall face of the operating room; the display apparatus 5103C is a display apparatus installed on a desk in the operating room; and the display apparatus 5103D is a mobile apparatus (for example, a tablet personal computer (PC)) having a display function.

Further, though not depicted in FIG. 22, the operating room system 5100 may include an apparatus outside the operating room. The apparatus outside the operating room may be, for example, a server connected to a network constructed inside and outside the hospital, a PC used by medical staff, a projector installed in a meeting room of the hospital or the like. Where such an external apparatus is located outside the hospital, also it is possible for the audiovisual controller 5107 to cause display information to be displayed on a display apparatus of a different hospital through a teleconferencing system or the like to perform telemedicine.

The operating room controlling apparatus 5109 integrally controls processes other than processes relating to image display on the non-medical equipment. For example, the operating room controlling apparatus 5109 controls driving of the patient bed 5183, the ceiling camera 5187, the surgery field camera 5189 and the illumination 5191.

In the operating room system 5100, a centralized operation panel 5111 is provided such that it is possible to issue an instruction regarding image display to the audiovisual controller 5107 or issue an instruction regarding operation of the non-medical equipment to the operating room controlling apparatus 5109 through the centralized operation panel 5111. The centralized operation panel 5111 is configured by providing a touch panel on a display face of a display apparatus.

Figure 23:
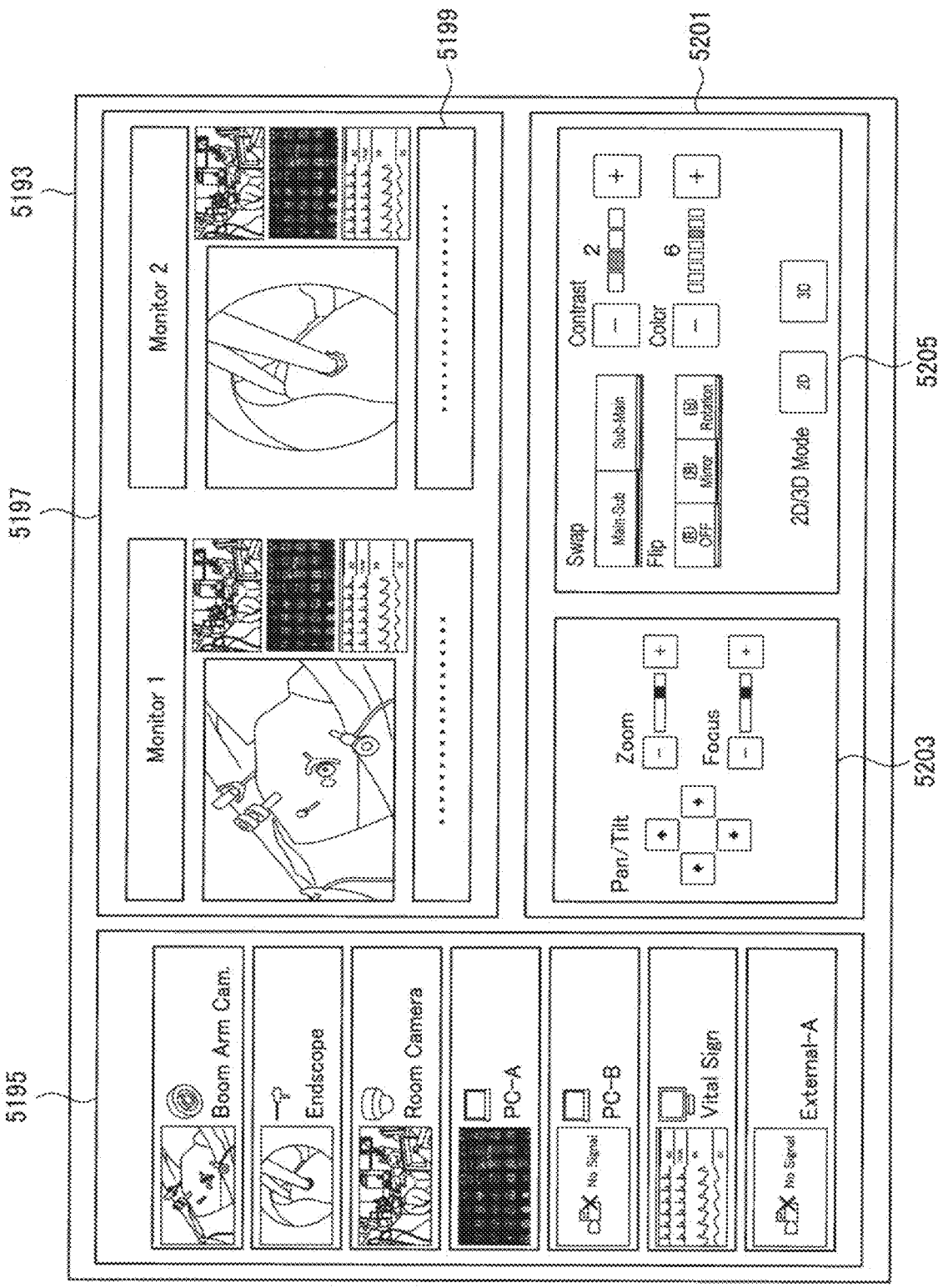
FIG. 23 is a view depicting an example of display of an operation screen image of a centralized operation panel.

FIG. 23 is a view depicting an example of display of an operation screen image on the centralized operation panel 5111. In FIG. 23, as an example, an operation screen image is depicted which corresponds to a case in which two display apparatus are provided as apparatus of an output destination in the operating room system 5100. Referring to FIG. 23, the operation screen image 5193 includes a sending source selection region 5195, a preview region 5197 and a control region 5201.

In the sending source selection region 5195, the sending source apparatus provided in the operating room system 5100 and thumbnail screen images representative of display information the sending source apparatus have are displayed in an associated manner with each other. A user can select display information to be displayed on the display apparatus from any of the sending source apparatus displayed in the sending source selection region 5195.

In the preview region 5197, a preview of screen images displayed on two display apparatus (Monitor 1 and Monitor 2) which are apparatus of an output destination is displayed. In the example depicted, four images are displayed by picture in picture (PinP) display in regard to one display apparatus. The four images correspond to display information sent from the sending source apparatus selected in the sending source selection region 5195. One of the four images is displayed in a comparatively large size as a main image while the remaining three images are displayed in a comparatively small size as sub images. The user can exchange between the main image and the sub images by suitably selecting one of the images from among the four images displayed in the region. Further, a status displaying region 5199 is provided below the region in which the four images are displayed, and a status relating to surgery (for example, elapsed time of the surgery, physical information of the patient and so forth) may be displayed suitably in the status displaying region 5199.

A sending source operation region 5203 and an output destination operation region 5205 are provided in the control region 5201. In the sending source operation region 5203, a graphical user interface (GUI) part for performing an operation for an apparatus of a sending source is displayed. In the output destination operation region 5205, a GUI part for performing an operation for an apparatus of an output destination is displayed. In the example depicted, GUI parts for performing various operations for a camera (panning, tilting and zooming) in an apparatus of a sending source having an image pickup function are provided in the sending source operation region 5203. The user can control operation of the camera of an apparatus of a sending source by suitably selecting any of the GUI parts. It is to be noted that, though not depicted, where the apparatus of a sending source selected in the sending source selection region 5195 is a recorder (namely, where an image recorded in the recorder in the past is displayed in the preview region 5197), GUI parts for performing such operations as reproduction of the image, stopping of reproduction, rewinding, fast-feeding and so forth may be provided in the sending source operation region 5203.

Further, in the output destination operation region 5205, GUI parts for performing various operations for display on a display apparatus which is an apparatus of an output destination (swap, flip, color adjustment, contrast adjustment and switching between two dimensional (2D) display and three dimensional (3D) display) are provided. The user can operate the display of the display apparatus by suitably selecting any of the GUI parts.

It is to be noted that the operation screen image to be displayed on the centralized operation panel 5111 is not limited to the depicted example, and the user may be able to perform operation inputting to each apparatus which can be controlled by the audiovisual controller 5107 and the operating room controlling apparatus 5109 provided in the operating room system 5100 through the centralized operation panel 5111.

Figure 24:
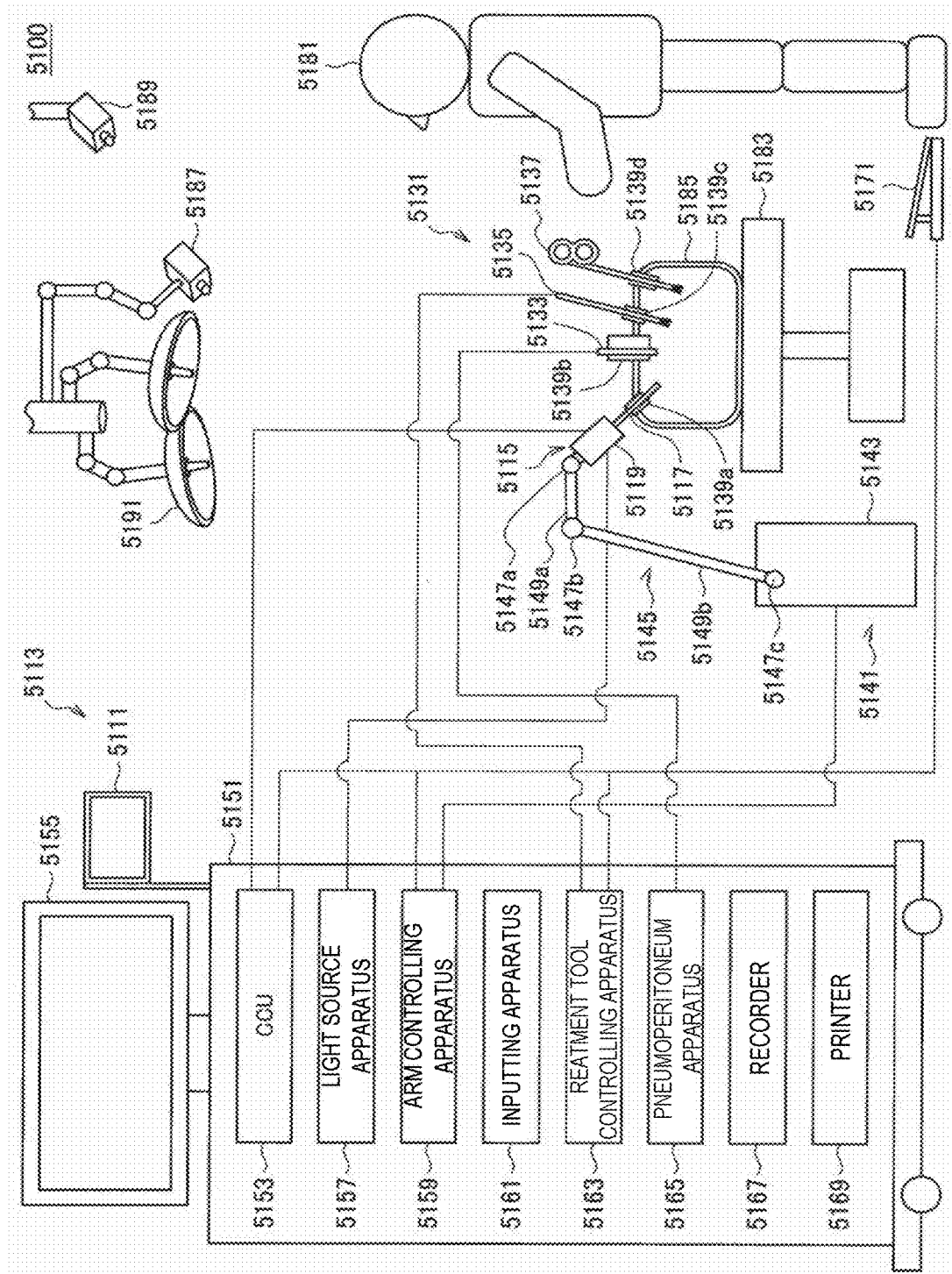
FIG. 24 is a view illustrating an example of a state of surgery to which the operating room system is applied.

FIG. 24 is a view illustrating an example of a state of surgery to which the operating room system described above is applied. The ceiling camera 5187 and the surgery field camera 5189 are provided on the ceiling of the operating room such that it can image the hands of a surgeon (medical doctor) 5181 who performs treatment for an affected area of a patient 5185 on the patient bed 5183 and the entire operating room. The ceiling camera 5187 and the surgery field camera 5189 may include a magnification adjustment function, a focal distance adjustment function, an imaging direction adjustment function and so forth. The illumination 5191 is provided on the ceiling of the operating room and irradiates at least upon the hands of the surgeon 5181. The illumination 5191 may be configured such that the irradiation light amount, the wavelength (color) of the irradiation light, the irradiation direction of the light and so forth can be adjusted suitably.

The endoscopic surgery system 5113, the patient bed 5183, the ceiling camera 5187, the surgery field camera 5189 and the illumination 5191 are connected for cooperation with each other through the audiovisual controller 5107 and the operating room controlling apparatus 5109 (not depicted in FIG. 24) as depicted in FIG. 22. The centralized operation panel 5111 is provided in the operating room, and the user can suitably operate the apparatus existing in the operating room through the centralized operation panel 5111 as described hereinabove.

In the following, a configuration of the endoscopic surgery system 5113 is described in detail. As depicted, the endoscopic surgery system 5113 includes an endoscope 5115, other surgical tools 5131, a supporting arm apparatus 5141 which supports the endoscope 5115 thereon, and a cart 5151 on which various apparatus for endoscopic surgery are mounted.

In endoscopic surgery, in place of incision of the abdominal wall to perform laparotomy, a plurality of tubular aperture devices called trocars 5139a to 5139d is used to puncture the abdominal wall. Then, a lens barrel 5117 of the endoscope 5115 and the other surgical tools 5131 are inserted into body cavity of the patient 5185 through the trocars 5139a to 5139d. In the example depicted, as the other surgical tools 5131, a pneumoperitoneum tube 5133, an energy device 5135 and forceps 5137 are inserted into body cavity of the patient 5185. Further, the energy device 5135 is a treatment tool for performing incision and peeling of a tissue, sealing of a blood vessel or the like by high frequency current or ultrasonic vibration. However, the surgical tools 5131 depicted are mere examples at all, and as the surgical tools 5131, various surgical tools which are generally used in endoscopic surgery such as, for example, tweezers or a retractor may be used.

An image of a surgical region in a body cavity of the patient 5185 picked up by the endoscope 5115 is displayed on a display apparatus 5155. The surgeon 5181 would use the energy device 5135 or the forceps 5137 while watching the image of the surgical region displayed on the display apparatus 5155 on the real time basis to perform such treatment as, for example, resection of an affected area. It is to be noted that, though not depicted, the pneumoperitoneum tube 5133, the energy device 5135, and the forceps 5137 are supported by the surgeon 5181, an assistant or the like during surgery.

(Supporting Arm Apparatus)

The supporting arm apparatus 5141 includes an arm unit 5145 extending from a base unit 5143. In the example depicted, the arm unit 5145 includes joint portions 5147a, 5147b and 5147c and links 5149a and 5149b and is driven under the control of an arm controlling apparatus 5159. The endoscope 5115 is supported by the arm unit 5145 such that the position and the posture of the endoscope 5115 are controlled. Consequently, stable fixation in position of the endoscope 5115 can be implemented.

(Endoscope)

The endoscope 5115 includes the lens barrel 5117 which has a region of a predetermined length from a distal end thereof to be inserted into a body cavity of the patient 5185, and a camera head 5119 connected to a proximal end of the lens barrel 5117. In the example depicted, the endoscope 5115 is depicted as a rigid endoscope having the lens barrel 5117 of the hard type. However, the endoscope 5115 may otherwise be configured as a flexible endoscope having the lens barrel 5117 of the flexible type.

The lens barrel 5117 has, at a distal end thereof, an opening in which an objective lens is fitted. A light source apparatus 5157 is connected to the endoscope 5115 such that light generated by the light source apparatus 5157 is introduced to a distal end of the lens barrel 5117 by a light guide extending in the inside of the lens barrel 5117 and is applied toward an observation target in a body cavity of the patient 5185 through the objective lens. It is to be noted that the endoscope 5115 may be a forward-viewing endoscope or may be an oblique-viewing endoscope or a side-viewing endoscope.

An optical system and an image pickup element are provided in the inside of the camera head 5119 such that reflected light (observation light) from an observation target is condensed on the image pickup element by the optical system. The observation light is photo-electrically converted by the image pickup element to generate an electric signal corresponding to the observation light, namely, an image signal corresponding to an observation image. The image signal is transmitted as RAW data to a CCU 5153. It is to be noted that the camera head 5119 has a function incorporated therein for suitably driving the optical system of the camera head 5119 to adjust the magnification and the focal distance.

It is to be noted that, in order to establish compatibility with, for example, a stereoscopic vision (3D display), a plurality of image pickup elements may be provided on the camera head 5119. In this case, a plurality of relay optical systems is provided in the inside of the lens barrel 5117 in order to guide observation light to the plurality of respective image pickup elements.

(Various Apparatus Incorporated in Cart)

The CCU 5153 includes a central processing unit (CPU), a graphics processing unit (GPU) or the like and integrally controls operation of the endoscope 5115 and the display apparatus 5155. Specifically, the CCU 5153 performs, for an image signal received from the camera head 5119, various image processes for displaying an image based on the image signal such as, for example, a development process (demosaic process). The CCU 5153 provides the image signal for which the image processes have been performed to the display apparatus 5155. Further, the audiovisual controller 5107 depicted in FIG. 22 is connected to the CCU 5153. The CCU 5153 provides the image signal for which the image processes have been performed also to the audiovisual controller 5107. Further, the CCU 5153 transmits a control signal to the camera head 5119 to control driving of the camera head 5119. The control signal may include information relating to an image pickup condition such as a magnification or a focal distance. The information relating to an image pickup condition may be inputted through the inputting apparatus 5161 or may be inputted through the centralized operation panel 5111 described hereinabove.

The display apparatus 5155 displays an image based on an image signal for which the image processes have been performed by the CCU 5153 under the control of the CCU 5153. If the endoscope 5115 is ready for imaging of a high resolution such as 4K (horizontal pixel number 3840× vertical pixel number 2160), 8K (horizontal pixel number 7680×vertical pixel number 4320) or the like and/or ready for 3D display, then a display apparatus by which corresponding display of the high resolution and/or 3D display are possible may be used as the display apparatus 5155. Where the apparatus is ready for imaging of a high resolution such as 4K or 8K, if the display apparatus used as the display apparatus 5155 has a size of equal to or not less than 55 inches, then a more immersive experience can be obtained. Further, a plurality of display apparatus 5155 having different resolutions and/or different sizes may be provided in accordance with purposes.

The light source apparatus 5157 includes a light source such as, for example, a light emitting diode (LED) and supplies irradiation light for imaging of a surgical region to the endoscope 5115.

The arm controlling apparatus 5159 includes a processor such as, for example, a CPU and operates in accordance with a predetermined program to control driving of the arm unit 5145 of the supporting arm apparatus 5141 in accordance with a predetermined controlling method.

An inputting apparatus 5161 is an input interface for the endoscopic surgery system 5113. A user can perform inputting of various kinds of information or instruction inputting to the endoscopic surgery system 5113 through the inputting apparatus 5161. For example, the user would input various kinds of information relating to surgery such as physical information of a patient, information regarding a surgical procedure of the surgery and so forth through the inputting apparatus 5161. Further, the user would input, for example, an instruction to drive the arm unit 5145, an instruction to change an image pickup condition (type of irradiation light, magnification, focal distance or the like) by the endoscope 5115, an instruction to drive the energy device 5135 or a like through the inputting apparatus 5161.

The type of the inputting apparatus 5161 is not limited and may be that of any one of various known inputting apparatus. As the inputting apparatus 5161, for example, a mouse, a keyboard, a touch panel, a switch, a foot switch 5171 and/or a lever or the like may be applied. Where a touch panel is used as the inputting apparatus 5161, it may be provided on the display face of the display apparatus 5155.

The inputting apparatus 5161 is otherwise a device to be mounted on a user such as, for example, a glasses type wearable device or a head mounted display (HMD), and various kinds of inputting are performed in response to a gesture or a line of sight of the user detected by any of the devices mentioned. Further, the inputting apparatus 5161 includes a camera which can detect a motion of a user, and various kinds of inputting are performed in response to a gesture or a line of sight of a user detected from a video picked up by the camera. Further, the inputting apparatus 5161 includes a microphone which can collect the voice of a user, and various kinds of inputting are performed by voice through the microphone. By configuring the inputting apparatus 5161 such that various kinds of information can be inputted in a contactless fashion in this manner, especially a user who belongs to a clean area (for example, the surgeon 5181) can operate an apparatus belonging to an unclean area in a contactless fashion. Further, since the user can operate an apparatus without releasing a possessed surgical tool from its hand, the convenience to the user is improved.

A treatment tool controlling apparatus 5163 controls driving of the energy device 5135 for cautery or incision of a tissue, sealing of a blood vessel or the like. A pneumoperitoneum apparatus 5165 feeds gas into a body cavity of the patient 5185 through the pneumoperitoneum tube 5133 to inflate the body cavity in order to secure the field of view of the endoscope 5115 and secure the working space for the surgeon. A recorder 5167 is an apparatus capable of recording various kinds of information relating to surgery. A printer 5169 is an apparatus capable of printing various kinds of information relating to surgery in various forms such as a text, an image or a graph.

In the following, especially a characteristic configuration of the endoscopic surgery system 5113 is described in more detail.

(Supporting Arm Apparatus)

The supporting arm apparatus 5141 includes the base unit 5143 serving as a base, and the arm unit 5145 extending from the base unit 5143. In the example depicted, the arm unit 5145 includes the plurality of joint portions 5147a, 5147b and 5147c and the plurality of links 5149a and 5149b connected to each other by the joint portion 5147b. In FIG. 24, for simplified illustration, the configuration of the arm unit 5145 is depicted in a simplified form. Actually, the shape, number and arrangement of the joint portions 5147a to 5147c and the links 5149a and 5149b and the direction and so forth of axes of rotation of the joint portions 5147a to 5147c can be set suitably such that the arm unit 5145 has a desired degree of freedom. For example, the arm unit 5145 may preferably be included such that it has a degree of freedom equal to or not less than 6 degrees of freedom. This makes it possible to move the endoscope 5115 freely within the movable range of the arm unit 5145. Consequently, it becomes possible to insert the lens barrel 5117 of the endoscope 5115 from a desired direction into a body cavity of the patient 5185.

An actuator is provided in the joint portions 5147a to 5147c, and the joint portions 5147a to 5147c include such that they are rotatable around predetermined axes of rotation thereof by driving of the actuator. The driving of the actuator is controlled by the arm controlling apparatus 5159 to control the rotational angle of each of the joint portions 5147a to 5147c thereby to control driving of the arm unit 5145. Consequently, control of the position and the posture of the endoscope 5115 can be implemented. Thereupon, the arm controlling apparatus 5159 can control driving of the arm unit 5145 by various known controlling methods such as force control or position control.

For example, if the surgeon 5181 suitably performs operation inputting through the inputting apparatus 5161 (including the foot switch 5171), then driving of the arm unit 5145 may be controlled suitably by the arm controlling apparatus 5159 in response to the operation input to control the position and the posture of the endoscope 5115. After the endoscope 5115 at the distal end of the arm unit 5145 is moved from an arbitrary position to a different arbitrary position by the control just described, the endoscope 5115 can be supported fixedly at the position after the movement. It is to be noted that the arm unit 5145 may be operated in a master-slave fashion. In this case, the arm unit 5145 may be remotely controlled by the user through the inputting apparatus 5161 which is placed at a place remote from the operating room.

Further, where force control is applied, the arm controlling apparatus 5159 may perform power-assisted control to drive the actuators of the joint portions 5147a to 5147c such that the arm unit 5145 may receive external force by the user and move smoothly following the external force. This makes it possible to move the arm unit 5145 with comparatively weak force when the user directly touches with and moves the arm unit 5145. Accordingly, it becomes possible for the user to move the endoscope 5115 more intuitively by a simpler and easier operation, and the convenience to the user can be improved.

Here, generally in endoscopic surgery, the endoscope 5115 is supported by a medical doctor called scopist. In contrast, where the supporting arm apparatus 5141 is used, the position of the endoscope 5115 can be fixed with a higher degree of certainty without hands, and therefore, an image of a surgical region can be obtained stably and surgery can be performed smoothly.

It is to be noted that the arm controlling apparatus 5159 may not necessarily be provided on the cart 5151. Further, the arm controlling apparatus 5159 may not necessarily be a single apparatus. For example, the arm controlling apparatus 5159 may be provided in each of the joint portions 5147a to 5147c of the arm unit 5145 of the supporting arm apparatus 5141 such that the plurality of arm controlling apparatus 5159 cooperate with each other to implement driving control of the arm unit 5145.
(Light Source Apparatus)

The light source apparatus 5157 supplies irradiation light upon imaging of a surgical region to the endoscope 5115. The light source apparatus 5157 includes a white light source which includes, for example, an LED, a laser light source or a combination of them. In this case, where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 5157. Further, in this case, if laser beams from the RGB laser light sources are applied time-divisionally on an observation target and driving of the image pickup elements of the camera head 5119 is controlled in synchronism with the irradiation timings, then images individually corresponding to the R, G and B colors can be picked up time-divisionally. According to the method just described, a color image can be obtained even if a color filter is not provided for the image pickup element.

Further, driving of the light source apparatus 5157 may be controlled such that the intensity of light to be outputted is changed for each predetermined time. By controlling driving of the image pickup element of the camera head 5119 in synchronism with the timing of the change of the intensity of light to acquire images time-divisionally and synthesizing the images, an image of a high dynamic range free from underexposed blocked up shadows and overexposed highlights can be created.

Further, the light source apparatus 5157 may be configured to supply light of a predetermined wavelength band ready for special light observation. In special light observation, for example, by utilizing the wavelength dependency of absorption of light of a body tissue, narrow band light observation (narrow band imaging) of imaging a predetermined tissue such as a blood vessel of a superficial portion of the mucous membrane or the like in a high contrast is performed by applying light of a narrower wavelength band in comparison with irradiation light upon ordinary observation (namely, white light). Alternatively, in special light observation, fluorescent observation for obtaining an image from fluorescent light generated by irradiation of excitation light may also be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 5157 can be configured to supply such narrow-band light and/or excitation light suitable for special light observation as described above.
(Camera Head and CCU)

Figure 25:
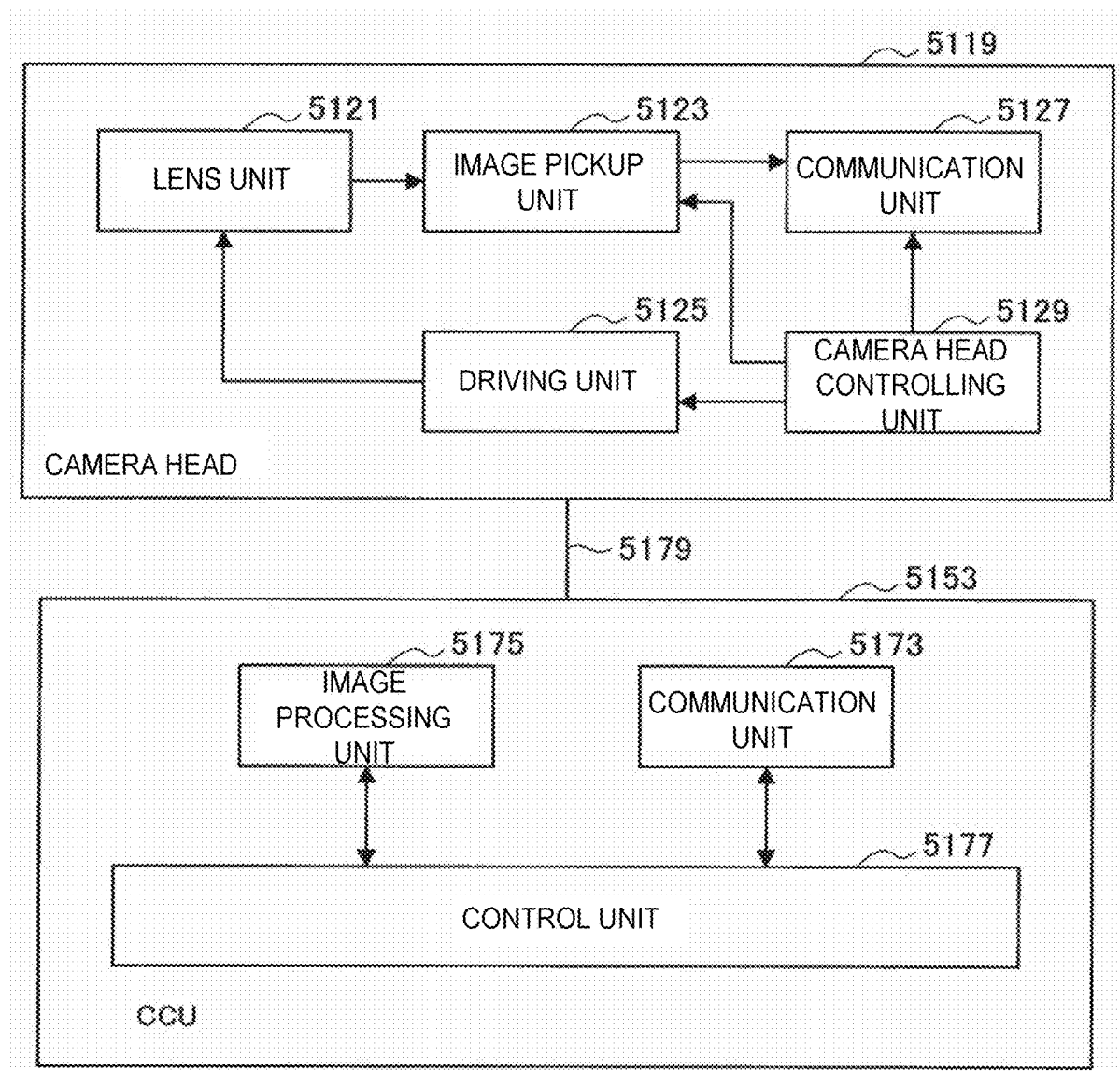
FIG. 25 is a block diagram depicting an example of a functional configuration of a camera head and a camera control unit (CCU) depicted in FIG. 24.

Functions of the camera head 5119 of the endoscope 5115 and the CCU 5153 are described in more detail with reference to FIG. 25. FIG. 25 is a block diagram depicting an example of a functional configuration of the camera head 5119 and the CCU 5153 depicted in FIG. 24.

Referring to FIG. 25, the camera head 5119 has, as functions thereof, a lens unit 5121, an image pickup unit 5123, a driving unit 5125, a communication unit 5127 and a camera head controlling unit 5129. Further, the CCU 5153 has, as functions thereof, a communication unit 5173, an image processing unit 5175 and a control unit 5177. The camera head 5119 and the CCU 5153 are connected to be bidirectionally communicable to each other by a transmission cable 5179.

First, a functional configuration of the camera head 5119 is described. The lens unit 5121 is an optical system provided at a connecting location of the camera head 5119 to the lens barrel 5117. Observation light taken in from a distal end of the lens barrel 5117 is introduced into the camera head 5119 and enters the lens unit 5121. The lens unit 5121 includes a combination of a plurality of lenses including a zoom lens and a focusing lens. The lens unit 5121 has optical properties adjusted such that the observation light is condensed on a light receiving face of the image pickup element of the image pickup unit 5123. Further, the zoom lens and the focusing lens include such that the positions thereof on their optical axis are movable for adjustment of the magnification and the focal point of a picked up image.

The image pickup unit 5123 includes an image pickup element and disposed at a succeeding stage to the lens unit 5121. Observation light having passed through the lens unit 5121 is condensed on the light receiving face of the image pickup element, and an image signal corresponding to the observation image is generated by photoelectric conversion. The image signal generated by the image pickup unit 5123 is provided to the communication unit 5127.

As the image pickup element which is included by the image pickup unit 5123, an image sensor, for example, of the complementary metal oxide semiconductor (CMOS) type is used which has a Bayer array and is capable of picking up an image in color. It is to be noted that, as the image pickup element, an image pickup element may be used which is ready, for example, for imaging of an image of a high resolution equal to or not less than 4K. If an image of a surgical region is obtained in a high resolution, then the surgeon 5181 can comprehend a state of the surgical region in enhanced details and can proceed with the surgery more smoothly.

Further, the image pickup element which is included by the image pickup unit 5123 is configured such that it has a pair of image pickup elements for acquiring image signals for the right eye and the left eye compatible with 3D display. Where 3D display is applied, the surgeon 5181 can comprehend the depth of a living body tissue in the surgical region with a higher degree of accuracy. It is to be noted that, if the image pickup unit 5123 is configured as that of the multi-plate type, then a plurality of systems of lens units 5121 is provided corresponding to the individual image pickup elements of the image pickup unit 5123.

The image pickup unit 5123 may not necessarily be provided on the camera head 5119. For example, the image pickup unit 5123 may be provided just behind the objective lens in the inside of the lens barrel 5117.

The driving unit 5125 includes an actuator and moves the zoom lens and the focusing lens of the lens unit 5121 by a predetermined distance along the optical axis under the control of the camera head controlling unit 5129. Consequently, the magnification and the focal point of a picked up image by the image pickup unit 5123 can be adjusted suitably.

The communication unit 5127 includes a communication apparatus for transmitting and receiving various kinds of information to and from the CCU 5153. The communication unit 5127 transmits an image signal acquired from the image pickup unit 5123 as RAW data to the CCU 5153 through the transmission cable 5179. Thereupon, in order to display a picked up image of a surgical region in low latency, preferably the image signal is transmitted by optical communication. This is because, since, upon surgery, the surgeon 5181 performs surgery while observing the state of an affected area through a picked up image, in order to achieve surgery with a higher degree of safety and certainty, it is demanded for a moving image of the surgical region to be displayed on the real time basis as far as possible. Where optical communication is applied, a photoelectric conversion module for converting an electric signal into an optical signal is provided in the communication unit 5127. After the image signal is converted into an optical signal by the photoelectric conversion module, it is transmitted to the CCU 5153 through the transmission cable 5179.

Further, the communication unit 5127 receives a control signal for controlling driving of the camera head 5119 from the CCU 5153. The control signal includes information relating to image pickup conditions such as, for example, information that a frame rate of a picked up image is designated, information that an exposure value upon image picking up is designated and/or information that a magnification and a focal point of a picked up image are designated. The communication unit 5127 provides the received control signal to the camera head controlling unit 5129. It is to be noted that also the control signal from the CCU 5153 may be transmitted by optical communication. In this case, a photoelectric conversion module for converting an optical signal into an electric signal is provided in the communication unit 5127. After the control signal is converted into an electric signal by the photoelectric conversion module, it is provided to the camera head controlling unit 5129.

It is to be noted that the image pickup conditions such as the frame rate, exposure value, magnification or focal point are set automatically by the control unit 5177 of the CCU 5153 on the basis of an acquired image signal. In other words, an auto exposure (AE) function, an auto focus (AF) function and an auto white balance (AWB) function are incorporated in the endoscope 5115.

The camera head controlling unit 5129 controls driving of the camera head 5119 on the basis of a control signal from the CCU 5153 received through the communication unit 5127. For example, the camera head controlling unit 5129 controls driving of the image pickup element of the image pickup unit 5123 on the basis of information that a frame rate of a picked up image is designated and/or information that an exposure value upon image picking up is designated. Further, for example, the camera head controlling unit 5129 controls the driving unit 5125 to suitably move the zoom lens and the focus lens of the lens unit 5121 on the basis of information that a magnification and a focal point of a picked up image are designated. The camera head controlling unit 5129 may include a function for storing information for identifying of the lens barrel 5117 and/or the camera head 5119.

It is to be noted that, by disposing the components such as the lens unit 5121 and the image pickup unit 5123 in a sealed structure having high airtightness and high waterproof, the camera head 5119 can be provided with resistance to an autoclave sterilization process.

Now, a functional configuration of the CCU 5153 is described. The communication unit 5173 includes a communication apparatus for transmitting and receiving various kinds of information to and from the camera head 5119. The communication unit 5173 receives an image signal transmitted thereto from the camera head 5119 through the transmission cable 5179. Thereupon, the image signal may be transmitted preferably by optical communication as described above. In this case, for the compatibility with optical communication, the communication unit 5173 includes a photoelectric conversion module for converting an optical signal into an electric signal. The communication unit 5173 provides the image signal after conversion into an electric signal to the image processing unit 5175.

Further, the communication unit 5173 transmits, to the camera head 5119, a control signal for controlling driving of the camera head 5119. Also the control signal may be transmitted by optical communication.

The image processing unit 5175 performs various image processes for an image signal in the form of RAW data transmitted thereto from the camera head 5119. The image processes include various known signal processes such as, for example, a development process, an image quality improving process (a bandwidth enhancement process, a super-resolution process, a noise reduction (NR) process and/or an image stabilization process) and/or an enlargement process (electronic zooming process). Further, the image processing unit 5175 performs a detection process for an image signal for performing AE, AF and AWB.

The image processing unit 5175 includes a processor such as a CPU or a GPU, and when the processor operates in accordance with a predetermined program, the image processes and the detection process described above can be performed. It is to be noted that, where the image processing unit 5175 includes a plurality of GPUs, the image processing unit 5175 suitably divides information relating to an image signal such that image processes are performed in parallel by the plurality of GPUs.

The control unit 5177 performs various kinds of control relating to image picking up of a surgical region by the endoscope 5115 and display of the picked up image. For example, the control unit 5177 generates a control signal for controlling driving of the camera head 5119. Thereupon, if image pickup conditions are inputted by the user, then the control unit 5177 generates a control signal on the basis of the input by the user. Alternatively, where the endoscope 5115 has an AE function, an AF function and an AWB function incorporated therein, the control unit 5177 suitably calculates an optimum exposure value, focal distance and white balance in response to a result of a detection process by the image processing unit 5175 and generates a control signal.

Further, the control unit 5177 controls the display apparatus 5155 to display an image of a surgical region on the basis of an image signal for which the image processes have been performed by the image processing unit 5175. Thereupon, the control unit 5177 recognizes various objects in the surgical region image using various image recognition technologies. For example, the control unit 5177 can recognize a surgical tool such as forceps, a particular living body region, bleeding, mist when the energy device 5135 is used and so forth by detecting the shape, color and so forth of edges of the objects included in the surgical region image. The control unit 5177 causes, when it controls the display apparatus 5155 to display a surgical region image, various kinds of surgery supporting information to be displayed in an overlapping manner with an image of the surgical region using a result of the recognition. Where surgery supporting information is displayed in an overlapping manner and presented to the surgeon 5181, the surgeon 5181 can proceed with the surgery more safety and certainty.

The transmission cable 5179 which connects the camera head 5119 and the CCU 5153 to each other is an electric signal cable ready for communication of an electric signal, an optical fiber ready for optical communication or a composite cable thereof.

Here, while, in the example depicted in the figure, communication is performed by wired communication using the transmission cable 5179, the communication between the camera head 5119 and the CCU 5153 may be performed otherwise by wireless communication. Where the communication between the camera head 5119 and the CCU 5153 is performed by wireless communication, there is no necessity to lay the transmission cable 5179 in the operating room. Therefore, such a situation that movement of medical staff in the operating room is disturbed by the transmission cable 5179 can be eliminated.

An example of the operating room system 5100 to which the technology according to an embodiment of the present disclosure can be applied has been described above. It is to be noted here that, although a case in which the medical system to which the operating room system 5100 is applied is the endoscopic surgery system 5113 has been described as an example, the configuration of the operating room system 5100 is not limited to that of the example described above. For example, the operating room system 5100 may be applied to a soft endoscopic system for inspection or a microscopic surgery system in place of the endoscopic surgery system 5113.

The technology according to the present disclosure may be suitably applied to the recorder 5105 among the configurations described above. In one example, the recorder 5105 may decide a processing parameter related to quantization processing on the basis of at least one of a transfer function related to conversion between light and an image signal or a color range in accordance with the technology according to the present disclosure when an image captured by any of the cameras (for example, the ceiling camera 5187, the operating room camera 5189, or the camera head 5119) is coded. In this manner, it is possible to prevent an inappropriate quantization step from being used due to a difference in transfer functions or color ranges and to secure a sufficient assigned code amount to express the grayscale of the original signal. In another example, the recorder 5105 may decide a processing parameter related to pixel classification processing that may be performed for various purposes on the basis of at least one of a transfer function related to conversion between light and an image signal or a color range in accordance with the technology according to the present disclosure when an image captured by any of the cameras is coded. In this manner, it is possible to prevent pixels from being classified with inappropriate criteria due to a difference in transfer functions or color ranges and to secure appropriate execution of the processing based on the classification. As a result, it is possible to enhance accuracy of diagnosis or therapy using the image in any of the examples.

6. Summary

The technology according to the present disclosure provides improvement to, for example, a digital video camera, a digital camcorder, a video encoder, or an arbitrary type of existing device with an encoding function or a pixel classification function that has not necessarily sufficiently been adapted to video signal expressions that are being diversified, in accordance with the mechanism described hitherto in detail. According to the technology of the present disclosure, utilization of an inappropriate processing parameter may be prevented in a case in which an HDR video image is handled.

Although terminology specific to a specific video image coding scheme has been used in a part of the specification for simple explanation, the technology according to the present disclosure is not limited by such terms. For example, terms of luminance (luma) and chrominance (chroma) may be replaced with other terms such as brightness and saturation, respectively, depending on a color system used.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An image processing device including:
a control unit that decides a processing parameter for image processing performed on an image on the basis of at least one of a transfer function related to conversion between light and an image signal that is applied to the image or a color range that is applied to the image; and
a processing unit that executes the image processing using the processing parameter that is decided by the control unit.

(2)
The image processing device according to (1), in which the control unit decides the processing parameter on the basis of a combination of the transfer function and the color range.

(3)
The image processing device according to (1) or (2), in which the control unit decides the processing parameter such that influences of a change in a code value of an image signal due to a difference in the at least one of the transfer function or the color range on the image processing are canceled.

(4)
The image processing device according to any one of (1) to (3),
in which the processing unit executes quantization processing on a partial region in a quantization step that is adjusted in accordance with a coding difficulty of each partial region of the image, and
the processing parameter is a parameter related to the quantization processing.

(5)
The image processing device according to (4), in which the parameter related to the quantization processing includes an adjustment gain of the quantization step for the image.

(6)
The image processing device according to (5), in which the control unit decides a basic adjustment gain of the quantization step for the image on the basis of the at least one of the transfer function or the color range.

(7)
The image processing device according to (6), in which the processing unit executes the quantization processing on each partial region in a quantization step after adjustment in which the quantization step is adjusted on the basis of the basic adjustment gain and the coding difficulty of each partial region.

(8)
The image processing device according to (1) or (2), in which the processing unit executes pixel classification processing on the image using the processing parameter.

(9)
The image processing device according to (8), in which the processing parameter includes a threshold value to be compared with a code value of a color component in the pixel classification processing.

(10)
The image processing device according to (9),
in which the pixel classification processing includes region detection processing for detecting a specific region in the image, and
the threshold value includes a region detection threshold value.

(11)
The image processing device according to (10),
in which the specific region is a region of a specific color, and
the region detection threshold value includes a color determination threshold value.

(12)
The image processing device according to (11),
in which the specific color is a skin color, and
the color determination threshold value includes a skin color determination threshold value.

(13)
The image processing device according to (12), further including a quantization unit that executes quantization processing on the image in a quantization step that is adjusted on the basis of a result of the region detection processing.

(14)
The image processing device according to any one of (1) to (13), further including a storage unit that stores a value of the processing parameter associated with one or both of the transfer function and the color range.

(15)
The image processing device according to any one of (1) to (14), in which the control unit determines a type of the at least one of the transfer function and the color range on the basis of input information related to the at least one of the transfer function or the color range and decides the processing parameter for the image processing on the basis of the determined type.

(16)
The image processing device according to (15), in which the input information is information acquired via a user interface.

(17)
The image processing device according to (15), in which the input information is information acquired from an auxiliary signal that is multiplexed with an input image signal that expresses the image.

(18)
An image processing method including:
deciding a processing parameter for image processing performed on an image on the basis of at least one of a transfer function related to conversion between light and an image signal that is applied to the image or a color range that is applied to the image; and
executing the image processing using the decided processing parameter.

(19)
A program that causes a processor of an image processing device to function as:
a control unit that decides a processing parameter for image processing performed on an image on the basis of at least one of a transfer function related to conversion between light and an image signal that is applied to the image or a color range that is applied to the image; and
a processing unit that executes the image processing using the processing parameter that is decided by the control unit.

REFERENCE SIGNS LIST

100a, 100b image processing device
101 signal acquisition unit 102 signal processing unit
103, 104 information acquisition unit
107 storage unit
110 coding unit
115 quantization unit (processing unit)
140 control unit
200a, 200b image processing device
201 signal acquisition unit
203 information acquisition unit
210 coding unit
240 control unit
241, 250 threshold value control unit
243, 260 pixel classification unit (processing unit)
270 output signal generation unit

The invention claimed is:

1. An image processing device comprising:
   circuitry configured to:
   decide a processing parameter for image processing performed on an image based on at least one of (i) a transfer function related to conversion between light and an image signal that is applied to the image or (ii) a color range that is applied to the image; and
   execute the image processing using the decided processing parameter, the decided processing parameter representing a gain of a quantization step, the quantization step being adjusted strictly to a smaller value as the gain increases.

2. The image processing device according to claim 1, wherein the circuitry is further configured to decide the processing parameter based on a combination of the transfer function and the color range.

3. The image processing device according to claim 1, wherein the circuitry is further configured to decide the processing parameter such that influences of a change in a code value of the image signal due to a difference in the at least one of the transfer function or the color range on the image processing are canceled.

4. The image processing device according to claim 1, wherein the circuitry is further configured to execute quantization processing on a partial region in the quantization step that is adjusted in accordance with a coding difficulty of each partial region of the image.

5. The image processing device according to claim 4, wherein the circuitry is further configured to decide the gain of the quantization step for the image based on the at least one of the transfer function or the color range.

6. The image processing device according to claim 5, wherein the circuitry is further configured to execute the quantization processing on each partial region in the quantization step after adjustment in which the quantization step is adjusted based on the gain and the coding difficulty of each partial region.

7. The image processing device according to claim 1, wherein the circuitry is further configured to execute pixel classification processing on the image using the processing parameter.

8. The image processing device according to claim 7, wherein the processing parameter includes a threshold value to be compared with a code value of a color component in the pixel classification processing.

9. The image processing device according to claim 8,
   wherein the pixel classification processing includes region detection processing for detecting a specific region in the image, and
   the threshold value includes a region detection threshold value.

10. The image processing device according to claim 9,
    wherein the specific region is a region of a specific color, and
    the region detection threshold value includes a color determination threshold value.

11. The image processing device according to claim 10,
    wherein the specific color is a skin color, and
    the color determination threshold value includes a skin color determination threshold value.

12. The image processing device according to claim 11, wherein the circuitry is further configured to execute quantization processing on the image in the quantization step that is adjusted based on a result of the region detection processing.

13. The image processing device according to claim 1, wherein the circuitry is further configured to store a value of the processing parameter associated with one or both of the transfer function and the color range.

14. The image processing device according to claim 1, wherein the circuitry is further configured to determine a type of the at least one of the transfer function and the color range based on input information related to the at least one of the transfer function or the color range and decides the processing parameter for the image processing based on the determined type.

15. The image processing device according to claim 14, wherein the input information is information acquired via a user interface.

16. The image processing device according to claim 14, wherein the input information is information acquired from an auxiliary signal that is multiplexed with an input image signal that expresses the image.

17. An image processing method comprising:
    deciding a processing parameter for image processing performed on an image based on at least one of (i) a transfer function related to conversion between light and an image signal that is applied to the image or (ii) a color range that is applied to the image; and
    executing the image processing using the decided processing parameter, the decided processing parameter representing a gain of a quantization step, the quantization step being adjusted strictly to a smaller value as the gain increases.

18. A non-transitory computer readable medium storing computer readable instructions thereon that, when executed by a processor of an image processing device, causes the processor to perform a method comprising:
    deciding a processing parameter for image processing performed on an image based on at least one of (i) a transfer function related to conversion between light and an image signal that is applied to the image or (ii) a color range that is applied to the image; and
    executing the image processing using the decided processing parameter, the decided processing parameter representing a gain of a quantization step, the quantization step being adjusted strictly to a smaller value as the gain increases.

* * * * *